(12) United States Patent
Okada

(10) Patent No.: US 7,121,147 B2
(45) Date of Patent: *Oct. 17, 2006

(54) FORCE DETECTION DEVICE

(75) Inventor: Kazuhiro Okada, Ageo (JP)

(73) Assignee: Wacoh Corporation, Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/988,359

(22) Filed: Nov. 12, 2004

(65) Prior Publication Data
US 2005/0092096 A1 May 5, 2005

Related U.S. Application Data

(62) Division of application No. 10/805,649, filed on Mar. 19, 2004, now Pat. No. 6,915,709.

(30) Foreign Application Priority Data

| Mar. 31, 2003 | (JP) | 2003-096167 |
| Apr. 28, 2003 | (JP) | 2000-123235 |

(51) Int. Cl.
G01B 5/30 (2006.01)
G01N 3/00 (2006.01)
(52) U.S. Cl. .................................................. 73/760
(58) Field of Classification Search ............ 73/774, 73/781, 788, 760
See application file for complete search history.

(56) References Cited

U.S. PATENT DOCUMENTS

| 4,088,015 A | * | 5/1978 | Wolfer | 73/862.381 |
| 4,092,854 A | | 6/1978 | Henry et al. | |
| 4,094,192 A | | 6/1978 | Watson et al. | |
| 4,099,409 A | | 7/1978 | Edmond | |
| 4,149,422 A | * | 4/1979 | Olsen et al. | 73/704 |
| 4,398,429 A | | 8/1983 | Cook et al. | |
| 4,444,061 A | | 4/1984 | Mathias | |
| 4,550,617 A | | 11/1985 | Fraignier et al. | |
| 4,560,017 A | * | 12/1985 | Hood | 177/211 |
| 4,788,869 A | * | 12/1988 | Li | 73/861.71 |

(Continued)

FOREIGN PATENT DOCUMENTS

JP 59 020828 2/1984

OTHER PUBLICATIONS

English translation of JP 59 020828 dated Feb. 2, 1984.

(Continued)

Primary Examiner—Max Noori
(74) Attorney, Agent, or Firm—Ladas and Parry LLP

(57) ABSTRACT

Forces and moments are detected in a distinguishing manner by a simple structure. A supporting member (20) is positioned below a force receiving member (10), which receives forces to be detected, and between these components, at least two columnar force transmitting members (11, 12) are connected. Connecting members having flexibility are interposed at the upper and lower ends of each of columnar force transmitting members (11, 12) so that columnar force transmitting members (11, 12) can become inclined when force receiving member (10) becomes displaced upon receiving a force. Sensors (21, 22) are positioned at the respective connection parts of columnar force transmitting members (11, 12) and supporting member (20) to detect forces that are transmitted from the respective columnar force transmitting members (11, 12) to supporting member (20). Based on the detection values of sensors (21, 22), detection processing unit 30 detects, in a distinguishing manner, forces and moments acting on force receiving member (10). When four columnar force transmitting members are used, all of forces Fx, Fy, and Fz and moments Mx, My, and Mz can be detected.

6 Claims, 34 Drawing Sheets

U.S. PATENT DOCUMENTS

| | | | | |
|---|---|---|---|---|
| 4,799,562 A * | 1/1989 | Burrows et al. | ............ | 177/229 |
| 4,905,523 A | 3/1990 | Okada | ................... | 73/862.04 |
| 4,967,605 A | 11/1990 | Okada | ................... | 73/862.04 |
| 4,969,366 A | 11/1990 | Okada | ................... | 73/862.08 |
| 5,014,415 A | 5/1991 | Okada | ...................... | 29/621.1 |
| 5,035,148 A | 7/1991 | Okada | ........................ | 73/862.04 |
| 5,092,645 A | 3/1992 | Okada | ........................ | 294/86.4 |
| 5,182,515 A | 1/1993 | Okada | ........................ | 324/259 |
| 5,231,386 A * | 7/1993 | Brandenburg et al. | ...... | 345/174 |
| 5,263,375 A | 11/1993 | Okada | ................... | 73/862.042 |
| 5,295,386 A | 3/1994 | Okada | ........................ | 73/1 D |
| 5,343,765 A | 9/1994 | Okada | ................... | 73/862.043 |
| 5,348,519 A * | 9/1994 | Prince et al. | ................... | 482/6 |
| 5,365,799 A | 11/1994 | Okada | ................... | 73/862.041 |
| 5,392,658 A | 2/1995 | Okada | ................... | 73/862.043 |
| 5,406,848 A | 4/1995 | Okada | ...................... | 73/517 R |
| 5,421,213 A | 6/1995 | Okada | ................... | 73/862.043 |
| 5,437,196 A | 8/1995 | Okada | ................... | 73/862.043 |
| 5,492,020 A | 2/1996 | Okada | ................... | 73/862.626 |
| 5,497,668 A | 3/1996 | Okada | ................... | 73/862.626 |
| 5,506,568 A * | 4/1996 | Chen | ........................ | 340/566 |
| 5,531,002 A | 7/1996 | Okada | ........................ | 29/25.41 |
| 5,531,092 A | 7/1996 | Okada | ........................ | 73/1 D |
| 5,548,092 A * | 8/1996 | Shriver | ................... | 178/19.01 |
| 5,571,972 A | 11/1996 | Okada | ................... | 73/862.043 |
| 5,639,973 A | 6/1997 | Okada | ................... | 73/862.043 |
| 5,646,346 A | 7/1997 | Okada | ................... | 73/504.04 |
| 5,668,318 A | 9/1997 | Okada | ................... | 73/504.11 |
| 5,682,000 A | 10/1997 | Okada | ................... | 73/862.043 |
| 5,744,718 A | 4/1998 | Okada | ................... | 73/514.33 |
| 5,780,749 A | 7/1998 | Okada | ................... | 73/862.043 |
| 5,811,693 A | 9/1998 | Okada | ................... | 73/862.043 |
| 5,823,278 A * | 10/1998 | Geringer | ................... | 177/144 |
| 5,831,163 A | 11/1998 | Okada | ................... | 73/504.12 |
| 5,850,040 A | 12/1998 | Okada | ................... | 73/504.04 |
| 5,856,620 A | 1/1999 | Okada | ................... | 73/514.32 |
| 5,962,787 A | 10/1999 | Okada et al. | ............ | 73/514.32 |
| 5,987,985 A | 11/1999 | Okada | ................... | 73/504.04 |
| 6,003,371 A | 12/1999 | Okada | ................... | 73/504.02 |
| 6,053,057 A | 4/2000 | Okada | ................... | 73/862.043 |
| 6,076,401 A | 6/2000 | Okada | ................... | 73/504.12 |
| 6,098,461 A | 8/2000 | Okada | ................... | 73/514.34 |
| 6,122,846 A * | 9/2000 | Gray et al. | ................... | 36/136 |
| 6,155,976 A * | 12/2000 | Sackner et al. | ............ | 600/300 |
| 6,158,291 A | 12/2000 | Okada | ................... | 73/862.043 |
| 6,159,761 A | 12/2000 | Okada | ..................... | 438/53 |
| 6,185,814 B1 | 2/2001 | Okada | ....................... | 29/621.1 |
| 6,205,856 B1 | 3/2001 | Okada | ................... | 73/504.11 |
| 6,269,697 B1 | 8/2001 | Okada | ................... | 73/504.02 |
| 6,282,956 B1 | 9/2001 | Okada | ................... | 73/504.12 |
| 6,314,823 B1 | 11/2001 | Okada | ................... | 73/862.043 |
| 6,367,326 B1 | 4/2002 | Okada | ................... | 73/504.12 |
| 6,378,381 B1 | 4/2002 | Okada et al. | .......... | 73/862.043 |
| 6,422,096 B1 * | 7/2002 | Bulat | ................... | 73/862.381 |
| 6,474,133 B1 | 11/2002 | Okada | ........................ | 73/1.38 |
| 6,477,903 B1 | 11/2002 | Okada | ................... | 73/862.043 |
| 6,512,364 B1 | 1/2003 | Okada | ................... | 324/158.1 |
| 6,530,283 B1 | 3/2003 | Okada et al. | ................. | 73/780 |
| 6,668,659 B1 * | 12/2003 | Morikawa et al. | ......... | 73/729.1 |
| 6,716,253 B1 | 4/2004 | Okada | ........................... | 73/52 |
| 6,772,632 B1 | 8/2004 | Okada | ................... | 73/514.38 |
| 6,809,529 B1 | 10/2004 | Okada et al. | | |
| 6,823,744 B1 * | 11/2004 | Ohsato et al. | ......... | 73/862.041 |
| 6,915,709 B1 * | 7/2005 | Okada | ................... | 73/862.041 |
| 2002/0163509 A1* | 11/2002 | Roberts | ....................... | 345/173 |

OTHER PUBLICATIONS

"Compact Three-Degree of Freedom Load Cell" IBM Technical Disclosure Bulletin (1995) vol. 38, No. 9 pp. 435-437.

* cited by examiner

Fig.13

|  | C11 | C12 | C13 | C14 | C15 | C21 | C22 | C23 | C24 | C25 |
|---|---|---|---|---|---|---|---|---|---|---|
| +Fx | + | − | 0 | 0 | 0 | + | − | 0 | 0 | 0 |
| −Fx | − | + | 0 | 0 | 0 | − | + | 0 | 0 | 0 |
| +Fz | − | − | − | − | − | − | − | − | − | − |
| −Fz | + | + | + | + | + | + | + | + | + | + |
| +Mx | 0 | 0 | − | + | 0 | 0 | 0 | − | + | 0 |
| −Mx | 0 | 0 | + | − | 0 | 0 | 0 | + | − | 0 |
| +My | + | + | + | + | + | − | − | − | − | − |
| −My | − | − | − | − | − | + | + | + | + | + |
| +Mz | 0 | 0 | + | − | 0 | 0 | 0 | − | + | 0 |
| −Mz | 0 | 0 | − | + | 0 | 0 | 0 | + | − | 0 |

|     | C11 | C12 | C13 | C14 | C15 | C21 | C22 | C23 | C24 | C25 |
| --- | --- | --- | --- | --- | --- | --- | --- | --- | --- | --- |
| +Fx | +   | −   | 0   | 0   | 0   | +   | −   | 0   | 0   | 0   |
| +Fy | 0   | 0   | +   | −   | 0   | 0   | 0   | +   | −   | 0   |
| +Fz | −   | −   | −   | −   | −   | −   | −   | −   | −   | −   |
| +Mx | −   | −   | −   | −   | −   | −   | −   | −   | −   | −   |
| +My | +   | +   | +   | +   | +   | −   | −   | −   | −   | −   |
| +Mz | −   | +   | +   | −   | 0   | −   | +   | −   | +   | 0   |

Fig.19A

|     | C31 | C32 | C33 | C34 | C35 | C41 | C42 | C43 | C44 | C45 |
| --- | --- | --- | --- | --- | --- | --- | --- | --- | --- | --- |
| +Fx | +   | −   | 0   | 0   | 0   | +   | −   | 0   | 0   | 0   |
| +Fy | 0   | 0   | +   | −   | 0   | 0   | 0   | +   | −   | 0   |
| +Fz | −   | −   | −   | −   | −   | −   | −   | −   | −   | −   |
| +Mx | +   | +   | +   | +   | +   | +   | +   | +   | +   | +   |
| +My | −   | −   | −   | −   | −   | +   | +   | +   | +   | +   |
| +Mz | +   | −   | −   | +   | 0   | +   | −   | +   | −   | 0   |

Fig.19B

|     | C11 | C12 | C13 | C14 | C15 | C21 | C22 | C23 | C24 | C25 |
|-----|-----|-----|-----|-----|-----|-----|-----|-----|-----|-----|
| +Fx | +   | −   | 0   | 0   | 0   | +   | −   | 0   | 0   | 0   |
| +Fy | 0   | 0   | +   | −   | 0   | 0   | 0   | +   | −   | 0   |
| +Fz | −   | −   | −   | −   | −   | −   | −   | −   | −   | −   |
| +Mx | 0   | 0   | 0   | 0   | 0   | 0   | 0   | 0   | 0   | 0   |
| +My | +   | +   | +   | +   | +   | −   | −   | −   | −   | −   |
| +Mz | 0   | 0   | +   | −   | 0   | 0   | 0   | −   | +   | 0   |

Fig.22A

|     | C31 | C32 | C33 | C34 | C35 | C41 | C42 | C43 | C44 | C45 |
|-----|-----|-----|-----|-----|-----|-----|-----|-----|-----|-----|
| +Fx | +   | −   | 0   | 0   | 0   | +   | −   | 0   | 0   | 0   |
| +Fy | 0   | 0   | +   | −   | 0   | 0   | 0   | +   | −   | 0   |
| +Fz | −   | −   | −   | −   | −   | −   | −   | −   | −   | −   |
| +Mx | −   | −   | −   | −   | −   | +   | +   | +   | +   | +   |
| +My | 0   | 0   | 0   | 0   | 0   | 0   | 0   | 0   | 0   | 0   |
| +Mz | −   | +   | 0   | 0   | 0   | +   | −   | 0   | 0   | 0   |

Fig.22B

|     | C11 | C12 | C13 | C14 | C15 |
|-----|-----|-----|-----|-----|-----|
| +Fx | +   | −   | 0   | 0   | 0   |
| +Fy | 0   | 0   | +   | −   | 0   |
| +Fz | −   | −   | −   | −   | −   |
| +Mx | −   | −   | −   | −   | −   |
| +My | 0   | 0   | 0   | 0   | 0   |
| +Mz | −   | +   | 0   | 0   | 0   |

Fig.36A

|     | C21 | C22 | C23 | C24 | C25 | C31 | C32 | C33 | C34 | C35 |
|-----|-----|-----|-----|-----|-----|-----|-----|-----|-----|-----|
| +Fx | +   | −   | 0   | 0   | 0   | +   | −   | 0   | 0   | 0   |
| +Fy | 0   | 0   | +   | −   | 0   | 0   | 0   | +   | −   | 0   |
| +Fz | −   | −   | −   | −   | −   | −   | −   | −   | −   | −   |
| +Mx | +   | +   | +   | +   | +   | +   | +   | +   | +   | +   |
| +My | −   | −   | −   | −   | −   | +   | +   | +   | +   | +   |
| +Mz | +   | −   | −   | +   | 0   | +   | −   | +   | −   | 0   |

Fig.36B

FORCE DETECTION DEVICE

This is a divisional of application Ser. No. 10/805,649 filed on Mar. 19, 2004 now U.S. Pat. No. 6,915,709, claims the benefit thereof and incorporates the same by reference.

BACKGROUND OF THE INVENTION

This invention concerns a force detection device, and particularly concerns a force detection device suited for measuring forces and moments independently.

Various types of force detection devices are used for controlling motions of robots and industrial machines. Compact force detection devices are also incorporated as man-machine interfaces of input devices for electronic equipment. In order to achieve size and cost reduction, a force detection device used in such an application is required to be as simple in structure as possible and is required to detect forces of the respective coordinate axes in three-dimensional space independently each other.

Multi-axis force detection devices that are presently used can be classified into two types, that is, a type, with which specific directional components of a force that acts on a three-dimensional structure are detected as displacements that arise at a specific part, and a type, with which the directional components are detected as mechanical strains that arise at a specific part. A capacitance element type force detection device is a representative device of the former displacement detection type, and with this device, a capacitance element is constituted by a pair of electrodes and the displacement arising at one of the electrodes due to an acting force is detected based on a static capacitance value of the capacitance element. Such a static capacitance type force detection device is disclosed, for example, in Japanese Unexamined Patent Application Publication No. 5-215627/1993. Meanwhile, a strain gauge type force detection device is a representative device of the latter strain detection type, and with this device, a mechanical strain that arises as a result of an acting force is detected as a change of gauge resistance or other form of electrical resistance. Such a strain gauge type force detection device is disclosed, for example, in Japanese Unexamined Patent Application Publication No. 61-292029/1986.

In general, the objects of detection by a force detection device are force components in the direction of predetermined coordinate axes and moment components about the predetermined coordinate axes. In the case where an XYZ three-dimensional coordinate system is defined in three-dimensional space, the objects of detection will be the six components of the force components Fx, Fy, and Fz in the directions of the respective coordinate axes and the moment components Mx, My, and Mz about the respective coordinate axes. However priorly, regardless of the displacement detection type or the strain detection type, a force detection device of a considerably complex three-dimensional structure was required to detect the respective components independent of each other.

SUMMARY OF THE INVENTION

Thus an object of this invention is to provide a force detection device that can detect forces and moments in a distinguished manner by means of a structure that is as simple as possible.

(1) The first feature of the present invention resides in a force detection device comprising:

a force receiving member for receiving force to be detected;

a supporting member positioned below the force receiving member;

a first force transmitting member having an upper end thereof connected to the force receiving member and a lower end thereof connected via a connecting member, having flexibility, to the supporting member;

a second force transmitting member having an upper end thereof connected to the force receiving member and a lower end thereof connected via a connecting member, having flexibility, to the supporting member;

a first sensor for detecting force applied from the first force transmitting member to the supporting member;

a second sensor for detecting force applied from the second force transmitting member to the supporting member; and a detection processing unit for performing a process of detecting a force or moment component acting on the force receiving member in consideration of both of a detection result of the first sensor and a detection result of the second sensor.

(2) The second feature of the present invention resides in the force detection device having the first feature, wherein:

the first sensor has a function of detecting a state of inclination of the first force transmitting member with respect to the supporting member; and the second sensor has a function of detecting a state of inclination of the second force transmitting member with respect to the supporting member.

(3) The third feature of the present invention resides in the force detection device having the second feature, wherein:

when an XYZ three-dimensional coordinate system is defined;

each of the first force transmitting member and the second force transmitting member is arranged from a structure having the Z-axis direction as a longitudinal direction;

the first sensor has a function of detecting an inclination degree in relation to the X-axis direction of the first force transmitting member;

the second sensor has a function of detecting an inclination degree in relation to the X-axis direction of the second force transmitting member; and the detection processing unit performs a process of detecting an X-axis force component Fx of force that acts on the force receiving member based on a sum of the inclination degree in relation to the X-axis direction detected by the first sensor and the inclination degree in relation to the X-axis direction detected by the second sensor.

(4) The fourth feature of the present invention resides in the force detection device having the second feature, wherein:

when an XYZ three-dimensional coordinate system is defined;

each of the first force transmitting member and the second force transmitting member is arranged from a structure having the Z-axis direction as a longitudinal direction;

the first sensor has a function of detecting an inclination degree in relation to the Y-axis direction of the first force transmitting member;

the second sensor has a function of detecting an inclination degree in relation to the Y-axis direction of the second force transmitting member; and the detection processing unit performs a process of detecting a moment component Mz about the Z-axis of force that acts on the force receiving member based on a difference between the inclination degree in relation to the Y-axis direction detected by the first sensor and the inclination degree in relation to the Y-axis direction detected by the second sensor.

(5) The fifth feature of the present invention resides in the force detection device having the first feature, wherein:

the first sensor has a function of detecting a force that is applied from the entirety of the first force transmitting member to the supporting member; and the second sensor has a function of detecting a force that is applied from the entirety of the second force transmitting member to the supporting member.

(6) The sixth feature of the present invention resides in the force detection device having the fifth feature, wherein:

when an XYZ three-dimensional coordinate system is defined;

each of the first force transmitting member and the second force transmitting member is arranged from a structure having the Z-axis direction as a longitudinal direction;

the first sensor has a function of detecting a force in relation to the Z-axis direction that is applied from the entirety of the first force transmitting member to the supporting member;

the second sensor has a function of detecting a force in relation to the Z-axis direction that is applied from the entirety of the second force transmitting member to the supporting member; and the detection processing unit performs a process of detecting a moment component My about the Y-axis of force that acts on the force receiving member based on a difference between the force in relation to the Z-axis direction detected by the first sensor and the force in relation to the Z-axis direction detected by the second sensor.

(7) The seventh feature of the present invention resides in the force detection device having the first feature, wherein:

the first sensor has a function of detecting a state of inclination of the first force transmitting member with respect to the supporting member and a function of detecting a force applied from the entirety of the first force transmitting member to the supporting member; and the second sensor has a function of detecting a state of inclination of the second force transmitting member with respect to the supporting member and a function of detecting a force applied from the entirety of the second force transmitting member to the supporting member.

(8) The eighth feature of the present invention resides in the force detection device having the seventh feature, wherein:

when an XYZ three-dimensional coordinate system is defined;

each of the first force transmitting member and the second force transmitting member is arranged from a structure having the Z-axis direction as a longitudinal direction;

the first sensor has a function of detecting an inclination degree in relation to the X-axis direction of the first force transmitting member, a function of detecting an inclination degree in relation to the Y-axis direction of the first force transmitting member, and a function of detecting a force in relation to the Z-axis direction that is applied from the entirety of the first force transmitting member to the supporting member;

the second sensor has a function of detecting an inclination degree in relation to the X-axis direction of the second force transmitting member, a function of detecting an inclination degree in relation to the Y-axis direction of the second force transmitting member, and a function of detecting a force in relation to the Z-axis direction that is applied from the entirety of the second force transmitting member to the supporting member; and the detection processing unit, performs a process of detecting an X-axis force component Fx of force that acts on the force receiving member based on a sum of the inclination degree in relation to the X-axis direction detected by the first sensor and the inclination degree in relation to the X-axis direction detected by the second sensor, performs a process of detecting a Z-axis force component Fz of force that acts on the force receiving member based on a sum of the force in relation to the Z-axis direction detected by the first sensor and the force in relation to the Z-axis direction detected by the second sensor, performs a process of detecting a moment component Mx about the X-axis of force that acts on the force receiving member based on a sum of the inclination degree in relation to the Y-axis direction detected by the first sensor and the inclination degree in relation to the Y-axis direction detected by the second sensor, and performs a process of detecting a moment component My about the Y-axis of force that acts on the force receiving member based on a difference between the force in relation to the Z-axis direction detected by the first sensor and the force in relation to the Z-axis direction detected by the second sensor.

(9) The ninth feature of the present invention resides in the force detection device having the first feature, further comprising:

a third force transmitting member having an upper end thereof connected to the force receiving member and a lower end thereof connected via a connecting member, having flexibility, to the supporting member;

a fourth force transmitting member having an upper end thereof connected to the force receiving member and a lower end thereof connected via a connecting member, having flexibility, to the supporting member;

a third sensor for detecting force applied from the third force transmitting member to the supporting member;

a fourth sensor for detecting force applied from the fourth force transmitting member to the supporting member; and wherein the detection processing unit performs a process of detecting a force or moment component acting on the force receiving member in consideration of detection results of the first to fourth sensors.

(10) The tenth feature of the present invention resides in the force detection device having the ninth feature, wherein:

the first sensor has a function of detecting a state of inclination of the first force transmitting member with respect to the supporting member;

the second sensor has a function of detecting a state of inclination of the second force transmitting member with respect to the supporting member;

the third sensor has a function of detecting a state of inclination of the third force transmitting member with respect to the supporting member; and the fourth sensor has a function of detecting a state of inclination of the fourth force transmitting member with respect to the supporting member.

(11) The eleventh feature of the present invention resides in the force detection device having the tenth feature, wherein:

when an XYZ three-dimensional coordinate system is defined;

each of the first to fourth force transmitting members is arranged from a structure having the Z-axis direction as a longitudinal direction;

the first sensor has a function of detecting an inclination degree in relation to the X-axis direction of the first force transmitting member and an inclination degree in relation to the Y-axis direction of the first force transmitting member;

the second sensor has a function of detecting an inclination degree in relation to the X-axis direction of the second force transmitting member and an inclination degree in relation to the Y-axis direction of the second force transmitting member;

the third sensor has a function of detecting an inclination degree in relation to the X-axis direction of the third force transmitting member and an inclination degree in relation to the Y-axis direction of the third force transmitting member;

the fourth sensor has a function of detecting an inclination degree in relation to the X-axis direction of the fourth force transmitting member and an inclination degree in relation to the Y-axis direction of the fourth force transmitting member; and the detection processing unit, performs a process of detecting an X-axis force component Fx of force that acts on the force receiving member based on a sum of the inclination degrees in relation to the X-axis direction that are detected by the first to fourth sensors, and performs a process of detecting a Y-axis force component Fy of force that acts on the force receiving member based on a sum of the inclination degrees in relation to the Y-axis direction that are detected by the first to fourth sensors.

(12) The twelfth feature of the present invention resides in the force detection device having the tenth feature, wherein:

when an XYZ three-dimensional coordinate system is defined;

each of the first to fourth force transmitting members is arranged from a structure having the Z-axis direction as a longitudinal direction, with the first force transmitting member being positioned in the first quadrant of the XY plane, the second force transmitting member being positioned in the second quadrant of the XY plane, the third force transmitting member being positioned in the third quadrant of the XY plane, and the fourth force transmitting member being positioned in the fourth quadrant of the XY plane;

the first sensor has a function of detecting an inclination degree in relation to the X-axis direction of the first force transmitting member and an inclination degree in relation to the Y-axis direction of the first force transmitting member;

the second sensor has a function of detecting an inclination degree in relation to the X-axis direction of the second force transmitting member and an inclination degree in relation to the Y-axis direction of the second force transmitting member;

the third sensor has a function of detecting an inclination degree in relation to the X-axis direction of the third force transmitting member and an inclination degree in relation to the Y-axis direction of the third force transmitting member;

the fourth sensor has a function of detecting an inclination degree in relation to the X-axis direction of the fourth force transmitting member and an inclination degree in relation to the Y-axis direction of the fourth force transmitting member; and the detection processing unit performs a process of determining, as a first difference, a difference between a sum of the inclination degrees in relation to the X-axis direction that are detected by the third and fourth sensors and a sum of the inclination degrees in relation to the X-axis direction that are detected by the first and second sensors, determining, as a second difference, a difference between a sum of the inclination degrees in relation to the Y-axis direction that are detected by the first and fourth sensors and a sum of the inclination degrees in relation to the Y-axis direction that are detected by the second and third sensors, and detecting a moment component Mz about the Z-axis of force that acts on the receiving member based on a sum of the first difference and the second difference.

(13) The thirteenth feature of the present invention resides in the force detection device having the tenth feature, wherein:

when an XYZ three-dimensional coordinate system is defined;

each of the first to fourth force transmitting members is arranged from a structure having the Z-axis direction as a longitudinal direction, with a longitudinal direction of the first force transmitting member being positioned at a position of intersection with a positive part of the X-axis, a longitudinal direction of the second force transmitting member being positioned at a position of intersection with a negative part of the X-axis, a longitudinal direction of the third force transmitting member being positioned at a position of intersection with a positive part of the Y-axis, and a longitudinal direction of the fourth force transmitting member being positioned at a position of intersection with a negative part of the Y-axis;

the first sensor has a function of detecting an inclination degree in relation to the Y-axis direction of the first force transmitting member;

the second sensor has a function of detecting an inclination degree in relation to the Y-axis direction of the second force transmitting member;

the third sensor has a function of detecting an inclination degree in relation to the X-axis direction of the third force transmitting member;

the fourth sensor has a function of detecting an inclination degree in relation to the X-axis direction of the fourth force transmitting member; and the detection processing unit performs a process of detecting a moment component Mz about the Z-axis of force that acts on the receiving member based on a difference between a sum of the inclination degree in relation to the Y-axis direction detected by the first sensor and the inclination degree in relation to the X-axis direction detected by the fourth sensor and a sum of the inclination degree in relation to the Y-axis direction detected by the second sensor and the inclination degree in relation to the X-axis direction detected by the third sensor.

(14) The fourteenth feature of the present invention resides in the force detection device having the ninth feature, wherein:

the first sensor has a function of detecting a force that is applied from the entirety of the first force transmitting member to the supporting member;

the second sensor has a function of detecting a force that is applied from the entirety of the second force transmitting member to the supporting member;

the third sensor has a function of detecting a force that is applied from the entirety of the third force transmitting member to the supporting member; and the fourth sensor has a function of detecting a force that is applied from the entirety of the fourth force transmitting member to the supporting member.

(15) The fifteenth feature of the present invention resides in the force detection device having the fourteenth feature, wherein:

when an XYZ three-dimensional coordinate system is defined;

each of the first to fourth force transmitting members is arranged from a structure having the Z-axis direction as a longitudinal direction, with the first force transmitting member being positioned in the first quadrant of the XY plane, the second force transmitting member being positioned in the second quadrant of the XY plane, the third force transmitting member being positioned in the third quadrant of the XY plane, and the fourth force transmitting member being positioned in the fourth quadrant of the XY plane;

the first sensor has a function of detecting a force in relation to the Z-axis direction that is applied from the entirety of the first force transmitting member to the supporting member;

the second sensor has a function of detecting a force in relation to the Z-axis direction that is applied from the entirety of the second force transmitting member to the supporting member;

the third sensor has a function of detecting a force in relation to the Z-axis direction that is applied from the entirety of the third force transmitting member to the supporting member;

the fourth sensor has a function of detecting a force in relation to the Z-axis direction that is applied from the entirety of the fourth force transmitting member to the supporting member; and the detection processing unit performs a process of detecting a moment component Mx about the X-axis of force that acts on the force receiving member based on a difference between a sum of the forces in relation to the Z-axis direction that are detected by the first and second sensors and a sum of the forces in relation to the Z-axis direction that are detected by the third and fourth sensors.

(16) The sixteenth feature of the present invention resides in the force detection device having the fifteenth feature, wherein:

the detection processing unit furthermore performs a process of detecting a moment component My about the Y-axis of force that acts on the force receiving member based on a difference between a sum of the forces in relation to the Z-axis direction that are detected by the first and fourth sensors and a sum of the forces in relation to the Z-axis direction that are detected by the second and third sensors.

(17) The seventeenth feature of the present invention resides in the force detection device having the fourteenth feature, wherein:

when an XYZ three-dimensional coordinate system is defined;

each of the first to fourth force transmitting members is arranged from a structure having the Z-axis direction as a longitudinal direction, with a longitudinal direction of the first force transmitting member being positioned at a position of intersection with a positive part of the X-axis, a longitudinal direction of the second force transmitting member being positioned at a position of intersection with a negative part of the X-axis, a longitudinal direction of the third force transmitting member being positioned at a position of intersection with a positive part of the Y-axis, and a longitudinal direction of the fourth force transmitting member being positioned at a position of intersection with a negative part of the Y-axis;

the first sensor has a function of detecting a force in relation to the Z-axis direction that is applied from the entirety of the first force transmitting member to the supporting member;

the second sensor has a function of detecting a force in relation to the Z-axis direction that is applied from the entirety of the second force transmitting member to the supporting member;

the third sensor has a function of detecting a force in relation to the Z-axis direction that is applied from the entirety of the third force transmitting member to the supporting member;

the fourth sensor has a function of detecting a force in relation to the Z-axis direction that is applied from the entirety of the fourth force transmitting member to the supporting member; and the detection processing unit performs a process of detecting a moment component Mx about the X-axis of force that acts on the force receiving member based on a difference between the force in relation to the Z-axis direction detected by the fourth sensor and the force in relation to the Z-axis direction detected by the third sensor.

(18) The eighteenth feature of the present invention resides in the force detection device having the seventeenth feature, wherein:

the detection processing unit furthermore performs a process of detecting a moment component My about the Y-axis of force that acts on the force receiving member based on a difference between the force in relation to the Z-axis direction detected by the first sensor and the force in relation to the Z-axis direction detected by the second sensor.

(19) The nineteenth feature of the present invention resides in the force detection device having the ninth feature, wherein:

the first sensor has a function of detecting a state of inclination of the first supporting member with respect to the supporting member and a function of detecting a force that is applied from the entirety of the first force transmitting member to the supporting member;

the second sensor has a function of detecting a state of inclination of the second supporting member with respect to the supporting member and a function of detecting a force that is applied from the entirety of the second force transmitting member to the supporting member;

the third sensor has a function of detecting a state of inclination of the third supporting member with respect to the supporting member and a function of detecting a force that is applied from the entirety of the third force transmitting member to the supporting member; and the fourth sensor has a function of detecting a state of inclination of the fourth supporting member with respect to the supporting member and a function of detecting a force that is applied from the entirety of the fourth force transmitting member to the supporting member.

(20) The twentieth feature of the present invention resides in the force detection device having the nineteenth feature, wherein:

when an XYZ three-dimensional coordinate system is defined;

each of the first to fourth force transmitting members is arranged from a structure having the Z-axis direction as a longitudinal direction, with the first force transmitting member being positioned in the first quadrant of the XY plane, the second force transmitting member being positioned in the second quadrant of the XY plane, the third force transmitting member being positioned in the third quadrant of the XY plane, and the fourth force transmitting member being positioned in the fourth quadrant of the XY plane;

the first sensor has a function of detecting an inclination degree in relation to the X-axis direction of the first force transmitting member, a function of detecting an inclination degree in relation to the Y-axis direction of the first force transmitting member, and a function of detecting a force in relation to the Z-axis direction that is applied from the entirety of the first force transmitting member to the supporting member;

the second sensor has a function of detecting an inclination degree in relation to the X-axis direction of the second force transmitting member, a function of detecting an inclination degree in relation to the Y-axis direction of the second force transmitting member, and a function of detecting a force in relation to the Z-axis direction that is applied from the entirety of the second force transmitting member to the supporting member;

the third sensor has a function of detecting an inclination degree in relation to the X-axis direction of the third force transmitting member, a function of detecting an inclination degree in relation to the Y-axis direction of the third force transmitting member, and a function of detecting a force in relation to the Z-axis direction that is applied from the entirety of the third force transmitting member to the supporting member;

the fourth sensor has a function of detecting an inclination degree in relation to the X-axis direction of the fourth force transmitting member, a function of detecting an inclination degree in relation to the Y-axis direction of the fourth force transmitting member, and a function of detecting a force in relation to the Z-axis direction that is applied from the entirety of the fourth force transmitting member to the supporting member; and the detection processing unit, performs a process of detecting an X-axis force component Fx of force that acts on the force receiving member based on a sum of the inclination degrees in relation to the X-axis direction that are detected by the first to fourth sensors, performs a process of detecting a Y-axis force component Fy of force that acts on the force receiving member based on a sum of the inclination degrees in relation to the Y-axis direction that are detected by the first to fourth sensors, performs a process of detecting a Z-axis force component Fz of force that acts on the force receiving member based on a sum of the forces in relation to the Z-axis direction that are detected by the first to fourth sensors, performs a process of detecting a moment component Mx about the X-axis of force that acts on the force receiving member based on a difference between a sum of the forces in relation to the Z-axis direction that are detected by the first and second sensors and a sum of the forces in relation to the Z-axis direction that are detected by the third and fourth sensors, performs a process of detecting a moment component My about the Y-axis force that acts on the force receiving member based on a difference between a sum of the forces in relation to the Z-axis direction that are detected by the first and fourth sensors and a sum of the forces in relation to the Z-axis direction that are detected by the second and third sensors, and performs a process of determining, as a first difference, a difference between a sum of the inclination degrees in relation to the X-axis direction that are detected by the third and fourth sensors and a sum of the inclination degrees in relation to the X-axis direction that are detected by the first and second sensors, determining, as a second difference, a difference between a sum of the inclination degrees in relation to the Y-axis direction that are detected by the first and fourth sensors and a sum of the inclination degrees in relation to the Y-axis direction that are detected by the second and third sensors, and detecting a moment component Mz about the Z-axis of force that acts on the receiving member based on a sum of the first difference and the second difference.

(21) The twenty-first feature of the present invention resides in the force detection device having the nineteenth feature, wherein:

when an XYZ three-dimensional coordinate system is defined;

each of the first to fourth force transmitting members is arranged from a structure having the Z-axis direction as a longitudinal direction, with a longitudinal direction of the first force transmitting member being positioned at a position of intersection with a positive part of the X-axis, a longitudinal direction of the second force transmitting member being positioned at a position of intersection with a negative part of the X-axis, a longitudinal direction of the third force transmitting member being positioned at a position of intersection with a positive part of the Y-axis, and a longitudinal direction of the fourth force transmitting member being positioned at a position of intersection with a negative part of the Y-axis;

the first sensor has a function of detecting an inclination degree in relation to the X-axis direction of the first force transmitting member, a function of detecting an inclination degree in relation to the Y-axis direction of the first force transmitting member, and a function of detecting a force in relation to the Z-axis direction that is applied from the entirety of the first force transmitting member to the supporting member;

the second sensor has a function of detecting an inclination degree in relation to the X-axis direction of the second force transmitting member, a function of detecting an inclination degree in relation to the Y-axis direction of the second force transmitting member, and a function of detecting a force in relation to the Z-axis direction that is applied from the entirety of the second force transmitting member to the supporting member;

the third sensor has a function of detecting an inclination degree in relation to the X-axis direction of the third force transmitting member, a function of detecting an inclination degree in relation to the Y-axis direction of the third force transmitting member, and a function of detecting a force in relation to the Z-axis direction that is applied from the entirety of the third force transmitting member to the supporting member;

the fourth sensor has a function of detecting an inclination degree in relation to the X-axis direction of the fourth force transmitting member, a function of detecting an inclination degree in relation to the Y-axis direction of the fourth force transmitting member, and a function of detecting a force in relation to the Z-axis direction that is applied from the entirety of the fourth force transmitting member to the supporting member; and the detection processing unit, performs a process of detecting an X-axis force component Fx of force that acts on the force receiving member based on a sum of the inclination degrees in relation to the X-axis direction that are detected by the first to fourth sensors, performs a process of detecting a Y-axis force component Fy of force that acts on the force receiving member based on a sum of the inclination degrees in relation to the Y-axis direction that are detected by the first to fourth sensors, performs a process of detecting a Z-axis force component Fz of force that acts on the force receiving member based on a sum of the forces in relation to the Z-axis direction that are detected by the first to fourth sensors, performs a process of detecting a moment component Mx about the X-axis of force that acts on the force receiving member based on a difference between the force in relation to the Z-axis direction detected by the fourth sensor and the force in relation to the Z-axis direction detected by the third sensor, performs a process of detecting a moment component My about the Y-axis of force that acts on the force receiving member based on a difference between the force in relation to the Z-axis direction detected by the first sensor and the force in relation to the Z-axis direction detected by the second sensor, and performs a process of detecting a moment component Mz about the Z-axis of force that acts on the receiving member based on a difference between a sum of the inclination degree in relation to the Y-axis direction detected by the first sensor and the inclination degree in relation to the X-axis direction detected by the fourth sensor and a sum of the inclination degree in relation to the Y-axis direction detected by the second sensor and the inclination degree in relation to the X-axis direction detected by the third sensor.

(22) The twenty-second feature of the present invention resides in the force detection device having the first feature, further comprising:

a third force transmitting member having an upper end thereof connected to the force receiving member and a lower end thereof connected via a connecting member, having flexibility, to the supporting member; and a fourth force transmitting member having an upper end thereof connected to the force receiving member and a lower end thereof connected via a connecting member, having flexibility, to the supporting member; and having a structure wherein the force receiving member is supported with respect to the supporting member by means of the four force transmitting members.

(23) The twenty-third feature of the present invention resides in the force detection device having the twenty-second feature, wherein:

when an XYZ three-dimensional coordinate system is defined;

each of the first to fourth force transmitting members is arranged from a structure having the Z-axis direction as a longitudinal direction, with a longitudinal direction of the first force transmitting member being positioned at a position of intersection with a positive part of the X-axis, a longitudinal direction of the second force transmitting member being positioned at a position of intersection with a negative part of the X-axis, a longitudinal direction of the third force transmitting member being positioned at a position of intersection with a positive part of the Y-axis, and a longitudinal direction of the fourth force transmitting member being positioned at a position of intersection with a negative part of the Y-axis.

(24) The twenty-fourth feature of the present invention resides in the force detection device having the twenty-second feature, wherein:

when an XYZ three-dimensional coordinate system is defined;

each of the first to fourth force transmitting members is arranged from a structure having the Z-axis direction as a longitudinal direction, with the first force transmitting member being positioned in the first quadrant of the XY plane, the second force transmitting member being positioned in the second quadrant of the XY plane, the third force transmitting member being positioned in the third quadrant of the XY plane, and the fourth force transmitting member being positioned in the fourth quadrant of the XY plane.

(25) The twenty-fifth feature of the present invention resides in the force detection device having the first feature, further comprising:

a third force transmitting member having an upper end thereof connected to the force receiving member and a lower end thereof connected via a connecting member, having flexibility, to the supporting member; and a third sensor for detecting force applied from the third force transmitting member to the supporting member; and wherein the detection processing unit performs a process of detecting a force or a moment component acting on the force receiving member in consideration of the detection results of the first to third sensors.

(26) The twenty-sixth feature of the present invention resides in the force detection device having the twenty-fifth feature, wherein:

the first sensor has a function of detecting a state of inclination of the first force transmitting member with respect to the supporting member;

the second sensor has a function of detecting a state of inclination of the second force transmitting member with respect to the supporting member; and the third sensor has a function of detecting a state of inclination of the third force transmitting member with respect to the supporting member.

(27) The twenty-seventh feature of the present invention resides in the force detection device having the twenty-sixth feature, wherein:

when an XYZ three-dimensional coordinate system is defined;

each of the first to third force transmitting members is arranged from a structure having the Z-axis direction as a longitudinal direction;

the first sensor has a function of detecting an inclination degree in relation to the X-axis direction of the first force transmitting member and an inclination degree in relation to the Y-axis direction of the first force transmitting member;

the second sensor has a function of detecting an inclination degree in relation to the X-axis direction of the second force transmitting member and an inclination degree in relation to the Y-axis direction of the second force transmitting member;

the third sensor has a function of detecting an inclination degree in relation to the X-axis direction of the third force transmitting member and an inclination degree in relation to the Y-axis direction of the third force transmitting member; and the detection processing unit, performs a process of detecting an X-axis force component Fx of force that acts on the force receiving member based on a sum of the inclination degrees in relation to the X-axis direction that are detected by the first to third sensors, and performs a process of detecting a Y-axis force component Fy of force that acts on the force receiving member based on a sum of the inclination degrees in relation to the Y-axis direction that are detected by the first to third sensors.

(28) The twenty-eighth feature of the present invention resides in the force detection device having the twenty-sixth feature, wherein:

when an XYZ three-dimensional coordinate system is defined;

each of the first to third force transmitting members is arranged from a structure having the Z-axis direction as a longitudinal direction, with the first force transmitting member being positioned at a position at which a longitudinal direction thereof intersects with a positive part of the Y-axis, the second force transmitting member being positioned in the third quadrant of the XY plane, and the third force transmitting member being positioned in the fourth quadrant of the XY plane;

the first sensor has a function of detecting an inclination degree in relation to the X-axis direction of the first force transmitting member;

the second sensor has a function of detecting an inclination degree in relation to the X-axis direction of the second force transmitting member and an inclination degree in relation to the Y-axis direction of the second force transmitting member;

the third sensor has a function of detecting an inclination degree in relation to the X-axis direction of the third force transmitting member and an inclination degree in relation to the Y-axis direction of the third force transmitting member; and the detection processing unit performs a process of determining a first difference by subtracting the inclination degree in relation to the X-axis direction detected by the first sensor from a sum of the inclination degrees in relation to the X-axis direction that are detected by the second and third sensors, determining a second difference by subtracting the inclination degree in relation to the Y-axis direction detected by the second sensor from the inclination degree in relation to the Y-axis direction detected by the third sensor, and detecting a moment component Mz about the Z-axis of force that acts on the receiving member based on a sum of the first difference and the second difference.

(29) The twenty-ninth feature of the present invention resides in the force detection device having the twenty-fifth feature, wherein:

the first sensor has a function of detecting a force that is applied from the entirety of the first force transmitting member to the supporting member;

the second sensor has a function of detecting a force that is applied from the entirety of the second force transmitting member to the supporting member, and the third sensor has a function of detecting a force that is applied from the entirety of the third force transmitting member to the supporting member.

(30) The thirtieth feature of the present invention resides in the force detection device having the twenty-ninth feature, wherein:

when an XYZ three-dimensional coordinate system is defined;

each of the first to third force transmitting members is arranged from a structure having the Z-axis direction as a longitudinal direction, with the first force transmitting member being positioned at a position at which a longitudinal direction thereof intersects with a positive part of the Y-axis, the second force transmitting member being positioned in the third quadrant of the XY plane, and the third force transmitting member being positioned in the fourth quadrant of the XY plane;

the first sensor has a function of detecting a force in relation to the Z-axis direction that is applied from the entirety of the first force transmitting member to the supporting member;

the second sensor has a function of detecting a force in relation to the Z-axis direction that is applied from the entirety of the second force transmitting member to the supporting member;

the third sensor has a function of detecting a force in relation to the Z-axis direction that is applied from the entirety of the third force transmitting member to the supporting member; and the detection processing unit performs a process of detecting a moment component Mx about the X-axis of force that acts on the force receiving member based on a difference between the force in relation to the Z-axis direction detected by the first sensor and the forces in relation to the Z-axis direction that are detected by the second and third sensors.

(31) The thirty-first feature of the present invention resides in the force detection device having the twenty-fifth feature, wherein:

the first sensor has a function of detecting a state of inclination of the first supporting member with respect to the supporting member and a function of detecting a force that is applied from the entirety of the first force transmitting member to the supporting member;

the second sensor has a function of detecting a state of inclination of the second supporting member with respect to the supporting member and a function of detecting a force that is applied from the entirety of the second force transmitting member to the supporting member; and the third sensor has a function of detecting a state of inclination of the third supporting member with respect to the supporting member and a function of detecting a force that is applied from the entirety of the third force transmitting member to the supporting member.

(32) The thirty-second feature of the present invention resides in the force detection device having the thirty-first feature, wherein:

when an XYZ three-dimensional coordinate system is defined;

each of the first to third force transmitting members is arranged from a structure having the Z-axis direction as a longitudinal direction, with the first force transmitting member being positioned at a position at which the longitudinal direction thereof intersects with a positive part of the Y-axis, the second force transmitting member being positioned in the third quadrant of the XY plane, and the third force transmitting member being positioned in the fourth quadrant of the XY plane, the first sensor has a function of detecting an inclination degree in relation to the X-axis direction of the first force transmitting member, a function of detecting an inclination degree in relation to the Y-axis direction of the first force transmitting member, and a function of detecting a force in relation to the Z-axis direction that is applied from the entirety of the first force transmitting member to the supporting member;

the second sensor has a function of detecting an inclination degree in relation to the X-axis direction of the second force transmitting member, a function of detecting an inclination degree in relation to the Y-axis direction of the second force transmitting member, and a function of detecting a force in relation to the Z-axis direction that is applied from the entirety of the second force transmitting member to the supporting member;

the third sensor has a function of detecting an inclination degree in relation to the X-axis direction of the third force transmitting member, a function of detecting an inclination degree in relation to the Y-axis direction of the third force transmitting member, and a function of detecting a force in relation to the Z-axis direction that is applied from the entirety of the third force transmitting member to the supporting member; and the detection processing unit, performs a process of detecting an X-axis force component Fx of force that acts on the force receiving member based on a sum of the inclination degrees in relation to the X-axis direction that are detected by the first to third sensors;

performs a process of detecting a Y-axis force component Fy of force that acts on the force receiving member based on a sum of the inclination degrees in relation to the Y-axis direction that are detected by the first to third sensors;

performs a process of detecting a Z-axis force component Fz of force that acts on the force receiving member based on a sum of the forces in relation to the Z-axis direction that are detected by the first to third sensors;

performs a process of detecting a moment component Mx about the X-axis of force that acts on the force receiving member based on a difference between the force in relation to the Z-axis direction detected by the first sensor and the forces in relation to the Z-axis direction that are detected by the second and third sensors;

performs a process of detecting a moment component My about the Y-axis of force that acts on the force receiving member based on a difference between the force in relation to the Z-axis direction detected by the third sensor and the force in relation to the Z-axis direction detected by the second sensor; and performs a process of determining a first difference by subtracting the inclination degree in relation to the X-axis direction detected by the first sensor from a sum of the inclination degrees in relation to the X-axis direction that are detected by the second and third sensors, determining a second difference by subtracting the inclination degree in relation to the Y-axis direction detected by the second sensor from the inclination degree in relation to the Y-axis direction detected by the third sensor, and detecting a moment component Mz about the Z-axis of force that acts on the receiving member based on a sum of the first difference and the second difference.

(33) The thirty-third feature of the present invention resides in the force detection device having any one of the first to the thirty-second features, wherein:

each force transmitting member is formed of a columnar member, a bottom surface of each force transmitting member is joined to a center of a diaphragm that functions as the connecting member, and each force transmitting member is connected to the supporting member by fixing a circumference of each the diaphragm to the supporting member.

(34) The thirty-fourth feature of the present invention resides in the force detection device having any one of the first to the thirty-third features, wherein:

each sensor has a function of detecting a force applied from a first part of the lower end of the force transmitting member and a force applied from a second part of the lower end of the force transmitting member and detects an inclination degree of the force transmitting member with respect to the supporting member based on a difference between the two forces.

(35) The thirty-fifth feature of the present invention resides in the force detection device having any one of the first to the thirty-fourth features, wherein:

each sensor has a capacitance element, comprising a fixed electrode fixed to a top surface of the supporting member, and a displaceable electrode fixed to a displaceable surface displaced by a bottom of a force transmitting member, and performs force detection based on a static capacitance value of the capacitance element.

(36) The thirty-sixth feature of the present invention resides in the force detection device having the thirty-fifth feature, wherein:

diaphragms having flexibility and conductivity are used as connecting members, each force transmitting member is connected to the supporting member by joining the bottom of the force transmitting member to a center of a diaphragm and fixing a circumference of the diaphragm to the supporting member, and each the diaphragm is used in itself as a displaceable electrode.

(37) The thirty-seventh feature of the present invention resides in the force detection device having the thirty-sixth feature, wherein:

each force transmitting member is formed of a columnar member, and when an xy two-dimensional coordinate system is defined with an origin being set at an intersection of a line of extension of an axial center of the force transmitting member and the top surface of the supporting member;

a first fixed electrode and a second fixed electrode are positioned at a positive part and a negative part, respectively, of an x-axis on the top surface of the supporting member, a third fixed electrode and a fourth fixed electrode are positioned at a positive part and a negative part, respectively, of a y-axis on the top surface of the supporting member;

first to fourth capacitance elements are arranged from a displaceable electrode, formed of a diaphragm, and the first to fourth fixed electrodes, an inclination degree in relation to the x-axis direction of the force transmitting member is detected based on a difference between a static capacitance value of the first capacitance element and a static capacitance value of the second capacitance element, an inclination degree in relation to the y-axis direction of the force transmitting member is detected based on a difference between a static capacitance value of the third capacitance element and a static capacitance value of the fourth capacitance element, and the detection processing unit uses detection results to perform a process of detecting a force or moment component.

(38) The thirty-eighth feature of the present invention resides in the force detection device having the thirty-seventh feature, wherein:

a fifth fixed electrode is furthermore positioned near the origin on the top surface of the supporting member, a fifth capacitance element is arranged from a displaceable electrode formed of the diaphragm and the fifth fixed electrode, a force applied to the supporting member from the entirety of the force transmitting member is detected based on a static capacitance value of the fifth capacitance element, and the detection processing unit uses a detection result to perform a process of detecting a force or moment component.

(39) The thirty-ninth feature of the present invention resides in the force detection device having any one of the thirty-sixth to the thirty-eighth features, further comprising:

an auxiliary base plate having openings for passing through the force transmitting members and being fixed to the supporting member so as to be positioned above the diaphragms; and wherein each sensor has an auxiliary capacitance element, comprising a fixed electrode fixed to a bottom surface of the auxiliary base plate and a displaceable electrode formed of the diaphragm in itself, and performs force detection using a static capacitance value of the auxiliary capacitance element.

(40) The fortieth feature of the present invention resides in the force detection device having the thirty-ninth feature, wherein:

a part or all of the fixed electrodes fixed onto the bottom surface of the auxiliary base plate are in mirror image relationships with a part or all of the fixed electrodes fixed onto the top surface of the supporting member.

(41) The forty-first feature of the present invention resides in the force detection device having any one of the thirty-fifth to the fortieth features, wherein:

the detection processing unit is arranged from wirings that electrically connect a plurality of capacitance elements.

(42) The forty-second feature of the present invention resides in the force detection device having any one of the first to the forty-first features, wherein:

the upper end of each force transmitting member is connected to the force receiving member via a connecting member having flexibility.

(43) The forty-third feature of the present invention resides in the force detection device having the forty-second feature, wherein:

the force receiving member is arranged from a plate-like member, each force transmitting member is arranged from a columnar member, and the connecting members, for connecting the force receiving member with the respective force transmitting members, are arranged from thin parts of the plate-like force receiving member.

(44) The forty-fourth feature of the present invention resides in the force detection device having the forty-second feature, further comprising:

auxiliary sensors for detecting forces applied from the respective force transmitting members to the force receiving member; and the detection processing unit performs a process of detecting a force or moment component acting on the force receiving member by further taking into consideration detection results of the auxiliary sensors.

(45) The forty-fifth feature of the present invention resides in the force detection device having the forty-fourth feature:

the device having a structure, wherein the sensors for detecting forces applied from the force transmitting members to the supporting member, and the auxiliary sensors for detecting forces applied from the force transmitting members to the force receiving member, are put in mirror image relationships; and wherein the detection processing unit performs a process in consideration of the mirror image relationships.

(46) The forty-sixth feature of the present invention resides in the force detection device having the forty-fourth or the forty-fifth feature, wherein:

each force transmitting member is formed of a columnar member and each force transmitting member is connected to the force receiving member by joining a top surface of the force transmitting member to a center of a diaphragm functioning as a connecting member, and fixing a circumference of the diaphragm to the force receiving member.

(47) The forty-seventh feature of the present invention resides in the force detection device having any one of the first to the forty-sixth features, wherein:

restricting members are provided for restricting displacements of the force receiving member with respect to the supporting member within predetermined ranges.

BRIEF DESCRIPTION OF THE DRAWINGS

FIG. 13 is a table illustrating the principles of detection of the respective force components by the force detection device shown in FIG. 9 and showing the modes of variation of the static capacitance values of the respective capacitance elements when the respective force components act on a force receiving member 100.

FIGS. 19A and 19B are tables illustrating the principles of detection of the respective force components by the force detection device shown in FIG. 17 and showing the modes of variation of the static capacitance values of the respective capacitance elements when the respective force components act on a force receiving member 100.

FIGS. 22A and 22B are tables illustrating the principles of detection of the respective force components by the force detection device shown in FIG. 21 and showing the modes of variation of the static capacitance values of the respective capacitance elements when the respective force components act on a force receiving member 100.

FIGS. 36A and 36B are tables illustrating the principles of detection of the respective force components by the force detection device shown in FIG. 35 and showing the modes of variation of the static capacitance values of the respective capacitance elements when the respective force components act on a force receiving member 100.

DESCRIPTION OF THE PREFERRED EMBODIMENTS

The present invention shall now be described based on the illustrated embodiments.

<<<§1. Basic Concepts>>>

Figure 1:
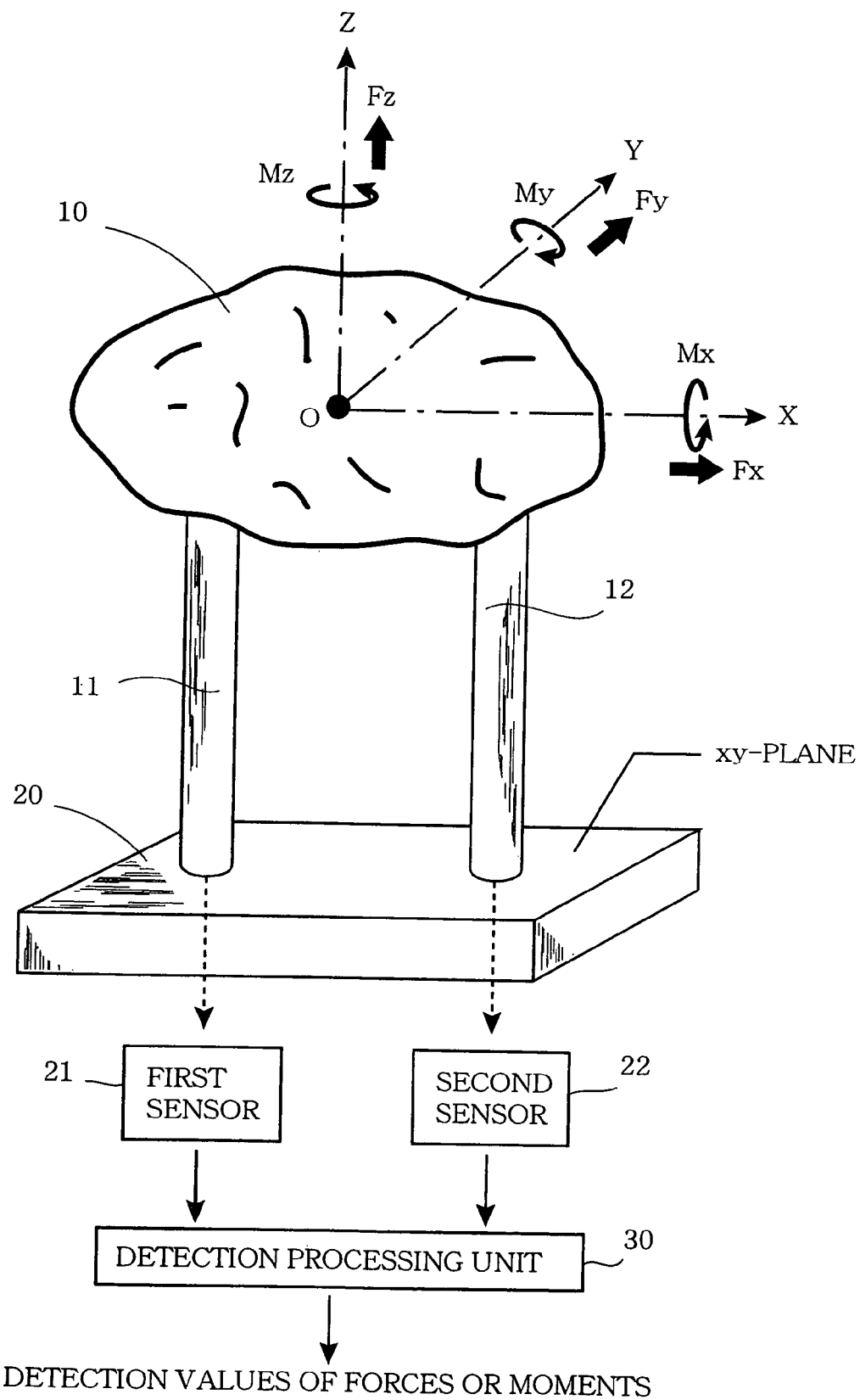
FIG. 1 is a perspective view (partially in block diagram) showing the basic arrangement of the force detection device according to the present invention.

First, the basic concepts of the force detection device according to the present invention shall be described. As shown in FIG. 1, the basic components of the force detection device of the invention are a force receiving member 10, a first force transmitting member 11, a second force transmitting member 12, a supporting member 20, a first sensor 21, a second sensor 22, and a detection processing unit 30.

Force receiving member 10 is a component that receives forces that are to be detected, and here, for the sake of description, an origin O is defined at a central position of force receiving member 10 and an XYZ three-dimensional coordinate system is defined as illustrated. Though force receiving member 10 with an arbitrary shape is drawn in the illustrated example, in each of the specific embodiments to be described later, a plate-like force receiving member 10 is used. The force components that act on force receiving body 10 are force components Fx, Fy, and Fz of the respective coordinate axis directions of the coordinate system and moment components Mx, My, and Mz about the respective coordinate axes. As shall be described later, of the above-mentioned six force components, the four components of Fx, Fz, Mx, and My can be detected with the force detection device shown in FIG. 1.

In the present Application, the term "force" may be used as suitable to refer to a force in the direction of a specific coordinate axis or as a collective force that includes the moment components. For example, whereas in FIG. 1, forces Fx, Fy, and Fz refer to the force components in the direction of the respective coordinate axes and not moments, in the case of the expression, "the six forces of Fx, Fy, Fz, Mx, My, and Mz," the term "force" shall refer to the collective force that includes the force components in the respective coordinate axis directions and the moment components about the respective coordinate axes.

Supporting member 20 is a component that is positioned below force receiving member 10 and serves the function of supporting force receiving member 10. Though a plate-like supporting member 20 is drawn in the illustrated example, supporting member 20 does not necessarily have to be plate-like in form. However, in terms of performing the detection of forces in relation to the respective coordinate axes X, Y, and Z by means of first sensor 21 and second sensor 22 as shall be described later, the use of supporting member 20 with a top surface that is parallel to the XY plane of the abovementioned XYZ three-dimensional coordinate system is preferable and a plate-like form is thus preferable in terms of practical use. Here, for the sake of description, an xy plane shall be defined on the top surface of supporting member 20. The x-axis and the X-axes are parallel and the y-axis and the Y-axis are parallel.

First force transmitting member 11 and second force transmitting member 12 are members connecting force receiving member 10 and supporting member 20 and are structures that are positioned along the Z-axis, and, moreover, these two members are positioned in parallel with a predetermined interval between each other in the x-axis direction. Though in the illustrated example, these force transmitting members 11 and 12 are both columnar structures, in principle, these may be arranged as structures of any arbitrary shape. However, for practical use, columnar structures, such as those illustrated, are preferable in that simple structures are thereby realized. Also for practical use, first force transmitting member 11 and second force transmitting member 12 are preferably made of exactly the same material and to exactly the same size. This is because by making both components the same in material and size, the sensitivities of detection by first sensor 21 and by second sensor 22 can be made equal. If the components differ in material and size, it becomes difficult to make the sensors equal in sensitivity and measures for sensitivity correction become necessary.

What are important here are that the upper end of each of force transmitting members 11 and 12 is connected to force receiving member 10 via a connecting member (not shown in the Figure) having flexibility and that the lower end of each of force transmitting members 11 and 12 is connected to supporting member 20 via a connecting member (not shown in the Figure) having flexibility. That is, first force transmitting member 11 and second force transmitting member 12 are connected with flexibility to force receiving member 10 and to supporting member 20. Here, flexibility is the same in definition as elasticity, and whereas in a state in which no force whatsoever is acting on force receiving member 10, force receiving member 10 takes a fixed position with respect to supporting member 20, when a force of some form acts on force receiving member 10, the connecting members with flexibility undergo elastic deformation and a change occurs in the relative position of force receiving member 10 with respect to supporting member 20. Obviously, when the force that is acting on force receiving member 10 is eliminated, force receiving member 10 returns to the original fixed position.

Thus in the case of the example shown in FIG. 1, the upper end parts and the lower end parts of columnar first force transmitting member 11 and second force transmitting member 12 are respectively formed of connecting members with flexibility (obviously, the entireties of first force transmitting member 11 and second transmitting member 12 may be formed of a material with flexibility). Since these connecting members undergo elastic deformation to some degree, first force transmitting member 11 and second force transmitting member 12 can become inclined with respect to force receiving member 10 and supporting member 20. These connecting members can also be elongated and shrunken in the vertical direction (Z-axis direction) of the Figure, and when force receiving member 10 is moved in the upward direction (positive Z-axis direction) of the Figure, the connecting members become elongated, causing the distance between force receiving member 10 and supporting member 20 to increase, and oppositely, when force receiving member 10 is moved in the downward direction (negative Z-axis direction) of the Figure, the connecting members are shrunken, causing the distance between force receiving member 10 and supporting member 20 to decrease. Obviously, the degrees of such displacements and inclinations increase in accordance to the magnitude of a force acting on force receiving member 10.

First sensor 21 is a sensor that detects a force that is applied towards supporting member 20 from first force transmitting member 11 and second sensor 22 is a sensor that detects a force that is applied towards supporting member 20 from second force transmitting member 12. As mentioned above, when a force acts on force receiving member 10, this force is transmitted via first force transmitting member 11 and second force transmitting member 12 to supporting member 20. First sensor 21 and second sensor 22 have a function of detecting forces that are transmitted in this manner, and to be more specific and as shall be described in detail later, have a first function of detecting inclination degrees of the force transmitting members by detecting the forces resulting from the inclinations of the force transmitting members, and a second function of detecting a pressing force (a force in the negative Z-axis direction that is directed downwards in the Figure) or a pulling force (a force in the positive Z-axis direction that is directed upwards in the Figure) that the force transmitting members apply as a whole to the supporting member.

Detection processing unit 30 is a component that performs processes of detecting forces and moments that act on force receiving member 10 in consideration of both the detection result of first sensor 21 and the detection result of second sensor 22. Actually the detection of a force or a moment is performed based on the abovementioned inclination degrees of the force transmitting members and the pressing/pulling force applied to the supporting member. The specific methods therefor shall be described later.

Figure 2A:
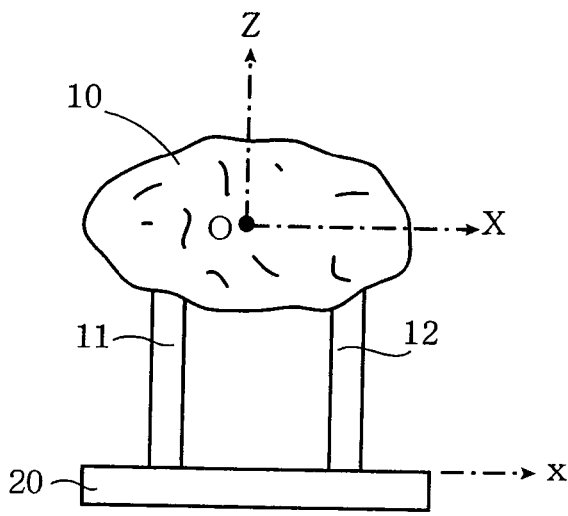
FIGS. 2A to 2C are front views showing the basic operation principle of the force detection device shown in FIG. 1.

The basic operation principles of the force detection device shown in FIG. 1 shall now be described with reference to the front views of FIGS. 2A to 2C. FIG. 2A shows a state where no force whatsoever is acting on this force detection device and in this state, force receiving member 10 is maintained at a fixed position with respect to supporting member 20. Obviously, since the weight of force receiving member 10, etc., is applied to supporting member 20 even in this state, supporting member 20 receives some form of force from first force transmitting member 11 and second force transmitting member 12. However, since the force that is received in this state is a force in the stationary state, even if such a force is detected by first sensor 21 and second sensor 22, the detection values of forces and moments that are output from detection processing unit 30 will be zero. In other words, detection processing unit 30 has a function of using the detection results of the respective sensors 21 and 22 in such a stationary state as references and detecting, when a change occurs with respect to these references, the change as a force or moment acting on force receiving member 10.

Figure 2B:
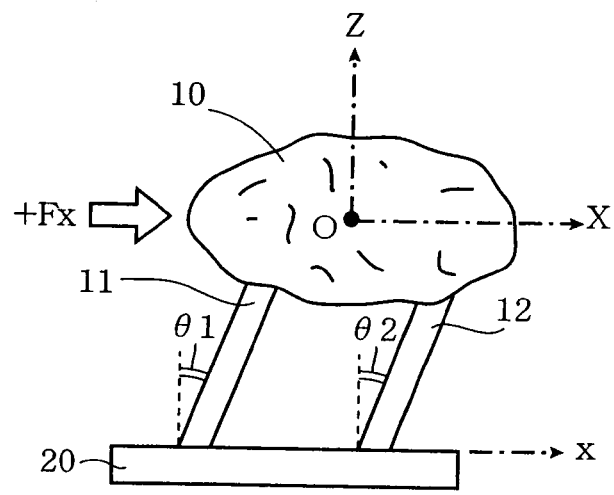

Here, a case, where a positive X-axis direction force +Fx acts on force receiving member 10 as shown in FIG. 2B, shall be considered first. This corresponds to a case where a force that pushes the position of origin O towards the right side of the Figure is applied. In this case, force receiving member 10 undergoes a sliding motion toward the right side of the Figure and first force transmitting member 11 and second force transmitting member 12 become inclined towards the right side of the Figure as illustrated. Here, the inclination degree of first transmitting member 11 shall be referred to as θ1 and the inclination degree of second transmitting member 12 shall be referred to as θ2. Also, these angles θ1 and θ2, which indicate the degrees of inclination in the direction of the x-axis in the XZ plane, shall be referred to as "inclination degrees in relation to the X-axis direction." Likewise, angles, which indicate the degrees of inclination in the direction of the y-axis in the YZ plane, shall be referred to as "inclination degrees in relation to the Y-axis direction." With the illustrated example, since the two force transmitting members 11 and 12 are disposed in parallel along the x-axis, the inclination degrees in the Y-axis direction are zero.

Strictly speaking, the distance between force receiving member 10 and supporting member 20 decreases slightly when the respective force transmitting members 11 and 12 become inclined, and force receiving member 10 thus does not undergo a completely parallel movement in the X-axis direction but moves slightly in the negative Z-axis direction as well. However, since the amount of movement in the negative Z-axis direction can be neglected when the inclination degrees are comparatively small, it shall be considered here, for the sake of description, that force receiving member 10 moves in just the X-axis direction.

Figure 2C:
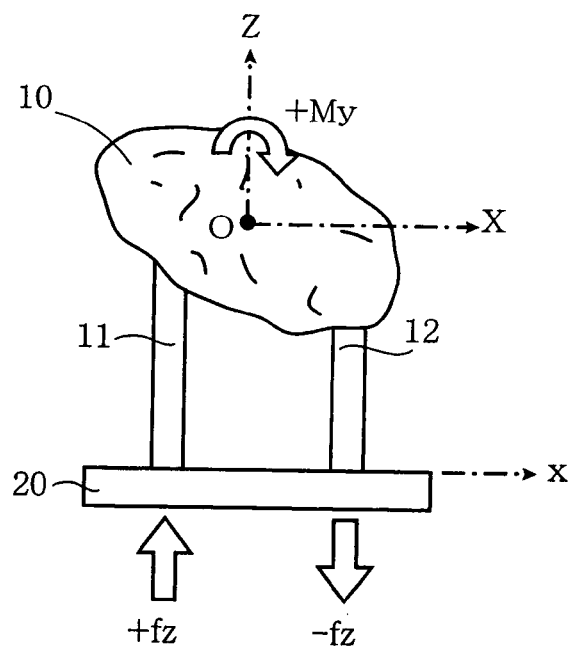

A case where a moment +My about the Y-axis acts on force receiving member 10 as shown in FIG. 2C shall now be considered. In FIG. 2C, since the Y-axis is a perpendicular direction axis that is directed towards the rear side of the paper surface in the Figure, the moment +My corresponds to a force that rotates the entirety of force receiving member 10 in the clockwise direction about origin O. In the present Application, a positive direction moment about a certain coordinate axis shall be defined as being in the direction of rotation of a right-handed screw in the case where the right-handed screw is advanced in the positive direction of the coordinate axis. In the present case, an elongating force acts on first force transmitting member 11 and a shrinking force acts on second force transmitting member 12 as illustrated. Thus a pulling force (a force in the positive Z-axis direction; this is indicated as a force +fz here) acts on supporting member 20 from first force transmitting member 11 and a pressing force (a force in the negative Z-axis direction; this is indicated as a force −fz here) acts on supporting member 20 from second force transmitting member 12.

Thus with the force detection device of the present invention, the modes of the forces that are transmitted to supporting member 20 via the two force transmitting members 11 and 12 differ between the case where an X-axis direction force Fx acts on force receiving member 10 and the case where a moment My about the Y-axis acts. The two can thus be distinguished and detected separately.

That is, when an X-axis direction force Fx acts, the two force transmitting members 11 and 12 become inclined in the X-axis direction and give rise to inclination degrees θ1 and θ2 and forces corresponding to such inclinations are transmitted to supporting member 20. Here, when first force transmitting member 11 and second force transmitting member 12 are made the same in material and size, the connecting members, which have flexibility and connect the force transmitting members to supporting member 20, are made the same in material and size, and a structure by which this force detection device is laterally symmetrical with respect to the Z-axis in the Figure is arranged, inclination degree θ1 equals inclination degree θ2. The value of the sum, (<θ1+θ2), will thus indicate the force Fx in the X-axis direction. By handling each inclination degree θ with a sign attached (for example, by deeming an inclination in the positive X-axis direction to be positive and an inclination in the negative X-axis direction to be negative), an X-axis direction force Fx that acts can be detected along with its sign.

As shall be described below, with this invention, the inclination degrees of first force transmitting member 11 and second force transmitting member 12 are detected by first sensor 21 and second sensor 22 as forces that are applied to supporting member 20. To perform such detection, the forces that are applied to supporting member 20 from the respective force transmitting members are detected according to each part. For example, with regard to the stresses that arise at the connecting part of first force transmitting member 11 and supporting member 20 in FIG. 2B, it can be understood that the right side part and the left side part of the bottom part of first force transmitting member 11 differ in the direction of the stress that arises. That is, with the illustrated example, since first force transmitting member 11 is inclined towards the right, whereas a pressing force, that is, a force that presses the top surface of supporting member 20 downwards arises at the right side part of the bottom part of first force transmitting member 11, a pulling force, that is, a force that pulls the top surface of supporting member 20 upwards arises at the left side part. By detecting such differences in the stresses that arise at the respective left and right parts of the bottom part of first force transmitting member 11, the inclination degree of first transmitting member 11 can be obtained. A specific method therefor shall be described in detail in §2.

Thus with the force detection device of the invention, for detection of an X-axis direction force Fx, first sensor 21 is provided with a function of detecting the inclination state in the x-axis direction of first force transmitting member 11 with respect to supporting member 20 and second sensor 22 is provided with the function of detecting the inclination state in the x-axis direction of second force transmitting member 12 with respect to supporting member 20. If first sensor 21 has a function of detecting the inclination degree θ1 in relation to the X-axis direction of first force transmitting member 11 and second sensor 22 has a function of detecting the inclination degree in relation to the X-axis direction of second force transmitting member 12, detection processing unit 30 can perform the process of detecting the X-axis direction component Fx of a force, acting on force receiving member 10, based on the sum of the inclination degree θ1 in relation to the X-axis direction that is detected by first sensor 21 and the inclination degree θ2 in relation to the X-axis direction that is detected by second sensor 22.

Meanwhile, when a moment My about the Y-axis acts, a pulling force +fz and a pressing force −fz are transmitted to supporting member 20 from the two force transmitting members 11 and 12 as shown in FIG. 2C. The forces that are thus transmitted differ from the forces in a case where the force transmitting members become inclined. That is, in a case where the force transmitting members become inclined as shown in FIG. 2B, the stresses that arise at the bottom part differ at a right side part and at a left side part. However, when a moment My acts as shown in FIG. 2C, a pulling force +fz is applied by the entirety of first force detection member 11 and a pressing force −fz is applied by the entirety of second force detection member 12.

Thus whereas with the action of an X-axis direction force Fx, first force transmitting member 11 and second force transmitting member 12 are subject to equivalent phenomena, that is, inclinations in the same direction as shown in FIG. 2B, with the action of a moment My about the Y-axis, first force transmitting member 11 and second force transmitting member 12 are subject to mutually opposite phenomena wherein a pulling force +fz is applied to one and a pushing force −fz is applied to the other as shown in FIG. 2C. The moment My that acts can thus be determined as the difference of the pulling force +fz and the pushing force −fz, that is, as (+fz)−(−fz)=2 fz.

That is, for detection of a moment My about the Y-axis with the force detection device of the present invention, first sensor 21 is provided with a function of detecting a force that is applied from the entirety of first transmitting member 11 to supporting member 20 and second sensor 22 is provided with a function of detecting a force that is applied from the entirety of second transmitting member 12 to supporting member 20. If first sensor 21 has the function of detecting a force that is applied from the entirety of first transmitting member 11 to supporting member 20 and second sensor 22 has the function of detecting a force that is applied from the entirety of second transmitting member 12 to supporting member 20, detection processing unit 30 can perform the process of detecting a moment My about the Y-axis that acts on force receiving member 10 based on the difference between the force in relation to the Z-axis direction that is detected by first sensor 21 and the force in relation to the Z-axis direction that is detected by second sensor 22.

<<<§2. Force Sensors Used in this Invention>>>

The force detection device shown in FIG. 1 is provided with first sensor 21 and second sensor 22. These sensors are force sensors that detect forces applied from first force transmitting member 11 and second force transmitting member 12, respectively, to supporting member 20, and the detections of a force Fx and a moment My based on the principles described with FIG. 2 require functions that enable each of the forces due to the inclinations of the respective force transmitting members 11 and 12 and the pulling force/pushing force applied by the entireties of force transmitting members 11 and 12 to be detected independently.

Figure 3:
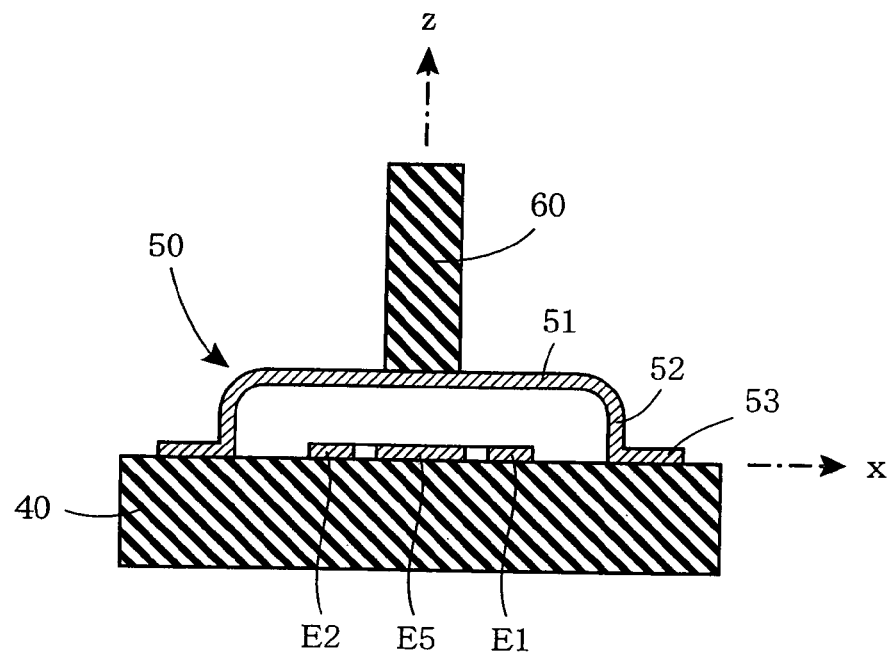
FIG. 3 is a side view in section (section across the xz plane) showing an example of a multi-axis force sensor that is suitable as a first sensor 21 and a second sensor 22 in the force detection device shown in FIG. 1.

The present inventor considers that multi-axis force sensors of static capacitance element type are most suitable as sensors with the above functions. FIG. 3 is a side view in section showing an example of such a static capacitance element type multi-axis force sensor. Though this multi-axis force sensor in itself is a known sensor and is put to practical use in various uses, the basic structure and operations of this multi-axis force sensor shall be described briefly here.

Figure 4:
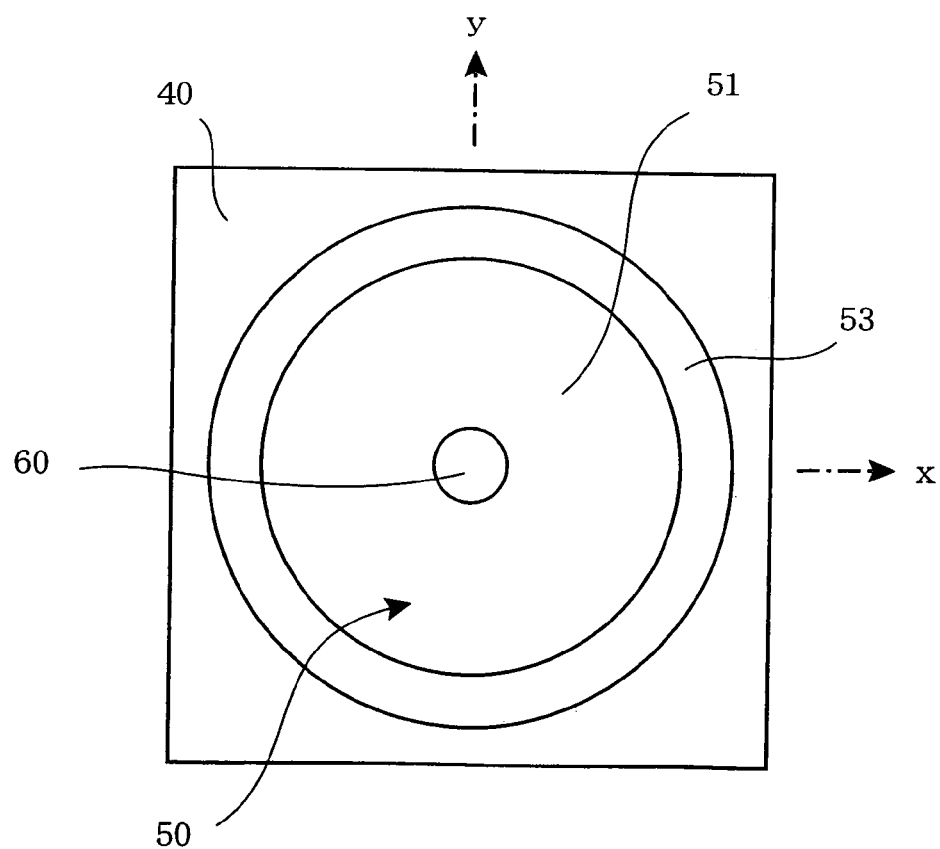
FIG. 4 is a top view of the multi-axis force sensor shown in FIG. 3.

As shown in the side view in section of FIG. 3, this multi-axis force sensor comprises a plate-like supporting member 40, a bowl-like connecting member 50, disposed above the supporting member, a force transmitting member 60, and fixed electrodes E1 to E5, disposed on the top surface of supporting member 40. As shown in the top view of FIG. 4, bowl-like connecting member 50 has a shape of a circular bowl, which has a flat bottom and is set upside down. Here, for the sake of description, an origin O is defined at a central position of the top surface of supporting member 40 and an xyz three-dimensional coordinate system, having x, y, and z-axis in the illustrated directions, is defined. As shown in the side view in section of FIG. 3, bowl-like connecting member 50 comprises the respective parts of a disc-like diaphragm 51, corresponding to the flat bottom part of a bowl, a cylindrical side wall part 52, that supports the periphery of the diaphragm, and fixing part 53 for fixing side wall part 52 to the top surface of supporting member 40, and a cylindrical force transmitting member 60 is connected to a central part of the top surface of diaphragm 51. Origin O is defined at a position of the intersection of the line of extension of the axial center of the cylindrical force transmitting member 60 and the top surface of supporting member 40.

Here, in the case of this example, whereas each of supporting member 40 and force transmitting member 60 has an adequate rigidity, bowl-like connecting member 50 has flexibility (in other words, a property of undergoing elastic deformation). In this example, bowl-like connecting member 50 is formed of a thin plate of metal and supporting member 40 and force transmitting member 60 are formed of an insulating material.

Figure 5:
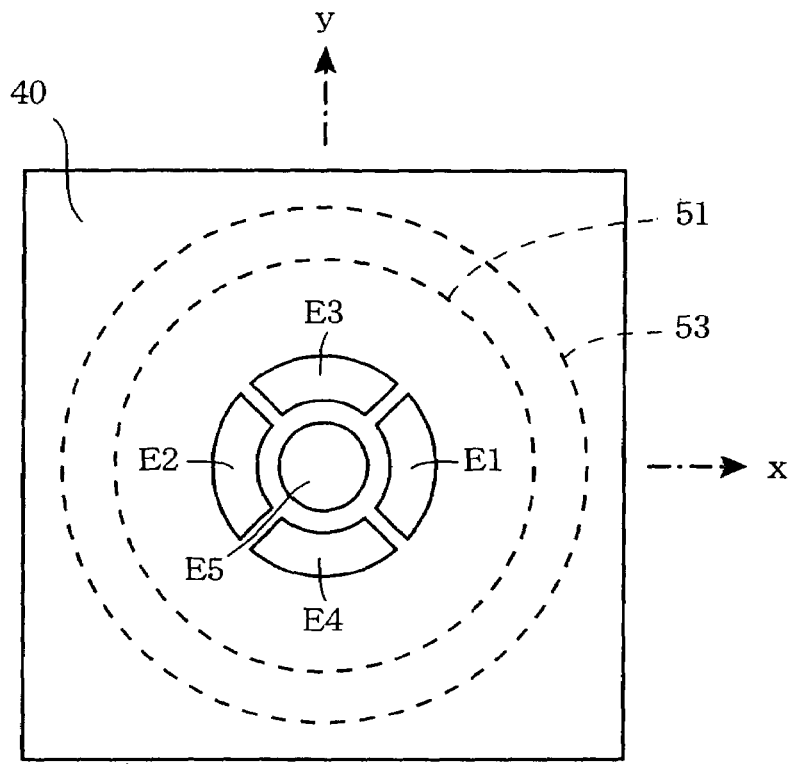
FIG. 5 is a top view of a supporting member 40 of the multi-axis force sensor shown in FIG. 3 (the broken lines indicate the position of a bowl-like connection member).

As shown in the top view of FIG. 5, five fixed electrodes E1 to E5 are formed on the top surface of plate-like supporting member 40. Here, fixed electrode E1 is positioned at a positive part of the x-axis, fixed electrode E2 is positioned at a negative part of the x-axis, fixed electrode E3 is positioned at a positive part of the y-axis, and fixed electrode E4 is positioned at a negative part of the y-axis, and all of these electrodes are electrodes of the same size and same fan-like shape that is line symmetrical with respect to the corresponding coordinate axes. Meanwhile, fixed electrode E5 is a circular electrode that is positioned at the position of origin O. The positions of the parts of bowl-like connecting member 50 that are fixed onto supporting member 40 are indicated by the broken lines in FIG. 5. As illustrated, diaphragm 51 is positioned above supporting member 40 so as to oppose all fixed electrodes E1 to E5. By forming diaphragm 51 of a metal plate or other conductive material as mentioned above, diaphragm 51 is made to have flexibility and conductivity and function in itself as a single common displaceable electrode that forms capacitance elements across the opposing fixed electrodes E1 to E5. Here, the five capacitance elements that are formed by the respective fixed electrodes E1 to E5 and diaphragm 51, which functions as a common displaceable electrode, shall be referred to respectively as capacitance elements C1 to C5.

The manner in which bowl-like connecting member 50 deforms and the variations of the static capacitance values of the respective capacitance elements C1 to C5 when forces of various directional components act on force transmitting member 60 shall now be considered.

Figure 6:
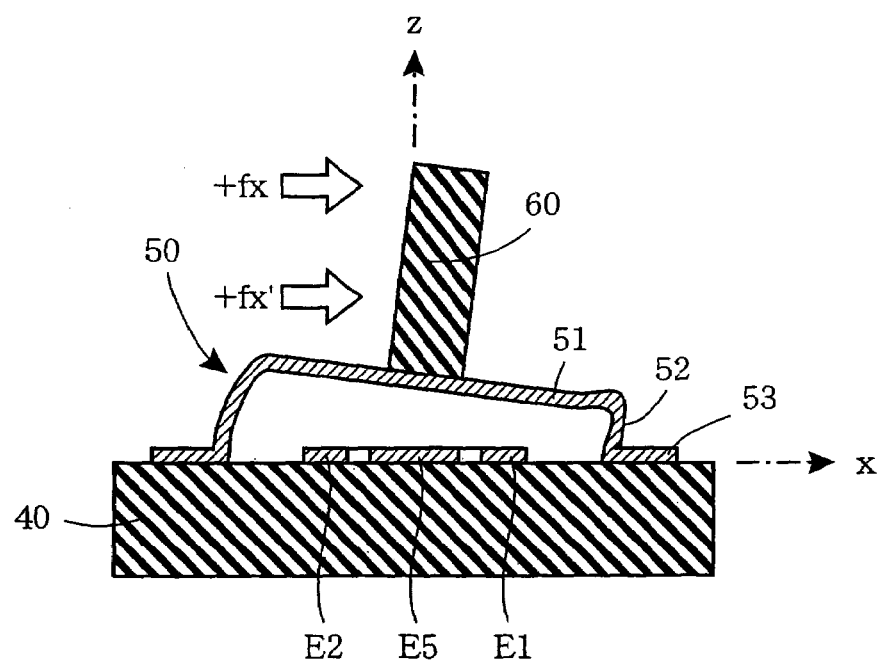
FIG. 6 is a side view in section showing a state wherein a positive x-axis direction force +fx is applied to the multi-axis force sensor shown in FIG. 3.

First, a case where a positive x-axis direction force +fx is applied to an upper part of force transmitting member 60 as shown in FIG. 6 shall be considered. In this case, a force that makes force transmitting member 60 become inclined towards the right acts and bowl-like connecting member 50 with flexibility becomes deformed as shown in the Figure so that diaphragm 51 becomes inclined in a manner such that its right part is moved downwards and its left part is moved upwards. As a result, whereas capacitance element C1 becomes narrower in the distance between both electrodes (fixed electrode E1 and diaphragm 51) and thus increases in static capacitance value, capacitance element C2 becomes wider in the distance between both electrodes (fixed electrode E2 and diaphragm 51) and thus decreases in static capacitance value. Here, with each of the other three capacitance elements C3 to C5, though the distance between electrodes is narrowed at the right half, since the distance between electrodes is spread at the left half, the static capacitance value does not change in total.

Such deformations occur in the same manner when a positive X-axis direction force +fx' is applied to a lower part of force transmitting member 60. However, due to the principle of a lever, even when the magnitude of +fx and the magnitude of +fx' are equal, the former will give rise to greater deformations.

Figure 7:
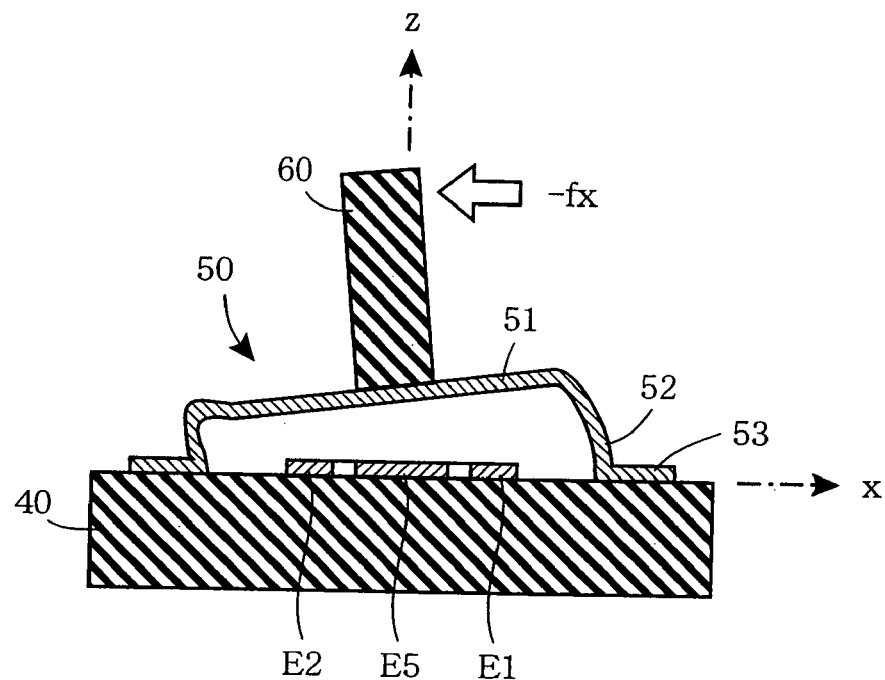
FIG. 7 is a side view in section showing a state wherein a negative x-axis direction force −fx is applied to the multi-axis force sensor shown in FIG. 3.

Next, a case where a negative x-axis direction force −fx is applied to the upper part of force transmitting member 60 as shown in FIG. 7 shall be considered. In this case, a force that makes force transmitting member 60 become inclined towards the left acts and bowl-like connecting member 50 with flexibility becomes deformed as shown in the Figure so that diaphragm 51 becomes inclined in a manner such that its left part moves downwards and its right part moves upwards. As a result, the static capacitance value of capacitance element C1 decreases and the static capacitance value of capacitance element C2 increases.

An x-axis direction force that acts on force transmitting member 60 can thus be determined as a difference between the static capacitance value of first capacitance element C1 and the static capacitance value of second capacitance element C2. The magnitude of the determined difference indicates the magnitude of the acting force and the sign of the determined difference indicates the direction of the acting force. By exactly the same principle, a y-axis direction force fy that acts on force transmitting member 60 can be determined as a difference between the static capacitance value of third capacitance element C3 and the static capacitance value of fourth capacitance element C4.

A force fx that is thus determined indicates non other than the inclination in relation to the x-axis direction of columnar force transmitting member 60 and a force fy indicates non other than the inclination in relation to the y-axis direction of columnar force transmitting member 60. The inclination in relation to the x-axis direction of force transmitting member 60 can thus be determined as the difference between the static capacitance value of first capacitance element C1 and the static capacitance value of second capacitance element C2, and the inclination in relation to the y-axis direction of force transmitting member 60 can thus be determined as the difference between the static capacitance value of third capacitance element C3 and the static capacitance value of fourth capacitance element C4. In other words, based on the difference of a force that is applied to a first part of the bottom end of force transmitting member 60 and a force that is applied to a second part of the bottom end of force transmitting member 60, the inclination degree of force transmitting member 60 with respect to supporting member 40 can be detected.

Figure 8:
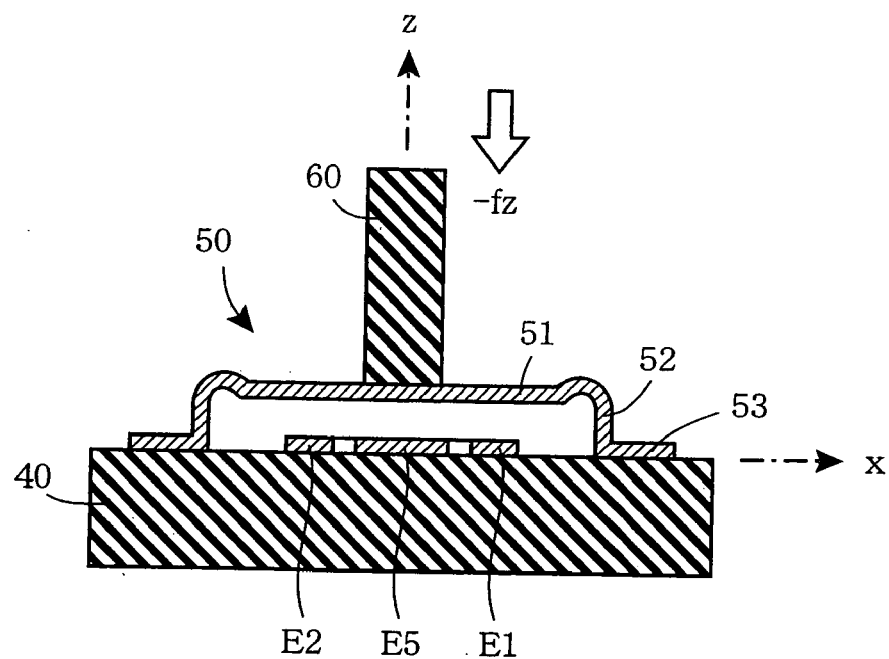
FIG. 8 is a side view in section showing a state wherein a negative z-axis direction force −fz is applied to the multi-axis force sensor shown in FIG. 3.

Next, a case where a negative z-axis direction force −fz is applied to force transmitting member 60 as shown in FIG. 8 shall be considered. In this case, since a force in the downward direction of the Figure is applied to the entirety of force transmitting member 60, a downward pressing force is made to act on bowl-like connecting member 50 by the entirety of force transmitting member 60 without force transmitting member 60 becoming inclined, and bowl-like connecting member 50 with flexibility becomes deformed as shown in the Figure so that all of the five capacitance elements C1 to C5 become narrowed in electrode interval and increase in static capacitance value. Oppositely, when a force +fz that pulls force transmitting member 60 upwards is applied, an upward pulling force acts on bowl-like connecting member 50 from the entirety of force transmitting member 60 so that all of the five capacitance elements C1 to C5 become widened in electrode interval and decrease in static capacitance value.

Thus under an environment wherein only a z-axis direction force fz acts on force transmitting member 60, the acting force fz can be determined by detecting the static capacitance value of any of first to fifth capacitance elements C1 to C5. However, under an environment where forces fx and fy of the other axial directional components are mixed, even if, for example, the static capacitance value of capacitance element C1 is determined solitarily or the static capacitance value of capacitance element C3 is determined solitarily, these values will not necessarily indicate a z-axis direction force fz. In order to detect a z-axis direction force fz under any environment, the static capacitance value of capacitance element C5 is used. Since as mentioned above, a change in the static capacitance value of capacitance element C5 will not occur in a case where an x-axis direction force fx or a y-axis direction force fy acts, just a z-axis direction force can be detected independently by using the static capacitance value of capacitance element C5.

There are other methods that may be used to detect just a z-axis direction force fz independently. For example, a sum of the static capacitance value of capacitance element C1 and the static capacitance value of capacitance element C2 may be determined and this may be used as a detection value of a z-axis direction force fz. Since in regard to the action of an x-axis direction force fx, the change of the static capacitance value of capacitance element C1 and the change of the static capacitance value of capacitance element C2 are in a complementary relationship, by summing the two values, the component of the x-axis direction force fx can be canceled out and just the detection value of the z-axis direction force fz can be taken out. Likewise, a sum of the static capacitance value of capacitance element C3 and the static capacitance value of capacitance element C4 may be determined and this may be used as a detection value of a z-axis direction force fz. Furthermore, a sum of the static capacitance values of the four capacitance elements C1 to C4 or a sum of the static capacitance values of the five capacitance elements C1 to C5 may be determined and this may also be used as a detection value of a z-axis direction force fz. Thus fixed electrode E5 (capacitance element C5) does not necessarily have to be provided.

As described above, by using the multi-axis force sensor shown in FIG. 3, an inclination degree in relation to the x-axis direction (force fx) of force transmitting member 60, an inclination degree in relation to the y-axis direction (force fy) of force transmitting member 60, and a force (force fz) that is applied to supporting member 40 from the entirety of force transmitting member 60 can be detected. This means that the multi-axis sensor shown in FIG. 3 is a sensor that can be used as first sensor 21 and second sensor 22 in the force detection device shown in FIG. 1. Though obviously the sensors used in the force detection device according to the present invention are not limited to sensors of the type shown in FIG. 3, the sensors of the type shown in FIG. 3 are optimal as the sensors to be used in the force detection device of the present invention.

<<<§3. First Embodiment of the Invention>>>

The major structural parts of a force detection device of a first embodiment of this invention shall now be described using FIGS. 9 to 12 and furthermore, the operation principle of this device shall be described using FIGS. 13 to 15.

Figure 9:
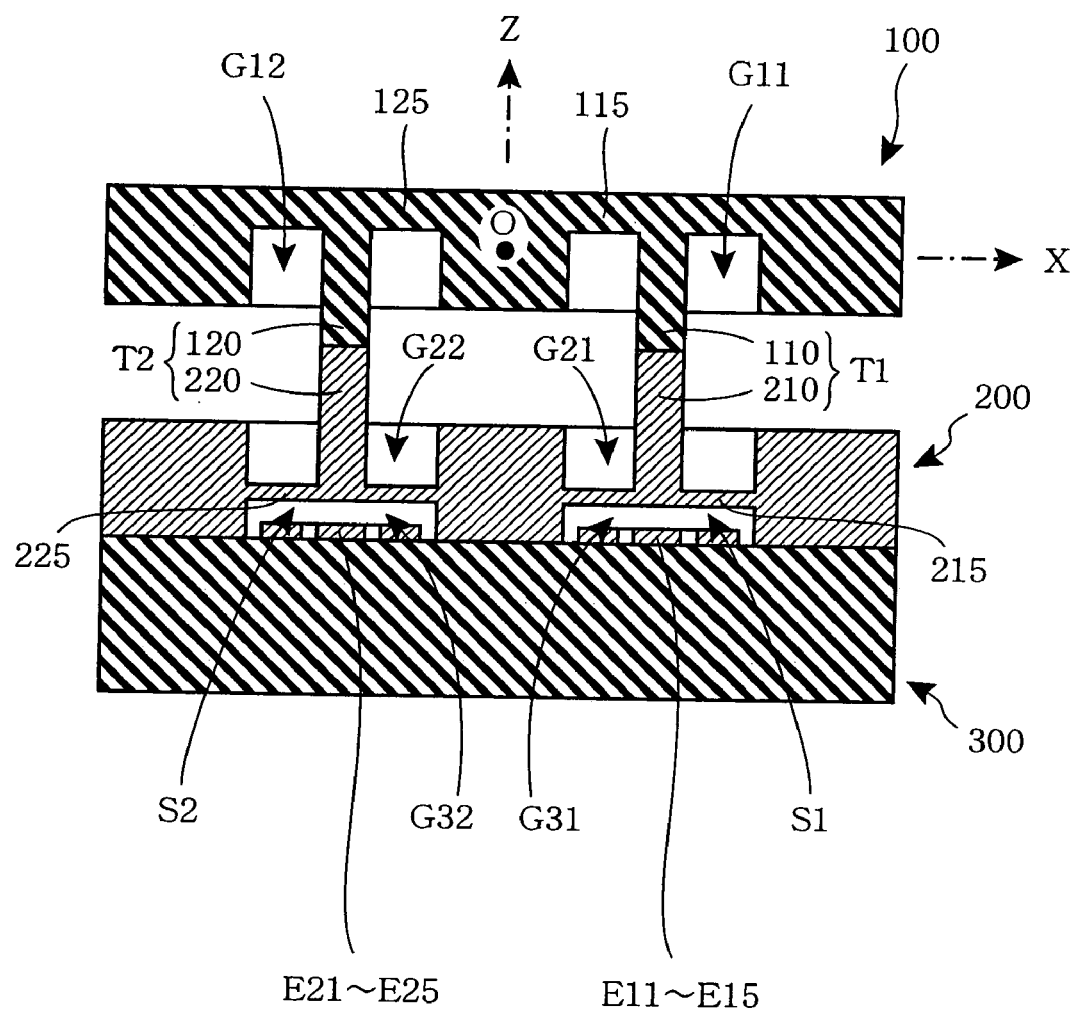
FIG. 9 is a side view in section across the XZ plane showing the major structural parts of a force detection device of a first embodiment of this invention.
Figure 10:
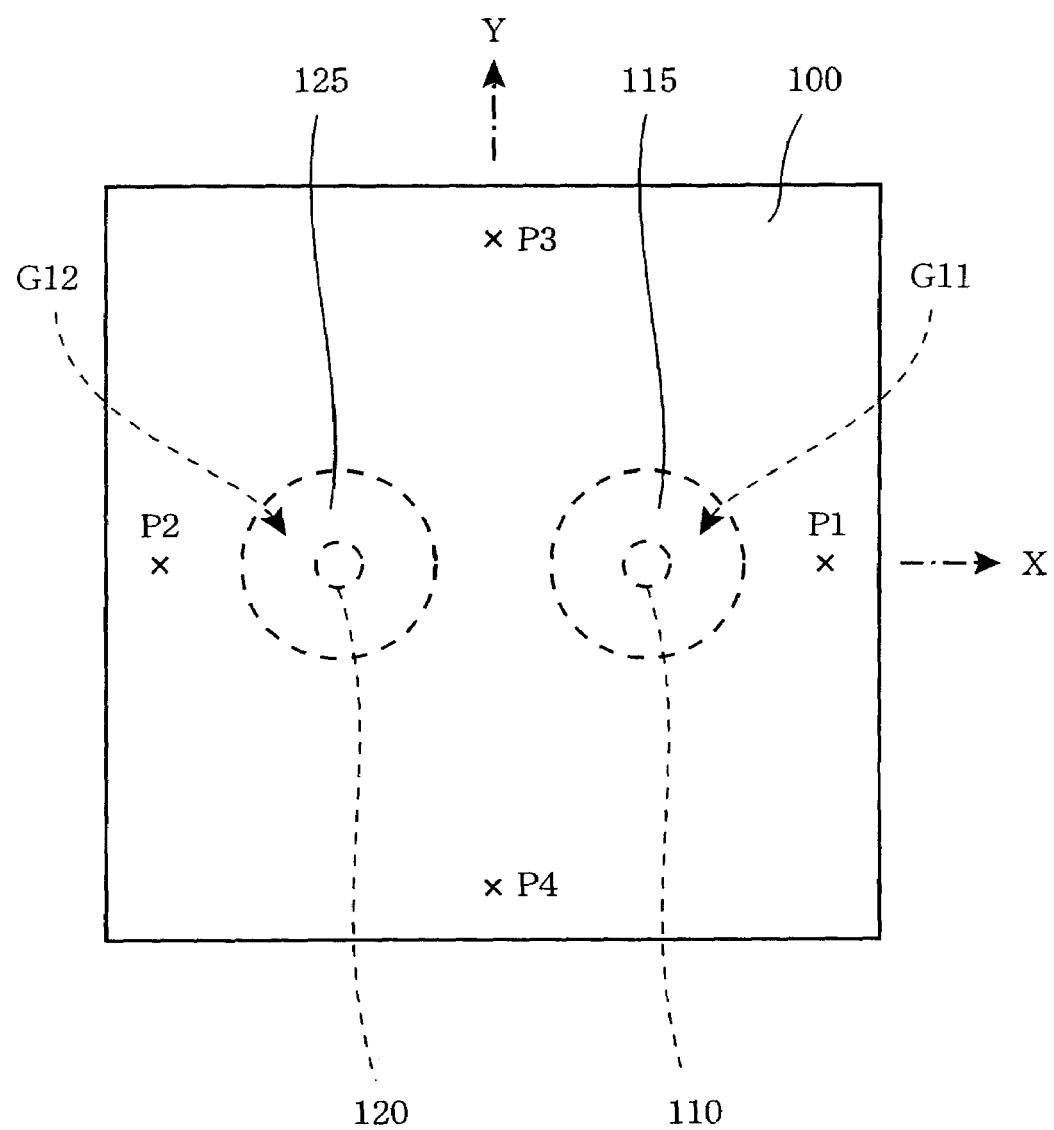
FIG. 10 is a top view of the force detection device shown in FIG. 9.

FIG. 9 is a side view in section across the XZ plane showing the major structural parts of the force detection device of this first embodiment, and FIG. 10 is a top view of this device. As shown in FIG. 9, the basic components of this force detection device are a force receiving member 100, an intermediate member 200, and a supporting member 300, and the basic form of each of these is a plate-like member having a top surface of square shape.

Figure 11:
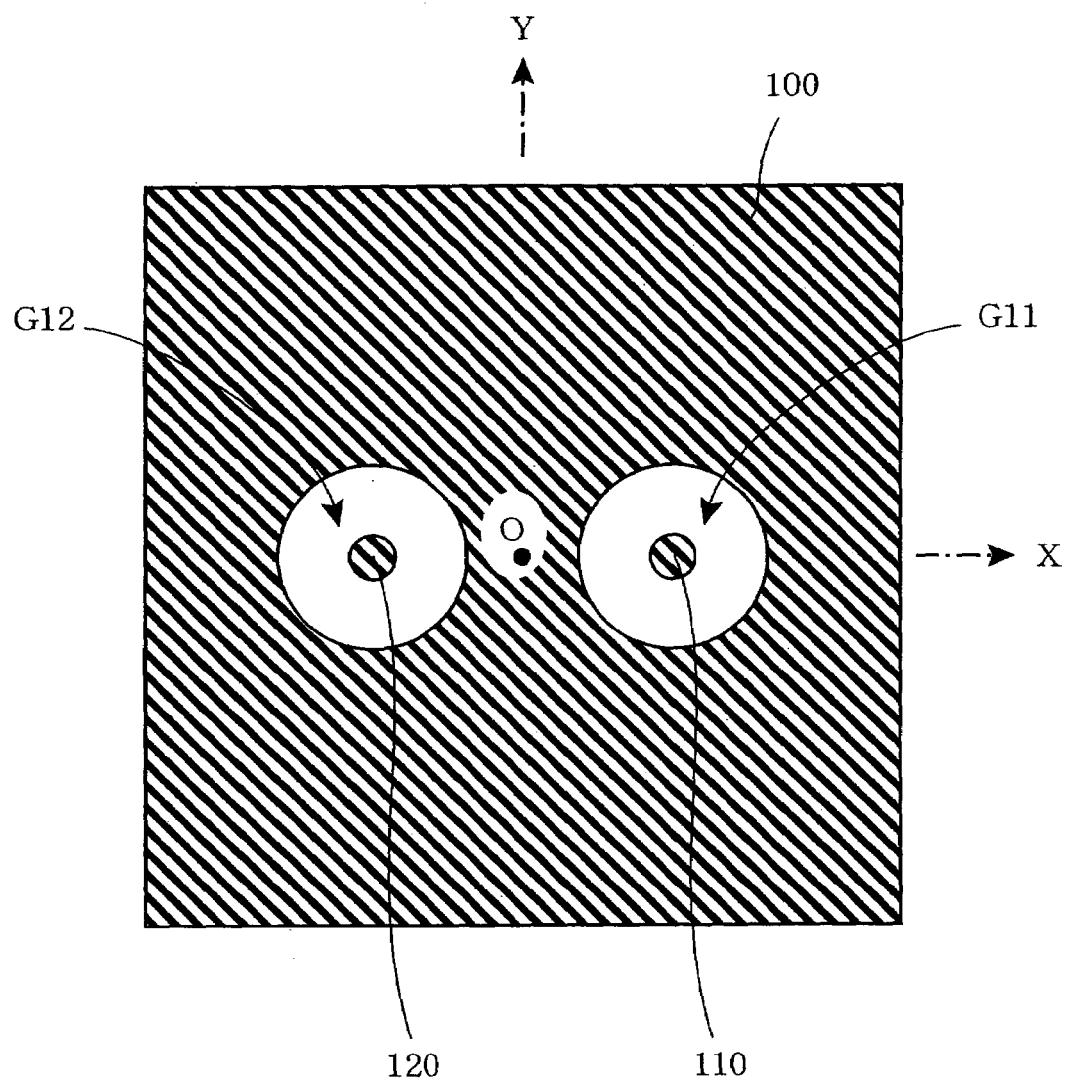
FIG. 11 is a transverse section across the XY plane of the force detection device shown in FIG. 9.

As shown in FIG. 10, force receiving member 100 is basically a plate-like member having a top surface with a square shape and having two cylindrical protruding parts 110 and 120 extending downwards from the bottom surface. FIG. 11 is a transverse section along the XY plane of force receiving member 100. As illustrated, annular groove parts G11 and G12 are formed at the circumferences of the base parts of cylindrical protruding parts 110 and 120, and by the forming of these groove parts G11 and G12, thin parts 115 and 125 with flexibility are formed in plate-like force receiving member 100 as shown in FIGS. 9 and 10. Cylindrical protruding parts 110 and 120 are thus connected to plate-like force receiving member 100 via thin parts 115 and 125.

Figure 12:
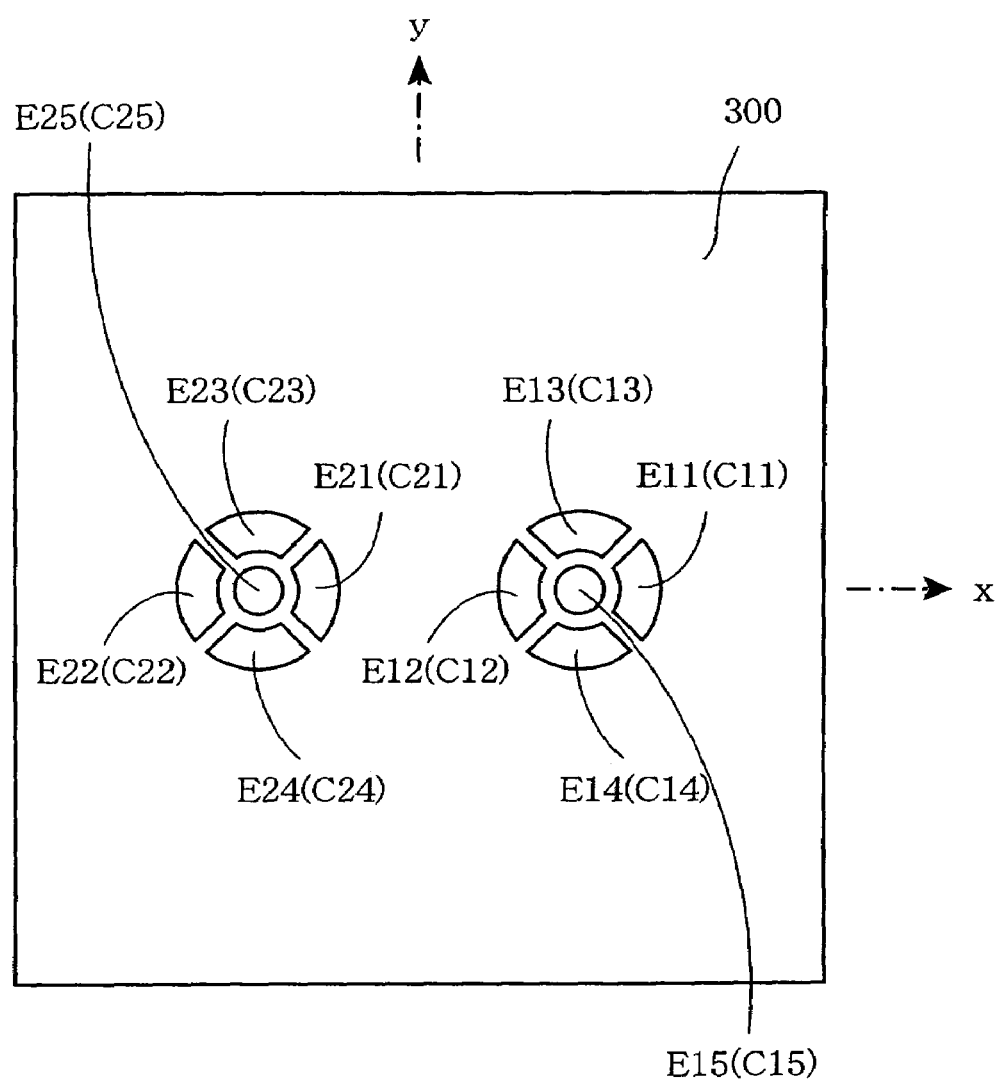
FIG. 12 is a top view of a supporting member 300 of the force detection device shown in FIG. 9.

Meanwhile, supporting member 300 is a completely plate-like member having a top surface with a square shape as shown in FIG. 12, and fixed electrodes E11 to E15 and E21 to E25 are disposed on the top surface. Though intermediate member 200, which is joined to the top surface of supporting member 300, is basically a plate-like member having a top surface with a square shape, two cylindrical protruding parts 210 and 220 extend upwards from the top surface as shown in FIG. 9. Annular groove parts G21 and G22 are formed at the circumferences of the base parts of cylindrical protruding parts 210 and 220, and furthermore, cylindrical groove parts G31 and G32 are formed in the bottom surface of intermediate member 200. Both sets of groove parts G21 and G22, which are provided in the top surface of intermediate member 200, and groove parts G31 and G32, which are provided in the bottom surface, have circular outlines of the same size centered about the positions of the central axes of cylindrical protruding parts 210 and 220. As illustrated, a diaphragm 215 exists as a boundary wall between groove parts G21 and G31 and a diaphragm 225 exists as a boundary wall between groove parts G22 and G32.

The bottom surfaces of the two cylindrical protruding parts 110 and 120 that extend downward from the force receiving member 100 side are joined to the top surfaces of the two cylindrical protruding parts 210 and 220 that extend upward from the intermediate member 200 side. Here, the cylindrical structure that is formed by joining cylindrical protruding part 110 and cylindrical protruding part 210 shall be referred to as a "first force transmitting member T1" and the cylindrical structure that is formed by joining cylindrical protruding part 120 and cylindrical protruding part 220 shall be referred to as a "second force transmitting member T2" (here, for the sake of description, the force transmitting member positioned in the positive X-axis direction shall be referred to as the "first force transmitting member" and the force transmitting member positioned in the negative X-axis direction shall be referred to as the "second force transmitting member"). The upper end of first force transmitting member T1 is thus connected to force receiving member 100 with thin part 115 with flexibility as a connecting member, and the upper end of second force transmitting member T2 is connected to force receiving member 100 with thin part 125 with flexibility as a connecting member.

The bottom surface of first force transmitting member T1 is connected to the center of diaphragm 215, which functions as a connecting member, the circumference of diaphragm 215 is connected via intermediate member 200 to supporting member 300, the bottom surface of second force transmitting member T2 is connected to the center of diaphragm 225, which functions as a connecting member, and the circumference of diaphragm 225 is connected via intermediate member 200 to supporting member 300.

In the illustrated embodiment, force receiving member 100 is formed of an insulating substrate (for example, a ceramic substrate), intermediate member 200 is formed of a conductive substrate (for example, a substrate of stainless steel, aluminum, titanium, or other metal), and supporting member 300 is formed of an insulating substrate (for example, a ceramic substrate). Obviously, the materials of the respective parts are not restricted to the above and, for example, force receiving member 100 may be formed of a substrate of stainless steel, aluminum, titanium, or other metal instead. Thin parts 115 and 125 and diaphragms 215 and 225 are parts that are formed to have flexibility by being made thinner in thickness in comparison to other parts of a substrate.

Since diaphragms 215 and 225 are formed of a conductive material, these have conductivity as well as flexibility and function in themselves as common displaceable electrodes. The arrangements here are thus exactly the same as that of the multi-axis force sensor shown in FIG. 3. That is, both fixed electrodes E11 to E15, shown at the right side of FIG. 12, and fixed electrodes E21 to E25, shown at the left side of FIG. 12, are components equivalent to fixed electrodes E1 to E5, shown in FIG. 5, and both diaphragms 215 and 225, shown in FIG. 9, are components equivalent to diaphragm 51, shown in FIG. 3. Sensors S1 and S2, which are equivalent in function to the multi-axis sensor shown in FIG. 3, are thus respectively arranged at the circumference of groove G31 and at the circumference of groove G32, shown in FIG. 9. Here, sensor S1 has functions of detecting an inclination degree in relation to the X-axis direction and an inclination degree in relation to the Y-axis direction of first transmitting member T1 and a force in relation to the Z-axis direction that is applied to supporting member 300 from the entirety of first force transmitting member T1, and sensor S2 has functions of detecting an inclination degree in relation to the X-axis direction and an inclination degree in relation to the Y-axis direction of second transmitting member T2 and a force in relation to the Z-axis direction that is applied to supporting member 300 from the entirety of second force transmitting member T2.

It can thus be understood that the force detection device shown in FIG. 9 has substantially equivalent components as the force detection device shown in FIG. 1, though the "first" and the "second" are exchanged in the figure. That is, plate-like force receiving member 100 corresponds to force receiving member 10, first force transmitting member T1 corresponds to first force transmitting member 11, second force transmitting member T2 corresponds to second force transmitting member 12, plate-like supporting member 300 corresponds to supporting member 20, sensor S1 corresponds to first sensor 21, and sensor S2 corresponds to second sensor 22. Thus by furthermore adding detection processing unit 30 to the structure shown in FIG. 9, the force detection device shown in FIG. 1 can be realized.

Though it has been indicated that by using the force detection device shown in FIG. 1, an X-axis direction force Fx that acts on force receiving member 10 (see FIG. 2B) and a moment My about the Y-axis that acts on force receiving member 10 (see FIG. 2C) can be detected, actually, a Z-axis direction force Fz, a moment Mx about the X-axis, and a moment Mz about the Z-axis can also be detected, that is, of the six force components shown in the upper part of FIG. 1, the five components of Fx, Fz, Mx, My, and Mz can be detected independent of each other. The reasons therefor shall now be described along with the operations of the force detection device shown in FIG. 9.

The ten capacitance elements, formed by the ten fixed electrodes E11 to E15 and E21 to E25 shown in FIG. 12 and the opposing common displaceable electrodes (diaphragms 215 and 225), shall be referred to respectively as C11 to C15 and C21 to C25. In FIG. 12, C11 to C25, which are indicated inside parenthesis, indicate the individual capacitance elements formed by the respective fixed electrodes. Also, an origin O is set at a predetermined position inside force receiving member 100 shown in FIG. 9 and an XYZ three-dimensional coordinate system is defined as illustrated. The variations of the static capacitance values of the ten capacitance elements C11 to C25, which occur when a positive X-axis direction force +Fx, a negative X-axis direction force −Fx, a positive Z-axis direction force +Fz, a negative Z-axis direction force −Fz, a positive direction moment +Mx about the X-axis, a negative direction moment −Mx about the same axis, a positive direction moment +My about the Y-axis, a negative direction moment −My about the same axis, a positive direction moment +Mz about the Z-axis, and a negative direction moment −Mz about the same axis act respectively on force receiving member 100, shall now be considered.

FIG. 13 is a table indicating the modes of variation of the static capacitance values of the respective capacitance elements C11 to C25 that occur in the above cases, with "0" indicating no change, "+" indicating an increase, and "−" indicating a decrease. That the static capacitance values of the respective capacitance elements vary as shown in this table can be understood from the modes of deformation of the multi-axis force sensor shown in FIGS. 6 to 8. For example, when a positive X-axis direction force +Fx acts on force receiving member 100, since both first force transmitting member T1 and second force transmitting member T2 become inclined towards the right side (in the positive X-axis direction) of FIG. 9, whereas capacitance elements C11 and C21 become narrower in electrode interval and increase in static capacitance value, capacitance elements C12 and C22 become wider in electrode interval and decrease in static capacitance value. With each of the other capacitance elements, since the electrode interval becomes wider at a part and narrower at another part, the static capacitance value does not change in total. The first row (the row of +Fx) of the table of FIG. 13 shows such variations of the static capacitance values for the respective capacitance elements C11 to C25.

Oppositely, when a negative X-axis direction force −Fx acts, since both first force transmitting member T1 and second force transmitting member T2 become inclined towards the left side (in the negative X-axis direction) of FIG. 9, the increase/decrease relationships of the static capacitance values become reversed and the modes of variation such as shown in the second row (row of −Fx) of the table of FIG. 13 are obtained.

Also, when a positive Z-axis direction force +Fz acts on force receiving member 100, since both first transmitting member T1 and second force transmitting member T2 are made to apply a pulling force to the top surface of supporting member 300, all capacitance elements C11 to C25 become wider in electrode interval and decrease in static capacitance value. The third row (row of +Fz) of the table of FIG. 13 indicates such variations. Oppositely, when a negative Z-axis direction force −Fz acts on force receiving member 100, since both first transmitting member T1 and second force transmitting member T2 are made to apply a pushing force to the top surface of supporting member 300, all capacitance elements C11 to C25 become narrower in electrode interval and increase in static capacitance value. The fourth row (row of −Fz) of the table of FIG. 13 indicates such variations.

Meanwhile, when a positive direction moment +Mx about the X-axis acts on force receiving member 100, an upward force is applied to parts of first force transmitting member T1 and second force transmitting member T2 at the inward side of the paper surface, with the paper surface of FIG. 9 being a boundary, and a downward force is applied to parts at the outward side of the paper surface. That is, in the top view shown in FIG. 10, point P3 moves upward (in the positive Z-axis direction) and point P4 moves downward (in the negative Z-axis direction). As a result, whereas capacitance elements C13 and C23, shown in FIG. 12, become wider in electrode interval and decrease in capacitance value, capacitance elements C14 and C24 become narrower in electrode interval and increase in capacitance value. With each of the other capacitance elements, since the electrode interval becomes wider at a part and narrower at another part, the static capacitance value does not change in total. The fifth row (row of +Mx) of the table of FIG. 13 shows such variations of the static capacitance values for the respective capacitance elements C11 to C25. When a negative moment −Mx about the X-axis acts, the increase/decrease relationships become reversed and the results shown in the sixth row (row of −Mx) of the table of FIG. 13 are obtained.

When a positive direction moment +My about the Y-axis acts on force receiving member 100, a downward force is applied to first force transmitting member T1 in FIG. 9 and an upward force is applied to second force transmitting member T2. That is, in the top view shown in FIG. 10, point P1 moves downward (in the negative Z-axis direction) and point P2 moves upward (in the positive Z-axis direction). As a result, whereas all five capacitance elements C11 to C15, which form sensor S1, become narrower in electrode interval and increase in capacitance value, all five capacitance elements C21 to C25, which form sensor S2, become wider in electrode interval and decrease in capacitance value. The seventh row (row of +My) of the table of FIG. 13 shows such variations of the static capacitance values for the respective capacitance elements C11 to C25. When a negative moment −My about the Y-axis acts, the increase/decrease relationships become reversed and the results shown in the eighth row (row of −My) of the table of FIG. 13 are obtained.

When a positive direction moment +Mz about the Z-axis acts on force receiving member 100, first force transmitting member T1 in FIG. 9 is subject to a force that makes it become inclined in the positive Y-axis direction and second force transmitting member T2 is subject to a force that makes it become inclined in the negative Y-axis direction. As a result, of the capacitance elements forming the respective sensors shown in FIG. 12, capacitance elements C13 and C24 become narrower in electrode interval and increase in capacitance value, and capacitance elements C14 and C23 become wider in electrode interval and decrease in capacitance value. With each of the other capacitance elements, since the electrode interval becomes wider at a part and narrower at another part, the static capacitance value does not change in total. The ninth row (row of +Mz) of the table of FIG. 13 shows such variations of the static capacitance values for the respective capacitance elements. When a negative moment −Mz about the Z-axis acts, the increase/decrease relationships become reversed and the results shown in the tenth row (row of −Mz) of the table of FIG. 13 are obtained.

Figure 14:
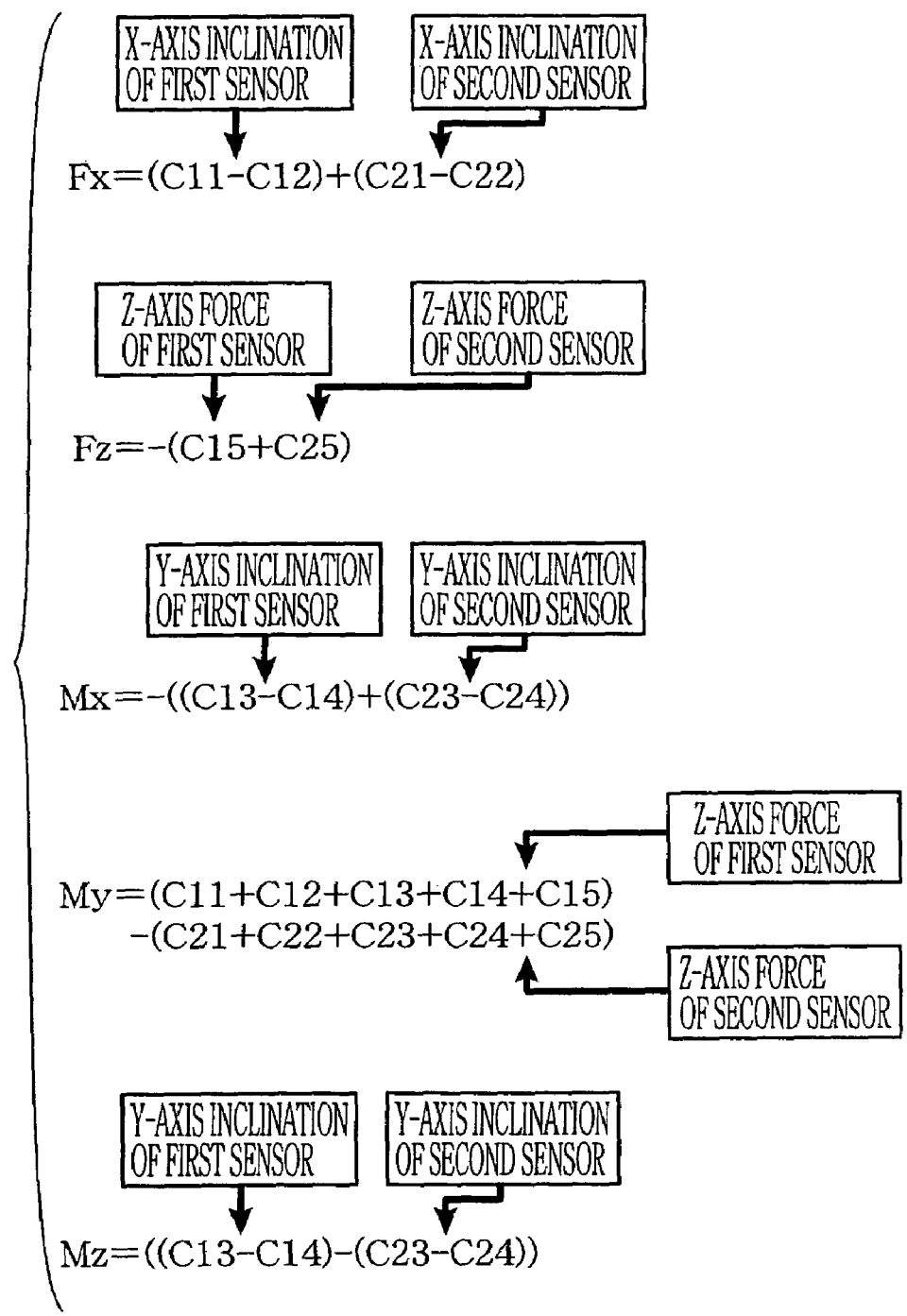
FIG. 14 is a diagram illustrating, by way of numerical equations, the principles of detection of the respective force components by the force detection device shown in FIG. 9.

Based on the results shown in the table of FIG. 13, it can be understood that by preparing as detection processing unit 30, a circuit, which measures the static capacitance values (here, the static capacitance values themselves shall be indicated by the same symbols, C11 to C25) of the ten capacitance elements C11 to C25, and a processing device, which uses the respective measured static capacitance values and performs computations based on the equations shown in FIG. 14, the five components of Fx, Fz, Mx, My, and Mz can be obtained.

For example, the equation, Fx=(C11−C12)+(C21−C22), shown in FIG. 14, is based on the results of the first and second rows (rows of +Fx and −Fx) of the table of FIG. 13 and signifies that the X-axis direction component Fx of a force that acts on force receiving member 100 can be detected based on the sum of the inclination degree in relation to the X-axis direction of first force transmitting member T1, which is detected by first sensor 21, and the inclination degree in relation to the X-axis direction of second force transmitting member T2, which is detected by second sensor 22. This is based on the detection principle illustrated in FIG. 2B.

Also, the equation, Fz=−(C15+C25), shown in FIG. 14 is based on the results of the third and fourth rows (rows of +Fz and −Fz) of the table of FIG. 13 and signifies that the Z-axis direction component Fz of a force that acts on force receiving member 100 can be detected based on the sum of the force in relation to the Z-axis direction of first force transmitting member T1, which is detected by the first sensor, and the force in relation to the Z-axis direction of second force transmitting member T2, which is detected by the second sensor. A minus sign is attached to the front of the equation since the upward direction of the device is set as the positive Z-axis direction.

Furthermore, the equation, Mx=−((C13−C14)+(C23−C24)), shown in FIG. 14, is based on the results of the fifth and sixth rows (rows of +Mx and −Mx) of the table of FIG. 13 and signifies that the moment Mx about the X-axis of a force that acts on force receiving member 100 can be detected based on the sum of the inclination degree in relation to the Y-axis direction of first force transmitting member T1, which is detected by first sensor 21, and the inclination degree in relation to the Y-axis direction of second force transmitting member T2, which is detected by second sensor 22. Here, a minus sign is attached to the front of the equation due to the manner in which the direction of the moment is set.

Also, the equation, My=(C11+C12+C13+C14+C15)−(C21+C22+C23+C24+C25), shown in FIG. 14 is based on the results of the seventh and eighth rows (rows of +My and −My) of the table of FIG. 13 and signifies that the moment My about the Y-axis of a force that acts on force receiving member 100 can be detected based on the difference between the force in relation to the Z-axis direction of first force transmitting member T1, which is detected by the first sensor, and the force in relation to the Z-axis direction of second force transmitting member T2, which is detected by the second sensor. This is based on the detection principle illustrated in FIG. 2C.

Lastly, the equation, Mz=((C13−C14)−(C23−C24)), shown in FIG. 14, is based on the results of the ninth and tenth rows (rows of +Mz and −Mz) of the table of FIG. 13 and signifies that the moment Mz about the Z-axis of a force that acts on force receiving member 100 can be detected based on the difference between the inclination degree in relation to the Y-axis direction of first force transmitting member T1, which is detected by first sensor 21, and the inclination degree in relation to the Y-axis direction of second force transmitting member T2, which is detected by second sensor 22.

Whereas in the second equation (equation of Fz) in FIG. 14, C15, which is the static capacitance value of just one capacitance element, is used as the force in relation to the Z-axis direction of first force transmitting member T1 that is detected by the first sensor, in the fourth equation (equation of My) in FIG. 14, the sum, (C11+C12+C13+C14+C15), of the static capacitance values of five capacitance elements is used as the same force in relation to the Z-axis direction of first force transmitting member T1 that is detected by the first sensor. This indicates that there are a plurality of variations in the methods for determining the force in relation to the Z-axis direction using the multi-axis force sensor of the type shown in FIG. 3 as described in §2. Thus for example, Fz=−((C11+C12+C13+C14+C15)+(C21+C22+C23+C24+C25), may be used as the second equation in FIG. 14. Likewise, My=(C15−C25) may be used as the fourth equation in FIG. 14. Needless to say, various other variations, such as Fz=−((C11+C12)+(C21+C22)), Fz=−((C11+C12+C13+C14)+(C21 +C22+C23+C24)), My=(C13+C14+C15)−(C23+C24+C25) etc., may also be used.

A force Fy in the Y-axis direction that acts on receiving member 100 cannot be detected with the first embodiment shown in FIG. 9. This is because first force transmitting member T1 and second force transmitting member T2 are positioned on the XZ plane (however, the moment Mx about the X-axis may be substituted as an approximation of the force Fy in the Y-axis direction). In order to detect all components including the component Fy, four columnar force transmitting members must be used as shall be described later with second and third embodiments.

What should be noted here is that the technical idea of the art of this invention differs completely from the art wherein "two priorly known multi-axis force sensors are simply used as shown in FIG. 3 to increase the precision of detection." Generally in making measurements using some form of measuring device, a method of "installing a plurality of the same measuring devices and determining the average of the results of the respective measuring devices to improve the precision of measurement" is a commonly practiced method and has been used in various fields from long ago.

However, the basic concepts of this invention that are illustrated in FIGS. 2A to 2C do not lie in the technical idea of "using two sensors to improve the precision of detection" but lie in the idea of "detecting forces of predetermined coordinate axis directions and moments about predetermined coordinate axes in an accurately distinguishing manner." A more detailed, supplementary description concerning this point shall now be given.

First, consider the case of detecting a force +fx in the positive x-axis direction using priorly known multi-axis force sensors as shown in FIG. 6. Generally known literatures that disclose such a multi-axis force sensor, provide the description that, based on the principle shown in FIG. 6, "the X-axis direction component fx of a force that acts on force transmitting member 60 can be determined by determining the difference (C1−C2) of the static capacitance value C1 of capacitance element C1 (fixed electrode E1 and diaphragm 51) and the static capacitance value C2 of capacitance element C2 (fixed electrode E2 and diaphragm 51)." However, this description is not correct in the strict sense. This is because the difference (C1−C2) of the static capacitance values is actually not the acting force fx but is the moment My about the y-axis that results from the acting force fx.

This can be readily understood by considering the output value that is obtained when two forces +fx and +fx' are applied to differing positions of force transmitting member 60 as shown in FIG. 6. With the illustrated example, even if +fx=+fx', the output value obtained as the difference (C1−C2) of capacitance values will be greater in the case where +fx is applied than in the case where +fx' is applied. This is because a greater moment is applied to this detection system when +fx is applied. That is, with the sensor shown in FIG. 6, an x-axis direction force fx or a y-axis direction force fy cannot be detected directly but can only be detected as a moment My about the y-axis or a moment Mx about the x-axis.

However, if the position of force transmitting member 60 at which a force fx is to be made to act is set to be a constantly fixed position, a moment My about the y-axis may be handled as an x-axis direction force fx without problem. Thus in the case of an object of detection with which there is no need to distinguish between force and moment, there will be no major problems in practical use even if the force sensor shown in FIG. 6 is used to detect an x-axis direction force fx or a y-axis direction force fy.

However, in applications to the motion control of robots and industrial machines, the demand for force detection devices that can detect forces and moments in a clearly distinguishing manner is not necessarily low. The force detection device according to the present invention can indeed be said to be a device suited for such applications. For example, to use the force detection device shown in FIG. 9 as a joint part between an arm and wrist of a robot, supporting member 300 is mounted to the arm side and force receiving member 100 is mounted to the wrist side. By doing so, forces and moments applied to the wrist side of the arm can be detected.

Figure 15:
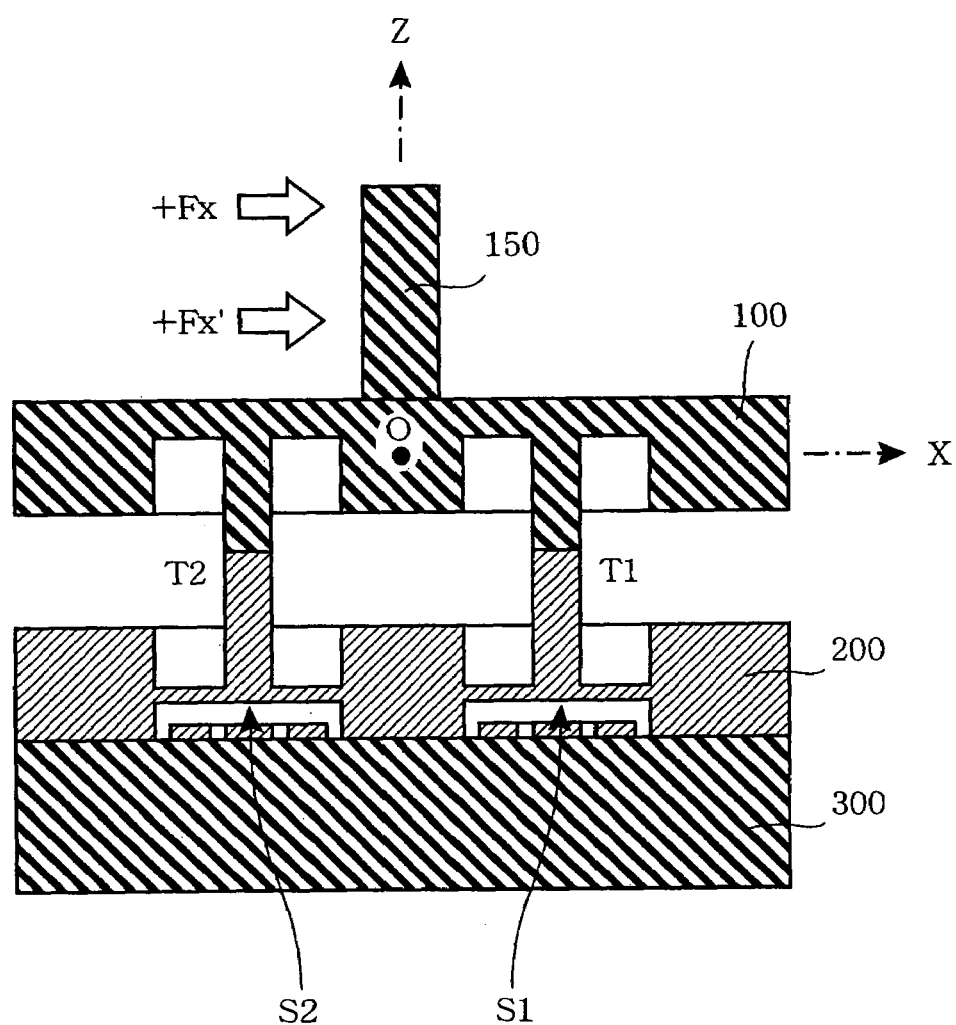
FIG. 15 is a side view in section for explaining that forces and moments can be detected in distinguishing manner by the force detection device shown in FIG. 9.

Here, consider cases of using the force detection device of the present invention shown in FIG. 9 to perform force detection of a detection mode shown in FIG. 15. With the force detection device shown in FIG. 15, a cylindrical protrusion 150 is connected furthermore to the top surface of force receiving member 100 of the force detection device shown in FIG. 9. Here, consider the cases of applying two forces +Fx and +Fx' to predetermined positions of this cylindrical protrusion 150 as illustrated. In these cases, though force +Fx and +Fx' are both forces directed in the positive X-axis direction, since they act at different positions of cylindrical protrusion 150, they apply moments (positive direction moments +My about the Y-axis) that differ in magnitude to force receiving member 100.

Here, when the force +Fx is applied to the position in the Figure of cylindrical protrusion 150, both the X-axis direction force +Fx and the moment My about the Y-axis act on force receiving member 100, and as shown by the equations of FIG. 14, the force Fx and the moment My can be detected separately and independently by the force detection device of the present invention. Thus no matter at which position of cylindrical protrusion 150 the force Fx is made to act, the value of the force Fx that is detected by this force detection device will always be equal. Thus with the illustrated example, if +Fx=+Fx', the detection value of the X-axis direction force that is determined by this force detection device will be the same. Obviously, the detection values of the moment My about the Y-axis will differ for these cases. The position of the coordinate axis of a moment that is caused by a force Fx is determined by the structures and dimensions of the respective parts of the device.

Thus whereas the prior-art force sensor shown in FIG. 6 could only detect an X-axis direction force as a moment about the Y-axis, with the force detection device of the present invention shown in FIG. 9, an X-axis direction force Fx and a moment My about the Y-axis can be detected in a clearly distinguishing manner. This is an important characteristic of this invention.

<<<§4. Second Embodiment of the Invention>>>

Figure 16:
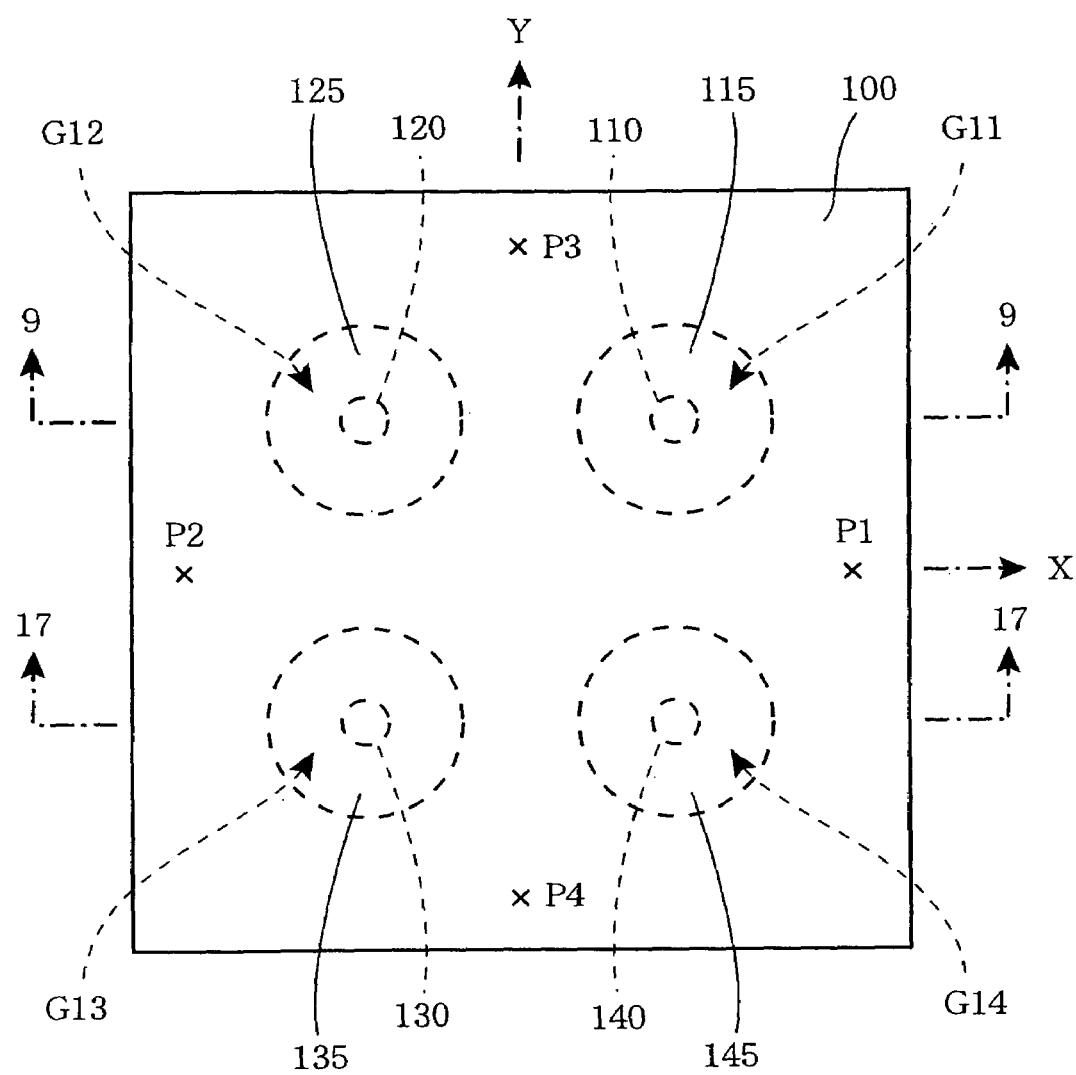
FIG. 16 is a top view of the major structural parts of a force detection device of a second embodiment of this invention.
Figure 17:
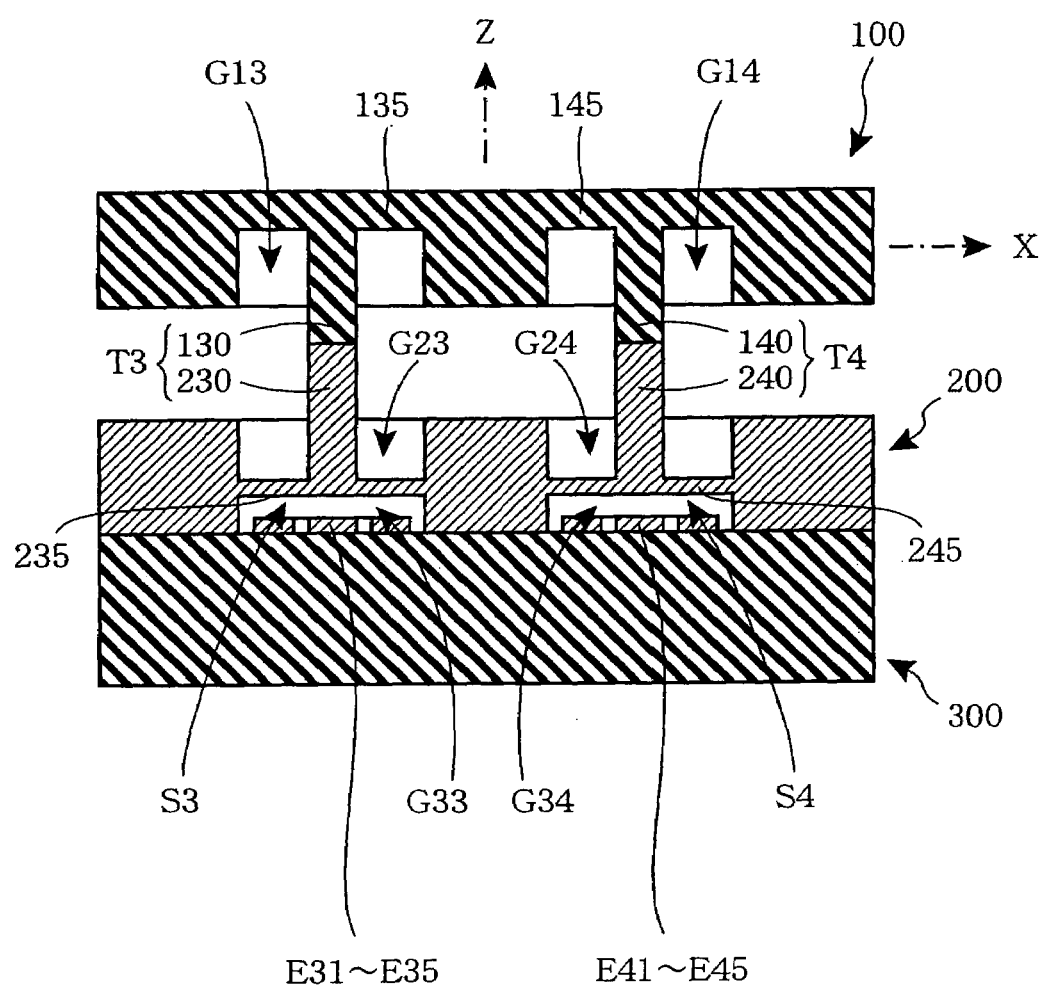
FIG. 17 is a side view in section along line 17—17 of the force detection device shown in FIG. 16.

A force detection device of a second embodiment of this invention shall now be described. FIG. 16 is a top view of the major structural parts of the force detection device of this second embodiment, and FIG. 17 is a side view in section along line 17—17 of the force detection device shown in FIG. 16. The section along line 9—9 of the force detection device shown in FIG. 16 is the same as FIG. 9. A difference with respect to the above-described force detection device of the first embodiment is that four columnar force transmitting members are provided, and besides this, the structure and materials are exactly the same as those of the force detection device of the first embodiment. That is, the overall device is arranged as a structure comprising a plate-like force receiving member 100, an intermediate member 200, and a supporting member 300, each having a top surface with a square shape.

As shown in the top view of FIG. 16, force receiving member 100 is basically a plate-like member having a top surface with a square shape and having four cylindrical protruding parts 110, 120, 130, and 140 extending downwards from the bottom surface. Here, when an XY two-dimensional coordinate system having an origin at the center position of force receiving member 100 is defined, cylindrical protruding parts 110, 120, 130, and 140 are positioned at the first, second, third, and fourth quadrants as illustrated. To be more detailed, cylindrical protruding parts 110, 120, 130, and 140 are positioned so that the positions of their respective central axes will be positioned at the four vertices of "a square, which is positioned at a position centered about the origin, is smaller in outline than force receiving member 100, and with which the vertical and transverse sides are parallel to the X-axis and Y-axis." Also, annular groove parts G11, G12, G13, and G14 are formed at the circumferences of the base parts of cylindrical protruding parts 110, 120, 130, and 140, and by forming these groove parts G11, G12, G13, and G14, thin parts 115, 125, 135, and 145 with flexibility are formed in plate-like force receiving member 100. Cylindrical protruding parts 110, 120, 130, and 140 are thus connected to plate-like force receiving member 100 via thin parts 115, 125, 135, and 145.

Figure 18:
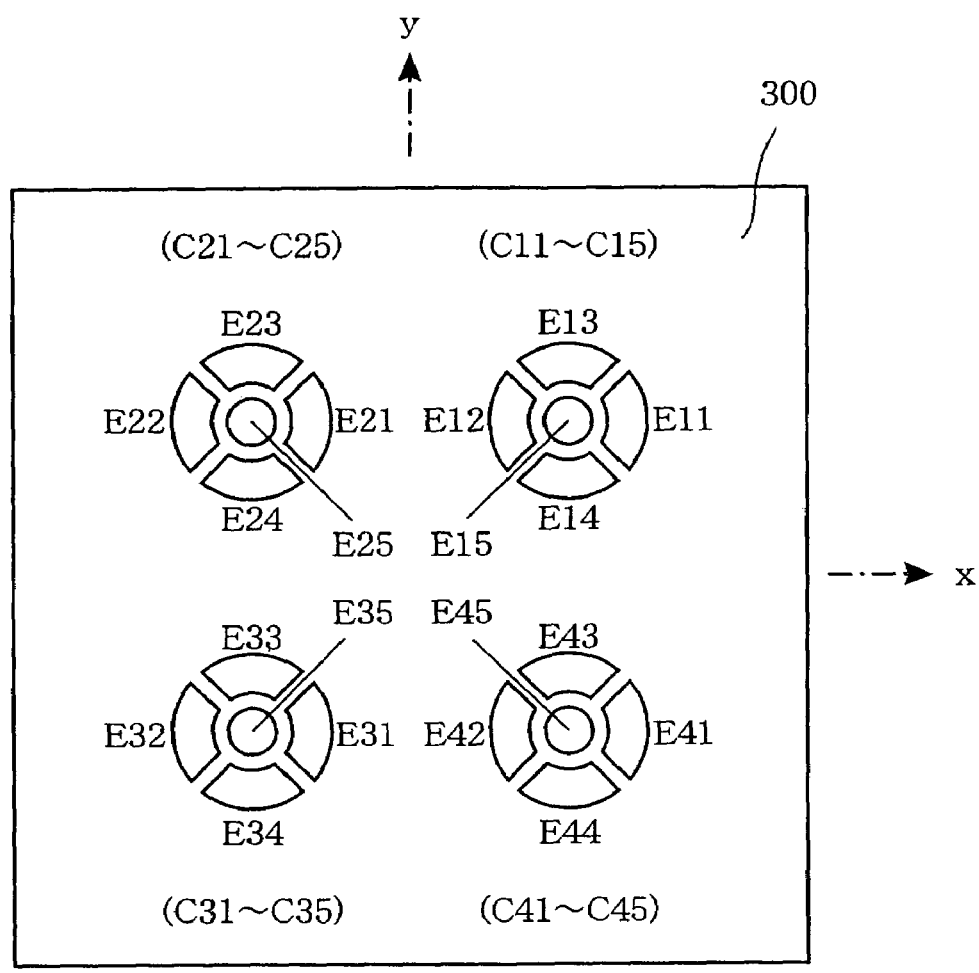
FIG. 18 is a top view of a supporting member 300 of the force detection device shown in FIG. 17.

Meanwhile, supporting member 300 is a completely plate-like member having a top surface with a square shape as shown in FIG. 18, and fixed electrodes E11 to E15, E21 to E25, E31 to E35, and E41 to E45 are disposed on the top surface. Though intermediate member 200, which is joined to the top surface of supporting member 300, is basically a plate-like member having a top surface with a square shape, four cylindrical protruding parts 210, 220, 230, and 240 extend upwards from the top surface (see FIGS. 9 and 17). Annular groove parts G21, G22, G23, and G24 are formed at the circumferences of the base parts of cylindrical protruding parts 210, 220, 230, and 240 and furthermore, cylindrical groove parts G31, G32, G33, and G34 are formed in the bottom surface of intermediate member 200. Both sets of groove parts G21, G22, G23, and G24, which are provided in the top surface of intermediate member 200, and groove parts G31, G32, G33, and G34, which are provided in the bottom surface, have circular outlines of the same size centered about the positions of the central axes of cylindrical protruding parts 210, 220, 230, and 240. As shown in FIG. 9, a diaphragm 215 exists as a boundary wall between groove parts G21 and G31 and a diaphragm 225 exists as a boundary wall between groove parts G22 and G32. Also as shown in FIG. 17, a diaphragm 235 exists as a boundary wall between groove parts G23 and G33 and a diaphragm 245 exists as a boundary wall between groove parts G24 and G34.

The bottom surfaces of the four cylindrical protruding parts 110, 120, 130, and 140 that extend downward from the force Zo receiving member 100 side are joined to the top surfaces of the four cylindrical protruding parts 210, 220, 230, and 240 that extend upward from the intermediate member 200 side. Here, as shown in FIG. 9, the cylindrical structure that is formed by joining cylindrical protruding part 110 and cylindrical protruding part 210 shall be referred to as a first force transmitting member T1 and the cylindrical structure that is formed by joining cylindrical protruding part 120 and cylindrical protruding part 220 shall be referred to as a second force transmitting member T2, and as shown in FIG. 17, the cylindrical structure that is formed by joining cylindrical protruding part 130 and cylindrical protruding part 230 shall be referred to as a third force transmitting member T3 and the cylindrical structure that is formed by joining cylindrical protruding part 140 and cylindrical protruding part 240 shall be referred to as a fourth force transmitting member T4.

The first to fourth force transmitting members T1 to T4 are thus positioned respectively at the first to fourth quadrants of the XY two-dimensional coordinate system, the upper ends thereof are connected to force receiving member 100 with thin parts 115, 125, 135, and 145, having flexibility, as connecting members, the lower ends thereof are connected to the centers of diaphragms 215, 225, 235, 245, each of which functions as a connecting member, and the circumferences of these diaphragms are connected via intermediate member 200 to supporting member 300.

Since diaphragms 215, 225, 235, and 245 are formed of a conductive material, these have conductivity as well as flexibility and function in themselves as common displaceable electrodes. Thus in FIG. 18, fixed electrodes E11 to E15, which are positioned in the first quadrant, and diaphragm 215, which functions as a common displaceable electrode, form capacitance elements C11 to C15 that function as a first sensor S1, fixed electrodes E21 to E25, which are positioned in the second quadrant, and diaphragm 225, which functions as a common displaceable electrode, form capacitance elements C21 to C25 that function as a second sensor S2, fixed electrodes E31 to E35, which are positioned in the third quadrant, and diaphragm 235, which functions as a common displaceable electrode, form capacitance elements C31 to C35 that function as a third sensor S3, and fixed electrodes E41 to E45, which are positioned in the fourth quadrant, and diaphragm 245, which functions as a common displaceable electrode, form capacitance elements C41 to C45 that function as a fourth sensor S4.

By using such a force detection device, all of the six force components, Fx, Fy, Fz, Mx, My, and Mz, shown in the upper part of FIG. 1, can be detected independent of each other.

FIGS. 19A and 19B show tables indicating the modes of variation of the static capacitance values of the respective capacitance elements C11 to C45 that occur here, with "0" indicating no change, "+" indicating an increase, and "−" indicating a decrease. Though these tables show only cases where the values of the six force components of Fx, Fy, Fz, Mx, My, and Mz are positive, the increase/decrease relationships simply become reversed in the case of negative values. Since the reasons why the static capacitance values of the respective capacitance elements vary as shown in the tables of FIGS. 19A and 19B are substantially the same as those of the first embodiment described in §3, detailed description thereof shall be omitted here.

To provide some supplementary description, the tables of FIGS. 19A and 19B contain the rows of Fy, which were not indicated in the table of FIG. 13. The use of four force transmitting members T1 to T4 enables the inclusion of the rows of Fy. That is, when four force transmitting members T1 to T4 are used, since two pairs of force transmitting members (T1/T2 and T3/T4), which are positioned on the same plane parallel to the XZ plane, exist and two pairs of force transmitting members (T1/T4 and T2/T3), which are positioned on the same plane parallel to the YZ plane, exist, the detection of force components based on the principle shown in FIG. 2B is enabled not only in relation to the X-axis but also in relation to the Y-axis.

Also, the detection of a moment Mz about the Z-axis is enabled by the use of four force transmitting members T1 to T4. The directions in which the four force transmitting members T1 to T4 become inclined in a case where a positive direction moment +Mz about the Z-axis (which will be a counterclockwise moment in the plan view of FIG. 18) is applied to force receiving member 100 shall now be described with reference to FIG. 18.

Firstly, first force transmitting member T1 (positioned above fixed electrode E15 of the Figure), positioned in the first quadrant, becomes inclined in the upper left direction in FIG. 18 so that capacitance elements C12 and C13 become narrower in electrode interval and increase in static capacitance value while capacitance elements C11 and C14 become wider in electrode interval and decrease in static capacitance value. Also, second force transmitting member T2 (positioned above fixed electrode E25 of the Figure), positioned in the second quadrant, becomes inclined in the lower left direction in FIG. 18 so that capacitance elements C22 and C24 become narrower in electrode interval and increase in static capacitance value while capacitance elements C21 and C23 become wider in electrode interval and decrease in static capacitance value. Furthermore, third force transmitting member T3 (positioned above fixed electrode E35 of the Figure), positioned in the third quadrant, becomes inclined in the lower right direction in FIG. 18 so that capacitance elements C31 and C34 become narrower in electrode interval and increase in static capacitance value while capacitance elements C32 and C33 become wider in electrode interval and decrease in static capacitance value. Lastly, fourth force transmitting member T4 (positioned above fixed electrode E45 of the Figure), positioned in the fourth quadrant, becomes inclined in the upper right direction in FIG. 18 so that capacitance elements C41 and C43 become narrower in-electrode interval and increase in static capacitance value while capacitance elements C42 and C44 become wider in electrode interval and decrease in static capacitance value. With the static capacitance value of each of capacitance elements C15, C25, C35, and C45, a change does not occur in total.

Thus when a positive direction moment +Mz about the Z-axis acts on force receiving member 100, the increase/decrease results shown in the sixth rows of FIGS. 19A and 19B are obtained. Obviously when a negative direction moment −Mz about the Z-axis acts on force receiving member 100, results with which the negative/positive relationships are reversed will be obtained.

Figure 20:
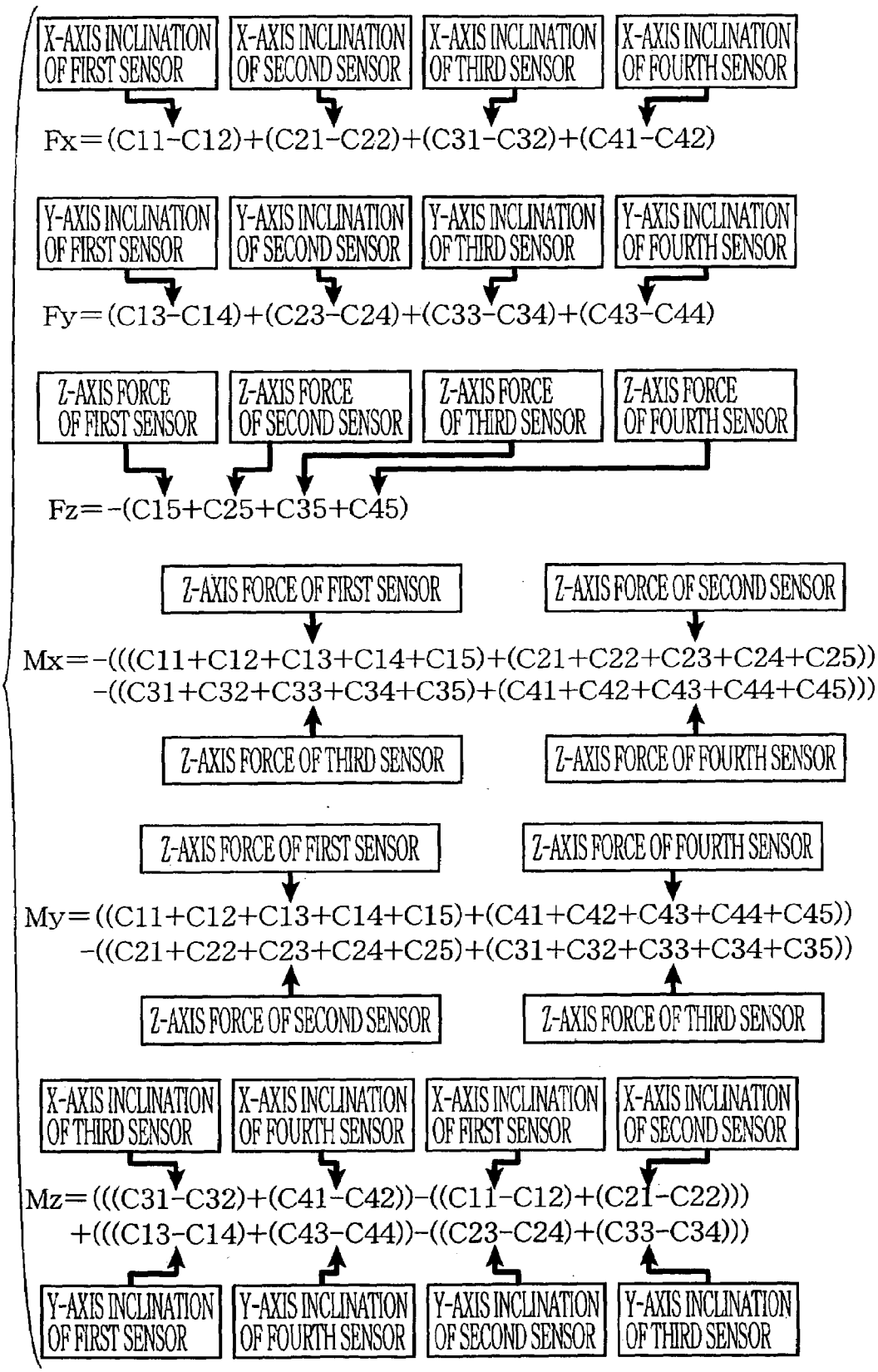
FIG. 20 is a diagram illustrating, by way of numerical equations, the principles of detection of the respective force components by the force detection device shown in FIG. 17.

Based on the results shown in the tables of FIGS. 19A and 19B, it can be understood that by preparing as detection processing unit 30, a circuit, which measures the static capacitance values (here, the static capacitance values themselves shall be indicated by the same symbols, C11 to C45) of the twenty capacitance elements C11 to C45, and a processing device, which uses the respective measured static capacitance values and performs computations based on the equations shown in FIG. 20, the six components, Fx, Fy, Fz, Mx, My, and Mz, can be obtained.

For example, the equation, Fx=(C11−C12)+(C21−C22)+(C31−C32)+(C41−C42), shown in FIG. 20, is based on the results of the first rows (rows of +Fx) of the tables of FIGS. 19A and 19B and signifies that the X-axis direction component Fx of a force that acts on force receiving member 100 can be detected based on a sum of the inclination degrees in relation to the X-axis direction of the respective force transmitting members T1 to T4, which are detected by the first to fourth sensors. This is based on the detection principle illustrated in FIG. 2B.

Also, the equation, Fy=(C13−C14)+(C23−C24)+(C33−C34)+(C43−C44), shown in FIG. 20 is based on the results of the second rows (rows of +Fy) of the tables of FIGS. 19A and 19B and signifies that the Y-axis direction component Fy of a force that acts on force receiving member 100 can be detected based on a sum of the inclination degrees in relation to the Y-axis direction of the respective force transmitting members T1 to T4, which are detected by the first to fourth sensors. This is based on the detection principle illustrated in FIG. 2B.

Furthermore, the equation, Fz=−(C15+C25+C35+C45), shown in FIG. 20 is based on the results of the third rows (rows of +Fz) of the tables of FIGS. 19A and 19B and signifies that the Z-axis direction component Fz of a force that acts on force receiving member 100 can be detected based on a sum of the forces in relation to the Z-axis direction of the respective force transmitting members T1 to T4, which are detected by the first to fourth sensors. The minus sign at the front of the equation is due to the setting of the Z-axis direction.

Meanwhile, the equation, Mx=−(((C11+C12+C13+C14+C15)+(C21+C22+C23+C24+C25))−((C31+C32+C33+C34+C35)+(C41+C42+C43+C44+C45))), shown in FIG. 20, is based on the results of the fourth rows (rows of +Mx) of the tables of FIGS. 19A and 19B and signifies that the moment Mx about the X-axis of a force that acts on force receiving member can be detected based on the difference between the sum of the forces in relation to the Z-axis direction which are detected by the first and second sensors, and the sum of the forces in relation to the Z-axis direction which are detected by the third and fourth sensors. This detection corresponds to the case where the point P3 in the top view of FIG. 16 moves upwards (in the positive Z-axis direction) and the point P4 moves downwards (in the negative Z-axis direction) and is based on the detection principle shown in FIG. 2C. The minus sign at the front of the equation is due to the manner in which the direction of the moment is set.

Also, the equation, My=((C11+C12+C13+C14+C15)+(C41+C42+C43+C44+C45))−((C21+C22+C23+C24+C25)+(C31+C32+C33+C34+C35)), shown in FIG. 20, is based on the results of the fifth rows (rows of +My) of the tables of FIGS. 19A and 19B and signifies that the moment My about the Y-axis of a force that acts on force receiving member 100 can be detected based on the difference between the sum of the forces in relation to the Z-axis direction which are detected by the first and fourth sensors, and the sum of the forces in relation to the Z-axis direction which are detected by the second and third sensors. This detection corresponds to the case where the point P1 in the top view of FIG. 16 moves downwards (in the negative Z-axis direction) and the point P2 moves upwards (in the positive Z-axis direction) and is based on the detection principle shown in FIG. 2C.

Lastly, the equation, Mz=(((C31−C32)+(C41−C42))−((C11−C12)+(C21−C22)))+(((C13−C14)+(C43−C44))−((C23−C24)+(C33−C34))), shown in FIG. 20, is based on the results of the sixth rows (rows of +Mz) of the tables of FIGS. 19A and 19B and signifies that the moment Mz about the Z-axis of a force that acts on the force receiving member 100 can be detected by determining, as a first difference, the difference between the sum of the inclination degrees in relation to the X-axis direction that are detected by the third and fourth sensors and the sum of the inclination degrees in relation to the X-axis direction that are detected by the first and second sensors, determining, as a second difference, the difference between the sum of the inclination degrees in relation to the Y-axis direction that are detected by the first and fourth sensors and the sum of the inclination degrees in relation to the Y-axis direction that are detected by the second and third sensors, and based on the sum of the abovementioned first difference and the second difference.

The meaning of this equation for Mz can be made more readily understood by rewriting the equation as follows:

$$Mz = (C12 + C13) - (C11 + C14) + (C22 + C24) - (C21 + C23) + (C31 + C34) - (C32 + C33) + (C41 + C43) - (C42 + C44).$$

That is when a positive direction moment +Mz about the Z-axis acts, first force transmitting member T1, which is positioned above fixed electrode E15 in FIG. 18, becomes tilted in the upper left direction in the Figure as mentioned above, and (C12+C13)−(C11+C14) in the above equation is the term for detecting such an inclination of first force transmitting member T1. Likewise, second force transmitting member T2, which is positioned above fixed electrode E25, becomes tilted in the lower left direction in the Figure, and (C22+C24)−(C21+C23) in the above equation is the term for detecting such an inclination of second force transmitting member T2. Also, third force transmitting member T3, which is positioned above fixed electrode E35, becomes tilted in the lower right direction in the Figure, and (C31+C34)−(C32+C33) in the above equation is the term for detecting such an inclination of third force transmitting member T3. Furthermore, fourth force transmitting member T4, which is positioned above fixed electrode E45, becomes tilted in the upper right direction in the Figure, and (C41+C43)−(C42+C44) in the above equation is the term for detecting such an inclination of fourth force transmitting member T4. The above equation thus indicates the sum of the detection values of the inclination degrees in predetermined directions of the four force transmitting members T1 to T4 in a case where a moment Mz about the Z-axis acts.

As described in §3, there are a plurality of variations in the methods for determining forces in relation to the Z-axis direction of the respective force transmitting members T1 to T4 and these variations may also be applied to the equations shown in FIG. 20. Thus for example, the equation, Mx=−((C15 +C25)−(C35+C45)) and the equation, My=((C15+C45)−(C25+C35)) may also be used.

<<<§5. Third Embodiment of the Invention>>>

A force detection device of a third embodiment of this invention shall now be described. Like the above-described force detection device of the second embodiment, the force detection device of the third embodiment performs detection using four columnar force transmitting members and four sensors S1 to S4. However, the present embodiment differs slightly in the positioning of the four columnar force transmitting members. A description shall now be provided concerning just this difference.

Figure 21:
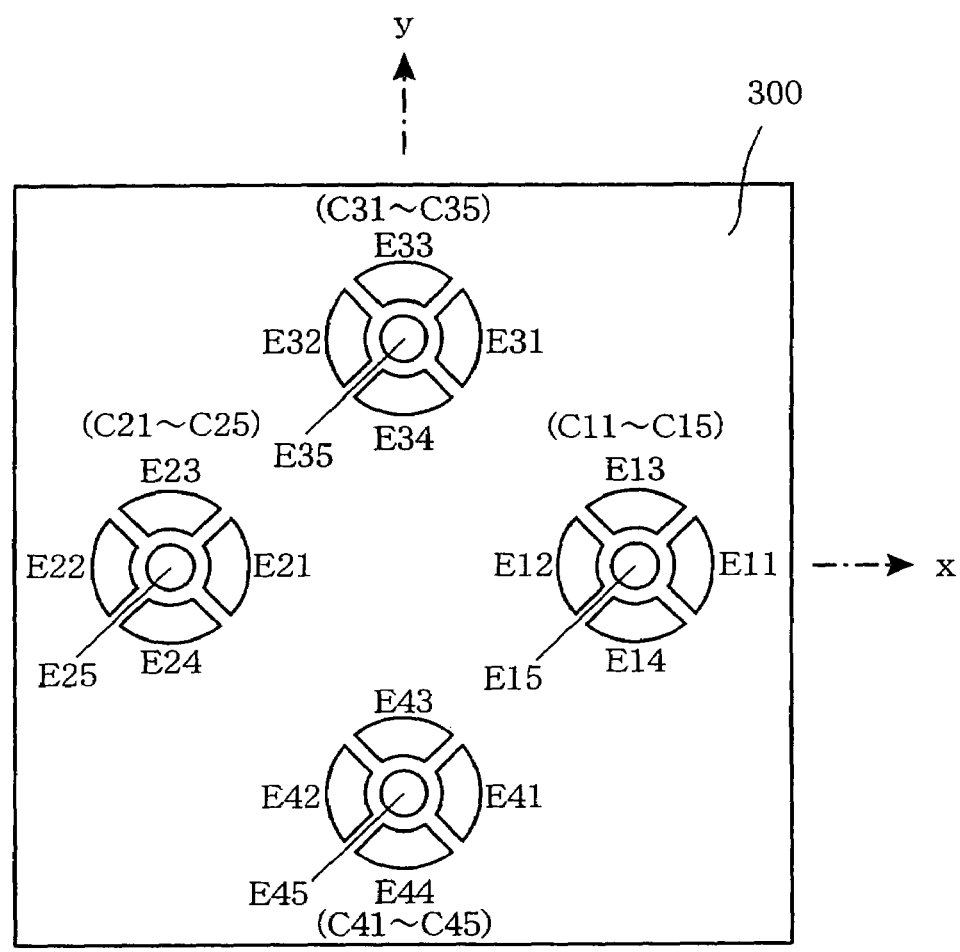
FIG. 21 is a top view of a supporting member 300 of a force detection device of a third embodiment of this invention.

FIG. 21 is a top view of a supporting member 300 used in the force detection device of the third embodiment. A comparison with FIG. 18, which is a top view of supporting member 300 used in the above-described force detection device of the second embodiment, clearly shows the differences between the two. That is, as shown in FIG. 18, with the second embodiment, fixed electrodes E11 to E15, E21 to E25, E31 to E35, and E41 to E45, which are components of the four sensors S1 to S4, are respectively positioned in the first to fourth quadrants of the xy coordinate system and first to fourth force transmitting members T1 to T4 are respectively positioned in the first to fourth quadrants of the XY two-dimensional coordinate system.

On the other hand, with the force detection device of the third embodiment shown in FIG. 21, fixed electrodes E11 to E15, E21 to E25, E31 to E35, and E41 to E45, which are components of four sensors S1 to S4, are respectively positioned at positive parts of the x-axis, negative parts of the x-axis, positive parts of the y-axis, and negative parts of y-axis, and the longitudinal directions of first to fourth force transmitting members T1 to T4 are positioned so as to respectively intersect a positive part of the X-axis, a negative part of the X-axis, a positive part of the Y-axis, and a negative part of the Y-axis of the XY two-dimensional coordinate system. The point that capacitance elements C11 to C15, C21 to C25, C31 to C35, and C41 to C45 are formed by the respective fixed electrodes E11 to E15, E21 to E25, E31 to E35, and E41 to E45 and conductive diaphragms (common displaceable electrodes) positioned above the fixed electrodes is the same as the above-described second embodiment. However, since the positioning of the force transmitting members and the sensors differ, the detection processes of detection processing unit 30 differ somewhat.

FIGS. 22A and 22B show tables indicating the modes of variation of the static capacitance values of the respective capacitance elements C11 to C45 of the force detection device of the third embodiment. Here again, "0" indicates no change, "+" indicates an increase, and "−" indicates a decrease. Also, though these tables again show only cases where the values of the six force components, Fx, Fy, Fz, Mx, My, and Mz, are positive, the increase/decrease relationships simply become reversed in the case of negative values. A comparison of the tables shown in FIGS. 22A and 22B with the tables shown in FIGS. 19A and 19B show the modes of variation of the static capacitance values of the respective capacitance elements in cases where force components Fx, Fy, and Fz of the respective axial directions act to be exactly the same in both cases. The principles of detection related to force components Fx, Fy, and Fz of the respective axial directions are thus the same as those described above for the second embodiment.

However, the modes of variation of the static capacitance values of the respective capacitance elements in cases where moments Mx, My, and Mz about the respective axes act differ slightly and the principles of detection of these moments differ from those described above for the second embodiment. This point shall now be described briefly.

First, when a moment Mx about the X-axis acts, a pulling force (+fz) acts on supporting member 300 from third force transmitting member T3, positioned at the positive part of the Y-axis, and a pushing force (−fz) acts on supporting member 300 from fourth force transmitting member T4, positioned at the negative part of the Y-axis. In this case, there is no significant action of force on supporting member 300 from first force transmitting member T1, positioned at the positive part of the X-axis, and second force transmitting member T2, positioned at the negative part of the X-axis. Though actually forces in relation to the Z-axis act partially, since these are slight in comparison to the forces transmitted from the third and fourth force transmitting members, it shall be considered here that the variations of the capacitance elements C11 to C15 and C21 to C25 are "0." Results such as those shown in the fourth rows (rows of +Mx) of FIGS. 22A and 22B are thus obtained.

Meanwhile, when a moment My about the Y-axis acts, a pressing force (−fz) acts on supporting member 300 from first force transmitting member T1, positioned at the positive part of the X-axis, and a pulling force (+fz) acts on supporting member 300 from second force transmitting member T2, positioned at the negative part of the X-axis. In this case, there is no significant action of force on supporting member 300 from third force transmitting member T3, positioned at the positive part of the Y-axis, and fourth force transmitting member T4, positioned at the negative part of the Y-axis. Results such as those shown in the fifth rows (rows of +My) of FIGS. 22A and 22B are thus obtained.

Next, in reference to FIG. 21, the directions of inclinations of the four force transmitting members T1 to T4 in a case where a positive moment +Mz about the Z-axis (a counterclockwise moment in the plan view of FIG. 21) acts on force receiving member 100 shall be described.

Firstly, first force transmitting member T1 (positioned above fixed electrode E15 of the Figure), positioned at the positive part of the X-axis, becomes inclined in the upward direction (positive y-axis direction) in FIG. 21 so that capacitance element C13 becomes narrower in electrode interval and increases in static capacitance value while capacitance element C14 becomes wider in electrode interval and decreases in static capacitance value. Also, second force transmitting member T2 (positioned above fixed electrode E25 of the Figure), positioned at the negative part of the X-axis, becomes inclined in the downward direction (negative y-axis direction) in FIG. 21 so that capacitance element C24 becomes narrower in electrode interval and increases in static capacitance value while capacitance element C23 becomes wider in electrode interval and decreases in static capacitance value. Furthermore, third force transmitting member T3 (positioned above fixed electrode E35 of the Figure), positioned at the positive part of the Y-axis, becomes inclined in the leftward direction (negative x-axis direction) in FIG. 21 so that capacitance element C32 becomes narrower in electrode interval and increases in static capacitance value while capacitance element C31 becomes wider in electrode interval and decreases in static capacitance value. Lastly, fourth force transmitting member T4 (positioned above fixed electrode E45 of the Figure), positioned at the negative part of the Y-axis, becomes inclined in the rightward direction (positive x-axis direction) in FIG. 21 so that capacitance element C41 becomes narrower in electrode interval and increases in static capacitance value while capacitance element C42 becomes wider in electrode interval and decrease in static capacitance value. With the static capacitance value of each of the other capacitance elements, a change does not occur in total.

Thus when a positive direction moment +Mz about the Z-axis acts on force receiving member 100, the increase/decrease results shown in the sixth rows of FIGS. 22A and 22B are obtained. Obviously when a negative direction moment −Mz about the Z-axis acts on force receiving member 100, results with which the negative/positive relationships are reversed will be obtained.

Figure 23:
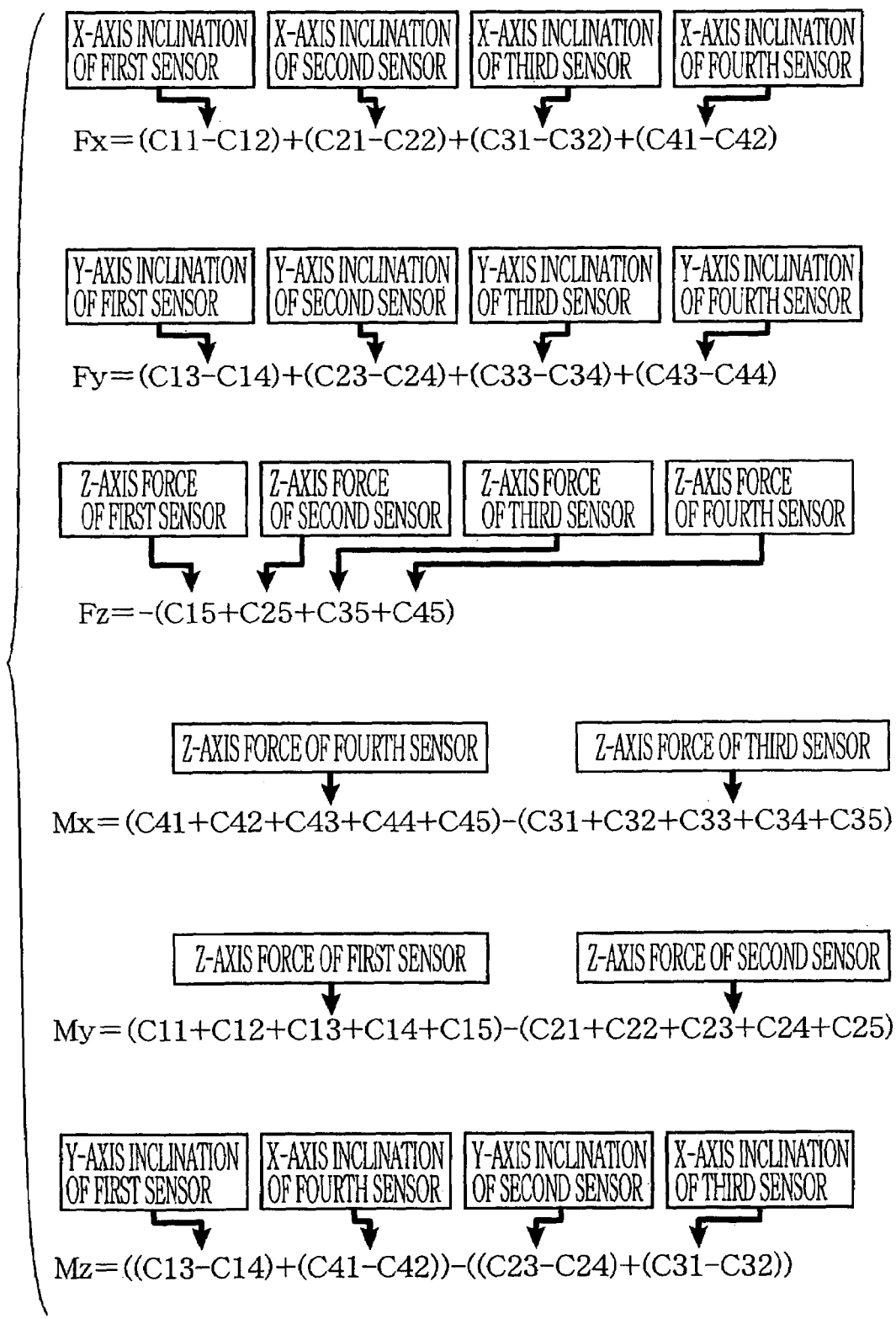
FIG. 23 is a diagram illustrating, by way of numerical equations, the principles of detection of the respective force components by the force detection device shown in FIG. 21.

Thus, based on the results shown in the tables of FIGS. 22A and 22B, the six components, Fx, Fy, Fz, Mx, My, and Mz, can be obtained by preparing as detection processing unit 30, a circuit, which measures the static capacitance values (here, the static capacitance values themselves shall be indicated by the same symbols, C11 to C45) of the twenty capacitance elements C11 to C45, and a processing device, which uses the respective measured static capacitance values and performs computations based on the equations shown in FIG. 23. The equations for Fx, Fy, and Fz shown in FIG. 23 are exactly the same as those shown in FIG. 20.

The equation, Mx=(C41+C42+C43+C44+C45)−(C31+C32+C33+C34+C35), shown in FIG. 23, is based on the results of the fourth rows (rows of +Mx) of the tables of FIGS. 22A and 22B and signifies that the moment Mx about the X-axis of a force that acts on the force receiving member 100 can be detected based on the difference between the force in relation to the Z-axis direction which is detected by the fourth sensor, and the force in relation to the Z-axis direction which is detected by the third sensor.

Also, the equation, My=(C11+C12+C13+C14+C15)−(C21+C22+C23+C24+C25), shown in FIG. 23, is based on the results of the fifth rows (rows of +My) of the tables of FIGS. 22A and 22B and signifies that the moment My about the Y-axis of a force that acts on the force receiving member 100 can be detected based on the difference between the force in relation to the Z-axis direction which is detected by the first sensor, and the force in relation to the Z-axis direction which is detected by the second sensor.

Lastly, the equation, Mz=((C13−C14)+(C41−C42))−((C23−C24)+(C31−C32)), shown in FIG. 23, is based on the results of the sixth rows (rows of +Mz) of the tables of FIGS. 22A and 22B and signifies that the moment Mz about the Z-axis of a force that acts on the force receiving member 100 can be detected by determining the difference between the sum of the inclination degree in relation to the Y-axis direction detected by the first sensor, and the inclination degree in relation to the X-axis direction detected by the fourth sensor, and the sum of the inclination degree in relation to the Y-axis direction detected by the second sensor and the inclination degree in relation to the X-axis direction detected by the third sensor.

As described in §3, there are a plurality of variations in the methods for determining forces in relation to the Z-axis direction of the respective force transmitting members T1 to T4 and these variations may also be applied to the equations shown in FIG. 23.

<<<§6. Modification Examples Having Restricting Members Added>>>

Figure 24:
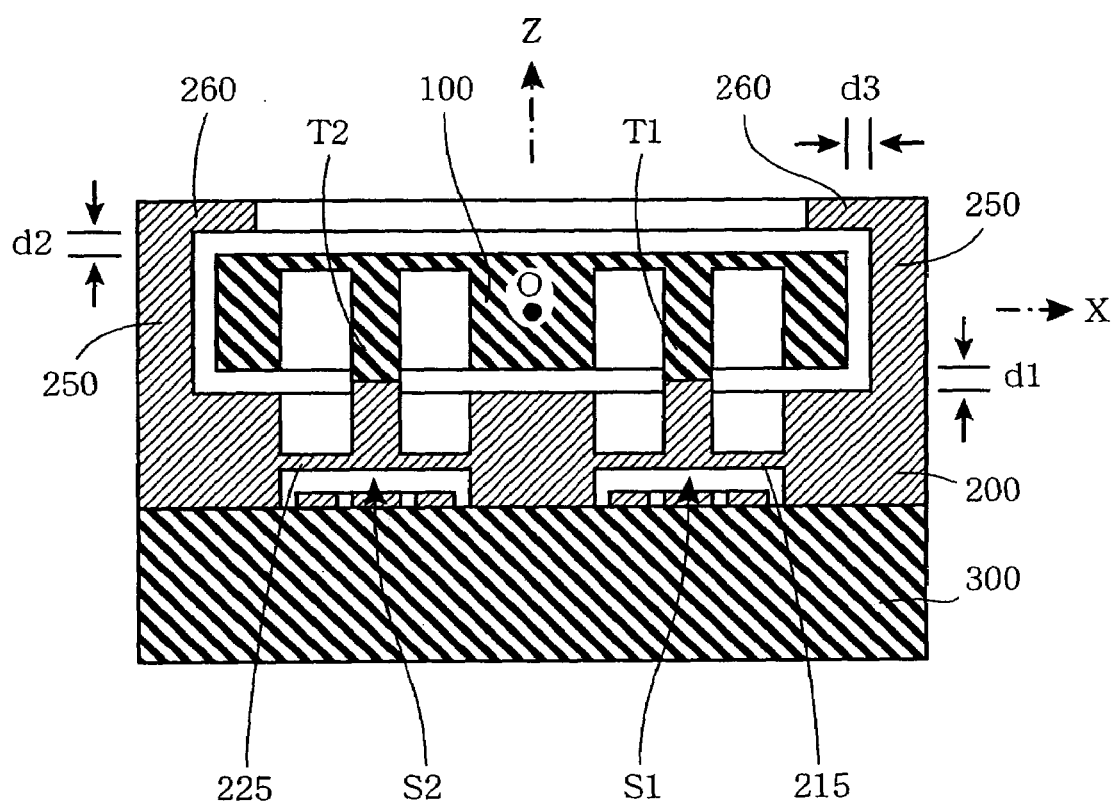
FIG. 24 is a side view in section showing the structure of a modification example, with which a restricting member is added to the force detection device shown in FIG. 9.

FIG. 24 is a side view in section showing the structure of a modification example wherein restricting members are added to the force detection device of the first embodiment shown in FIG. 9. As described in §3, first sensor S1 and second sensor S2 are incorporated in the force detection device shown in FIG. 9, and these sensors have thin diaphragms 215 and 225. These diaphragms 215 and 225 have some degree of flexibility, and when forces within an allowable range act from force transmitting member T1 and T2, the diaphragms deform in predetermined modes as described above. However, when an excessive force acts on diaphragm 215 or 225, mechanical damage, such as the forming of cracks, may be sustained.

The modification example shown in FIG. 24 is an example wherein, in order to prevent the occurrence of mechanical damage due to the transmission of an excessive force to diaphragms 215 and 225, restricting members, which restrict the displacement of force receiving member 100 with respect to supporting member 300 within a predetermined range, are provided. As illustrated, in this example, restricting walls 250 are erected from outer peripheral parts of intermediate member 200 and furthermore, these walls have restricting canopy parts 260 formed at the upper parts. Also, the two force transmitting members T1 and T2 are set to be as short in total length as possible. As a result, the displacement of force receiving member 100 is restricted within predetermined ranges.

For example, the displacement of force receiving member 100 downwards (in the negative Z-axis direction) is restricted to be within the illustrated dimension d1. Even if a large downward force acts on force receiving member 100, the bottom surface of force receiving member 100 will contact the top surface of intermediate member 200 at the stage at which the downward displacement of force receiving member 100 reaches the dimension d1 and further displacement is thus restricted.

Also, the displacement of force receiving member 100 upwards (in the positive Z-axis direction) is restricted to be within the illustrated dimension d2. Even if a large upward force acts on force receiving member 100, the top surface of force receiving member 100 will contact the bottom surfaces of restricting canopy parts 260 at the stage at which the upward displacement of force receiving member 100 reaches the dimension d2 and further displacement is thus restricted.

Furthermore, the displacements of force receiving member 100 in transverse directions (in the ±X-axis directions and ±Y-axis directions) are restricted to be within the illustrated dimension d3. Even if a large transverse direction force acts on force receiving member 100, a side surface of force receiving member 100 will contact an inner surface of a restricting wall 250 at the stage at which the transverse direction displacement of force receiving member 100 reaches the dimension d3 and further displacement is thus restricted. Obviously, such restricting members may also be applied to the devices of the second and third embodiments.

Figure 25:
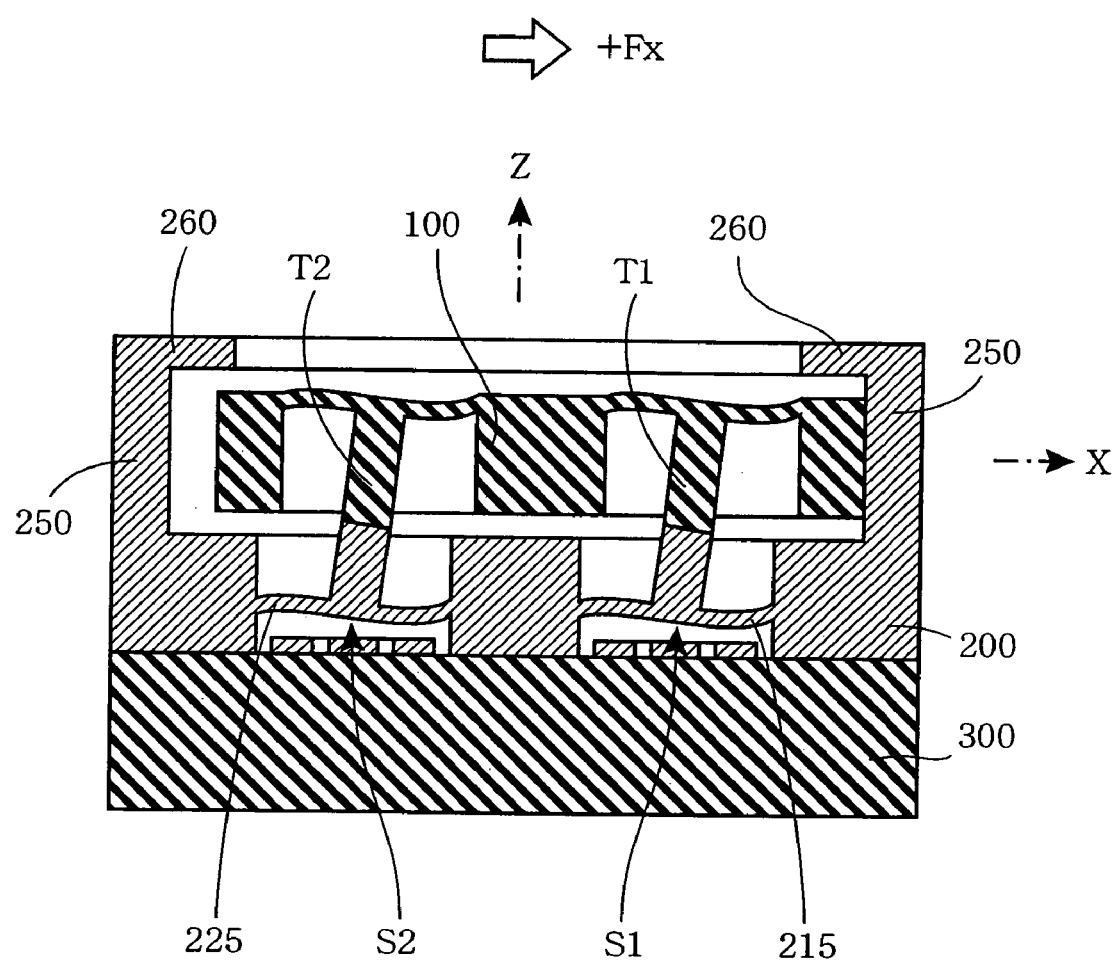
FIG. 25 is a side view in section showing a state wherein an excessive force +Fx is applied to the force detection device shown in FIG. 24.
Figure 26:
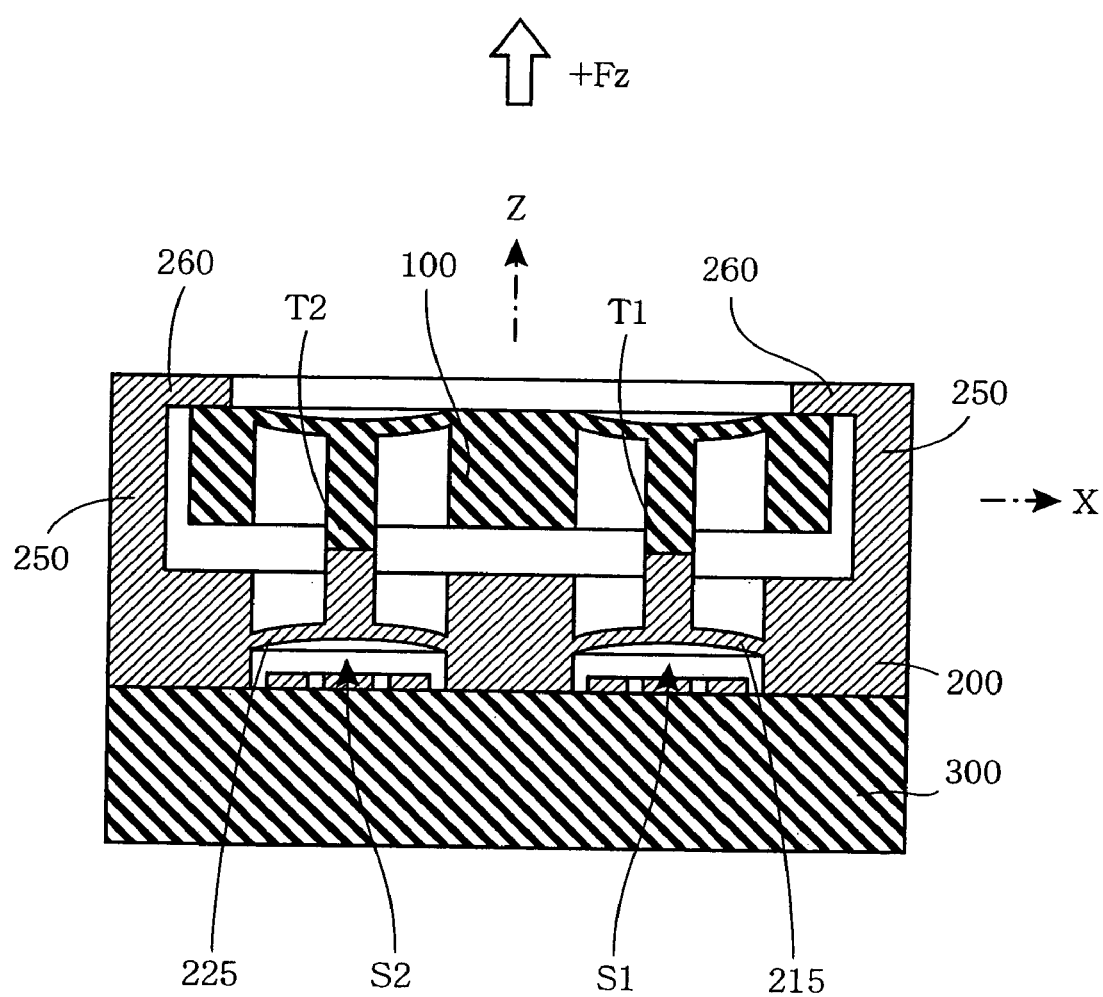
FIG. 26 is a side view in section showing a state wherein an excessive force +Fz is applied to the force detection device shown in FIG. 24.
Figure 27:
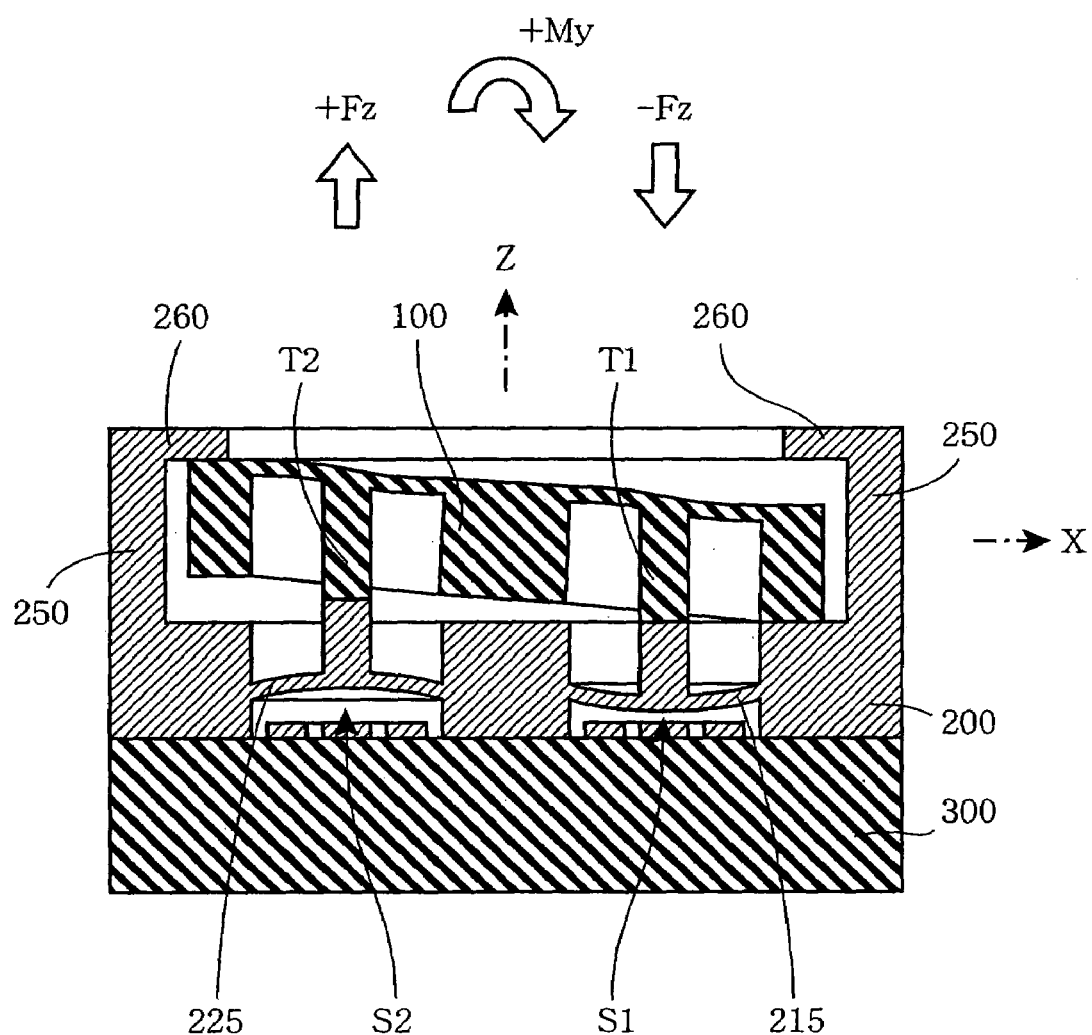
FIG. 27 is a side view in section showing a state wherein an excessive moment +My is applied to the force detection device shown in FIG. 24.

States in which displacements are actually restricted by the embodiment using such restricting members are illustrated in the side views in section of FIGS. 25 to 27. FIG. 25 shows a state in which an excessive positive X-axis direction force +Fx is applied. The right side surface of force receiving member 100 contacts a restricting wall 250 and further displacement is restricted. Meanwhile, FIG. 26 shows a state wherein an excessive positive Z-axis direction force is applied. The outer top surface of force receiving member 100 contacts restricting canopy parts 260 and further displacement is restricted. FIG. 27 shows a state wherein an excessive positive moment +My about the Y-axis is applied. In this case, though the illustrated displacements occur due to a force −Fz in the downward direction of the Figure being applied to first force transmitting member T1 and a force +Fz in the upward direction of the Figure being applied to second force transmitting member T2, further displacements are restricted. Since the variations of the electrode intervals of the respective capacitance elements are also illustrated in these FIGS. 25 to 27, it can be understood that the variations of static capacitance values that are shown in the tables of FIGS. 19A, 19B and 22A, 22B occur.

<<<§7. Modification Example Wherein an Auxiliary Base Plate and Auxiliary Capacitance Elements Are Added>>>

A modification example that uses an auxiliary base plate and auxiliary capacitance elements shall now be described. First, it can be understood from the six equations shown in FIG. 20 or the six equations shown in FIG. 23 that with the five equations besides the equation for determining a force Fz, both addition and subtraction of static capacitance values are carried out. For example, the equation for determining a force Fx can be rearranged as:

$$Fx=(C11+C21+C31+C41)-(C12+C22+C32+C42)$$

and the equation for determining a force Fy can be rearranged as:

$$Fy=(C13+C23+C33+C43)-(C14+C24+C34+C44)$$

Thus of the six force components, with the five components besides force Fz, the detection of force or moment is carried out based on the difference between the static capacitance value of the entirety of a set of capacitance elements belonging to one group and the static capacitance value of the entirety of a set of capacitance elements belonging to another group.

However with a force Fz, subtraction concerning static capacitance values is not carried out as can be understood from the equation in FIG. 20 or FIG. 23. That aminus sign is attached to the front of the equation for Fz is due to the manner of defining the direction of the coordinate axis, and this indicates that when a positive Z-axis direction force +Fz acts, the detection value (sum of the static capacitance values C15, C25, C35, and C45) decreases with respect to a reference value, and when a negative Z-axis direction force −Fz acts, the detection value increases with respect to the reference value.

Thus among the six force components, whereas each of the force components besides Fz is obtained as a difference between two static capacitance values, just the force Fz is not an amount that is obtained as a difference. This signifies that in the state in which no forces that are to be detected are acting whatsoever, whereas the detection values of the forces Fx, Fy, Mx, My, and Mz will be output as 0, the detection value of the force Fz will not be 0 but will be output as a predetermined reference value. Obviously, if this reference value is measured in advance and the detection value of the force Fz is arranged to be output as the difference with respect to this reference value, there will be no problems in principle.

However in terms of practical use, there is an important difference between the method of obtaining a detection value as a difference between the static capacitance values of two capacitance element groups existing within a device and the method of obtaining a detection value as a difference between the static capacitance value of a single capacitance element group and a predetermined reference value. That is, whereas use of the former method provides the merit that errors are canceled out even if there is some scattering of dimensional precision among individual lots, such a merit is not provided with the latter method. Also, dimensional fluctuations due to thermal expansion of the respective parts occur according to the temperature conditions of the environment in which this force detection device is used, and whereas the former method provides the merit that the influences of such dimensional fluctuations are canceled out, such a merit is not provided with the latter method.

In consideration of these points, it is preferable for practical use to employ, as much as possible, a method of obtaining a detection value as a difference of static capacitance values of two capacitance element groups that exist within a device. It is thus preferable to enable the realization of detection by a difference of some form for the detection of a force Fz as well. The modification example to be described here realizes this by the provision of an auxiliary base plate.

Figure 28:
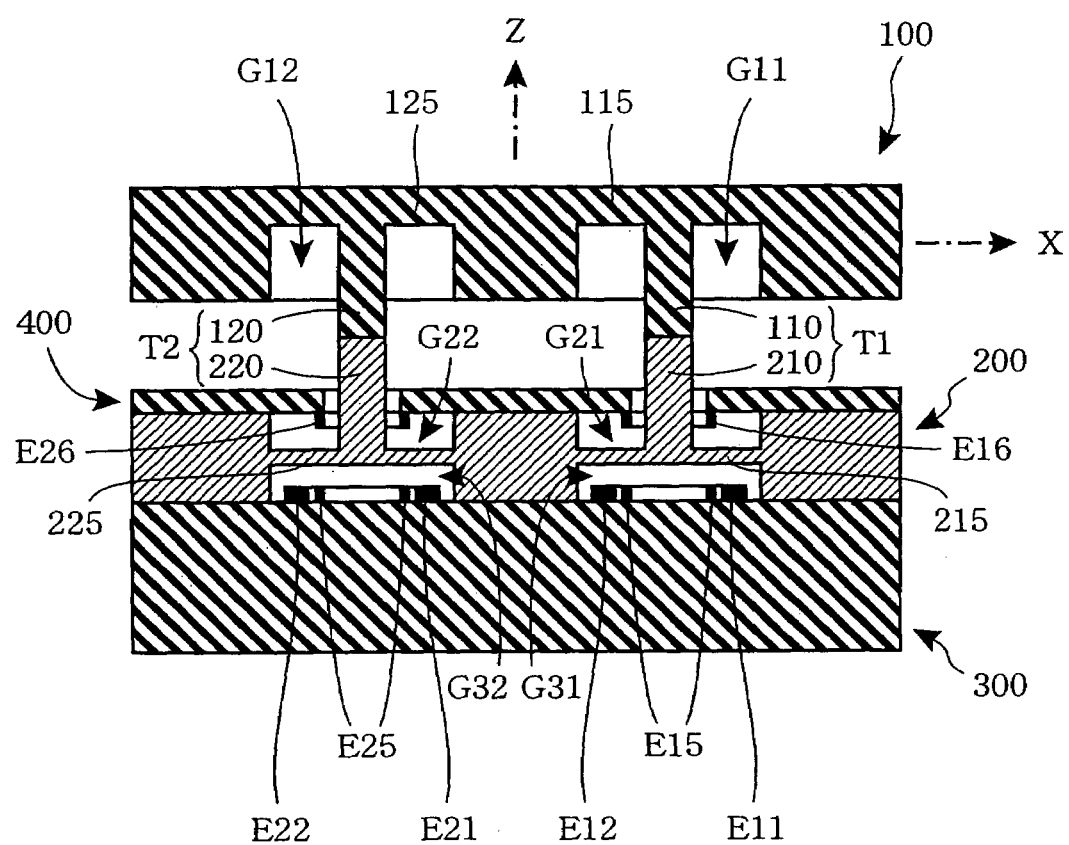
FIG. 28 is a side view in section of a force detection device of a modification example wherein an auxiliary base plate 400 is added.

FIG. 28 is a side view in section showing the arrangement of a force detection device of this modification example using an auxiliary base plate. The basic structure of this modification example is substantially the same as the structure of the force detection device of the above-described second embodiment, and a top view thereof is equivalent to the top view shown in FIG. 16. FIG. 28 is a side view in section along the position corresponding to line 9—9 of FIG. 16 of the force detection device of this modification example that uses an auxiliary base plate. This modification example shown in FIG. 28 differs from the above-described second embodiment in the following two points.

Figure 29:
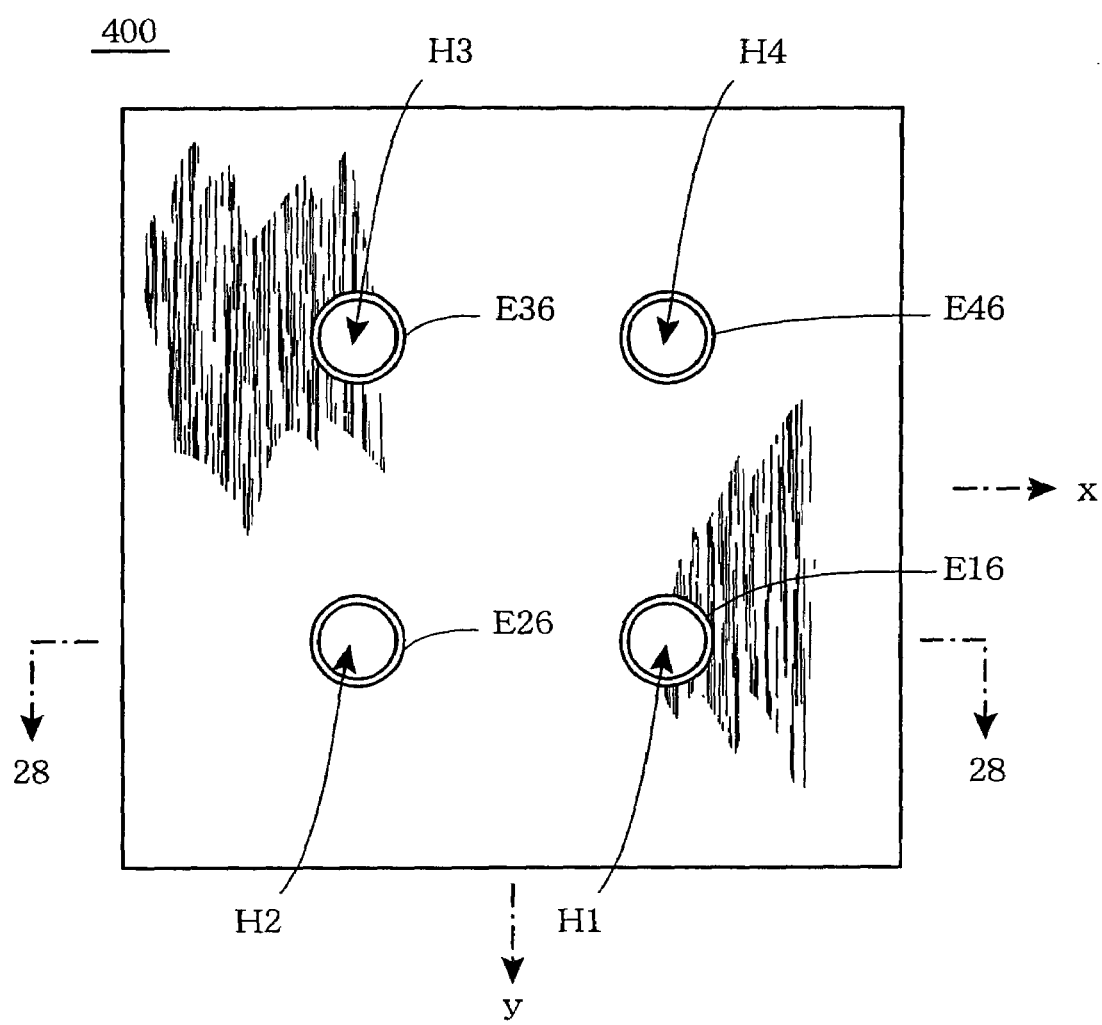
FIG. 29 is a bottom view of auxiliary base plate 400 used in the modification example shown in FIG. 28.

As shown in FIG. 28, the first difference is that with this modification example, an auxiliary base plate 400, having fixed electrodes E16, E26, E36, and E46 (E36 and E46 do not appear in FIG. 28) disposed on its bottom surface, is disposed on the top surface of intermediate member 200 (intermediate member 200 is also made slightly smaller in thickness). FIG. 29 is a bottom view of this auxiliary base plate 400 and a section along line 28—28 of this Figure of auxiliary base plate 400 is shown in FIG. 28. This auxiliary base plate 400 has formed therein openings H1 to H4 for passing through force transmitting members T1 to T4. The diameters of these openings H1 to H4 are set to be slightly greater than the diameters of force transmitting members T1 to T4 so that even when force transmitting members T1 to T4 become inclined or displaced, they will not contact auxiliary base plate 400.

Auxiliary base plate 400 is formed of an insulating material and is joined to the top surface of intermediate member 200. In other words, auxiliary base plate 400 is fixed via intermediate member 200 to supporting member 300 so as to be disposed above diaphragms 215, 225, 235, and 245 and be parallel to the XY plane. Annular fixed electrodes E16, E26, E36, and E46 are formed at the respective circumferences of openings H1 to H4.

Figure 30:
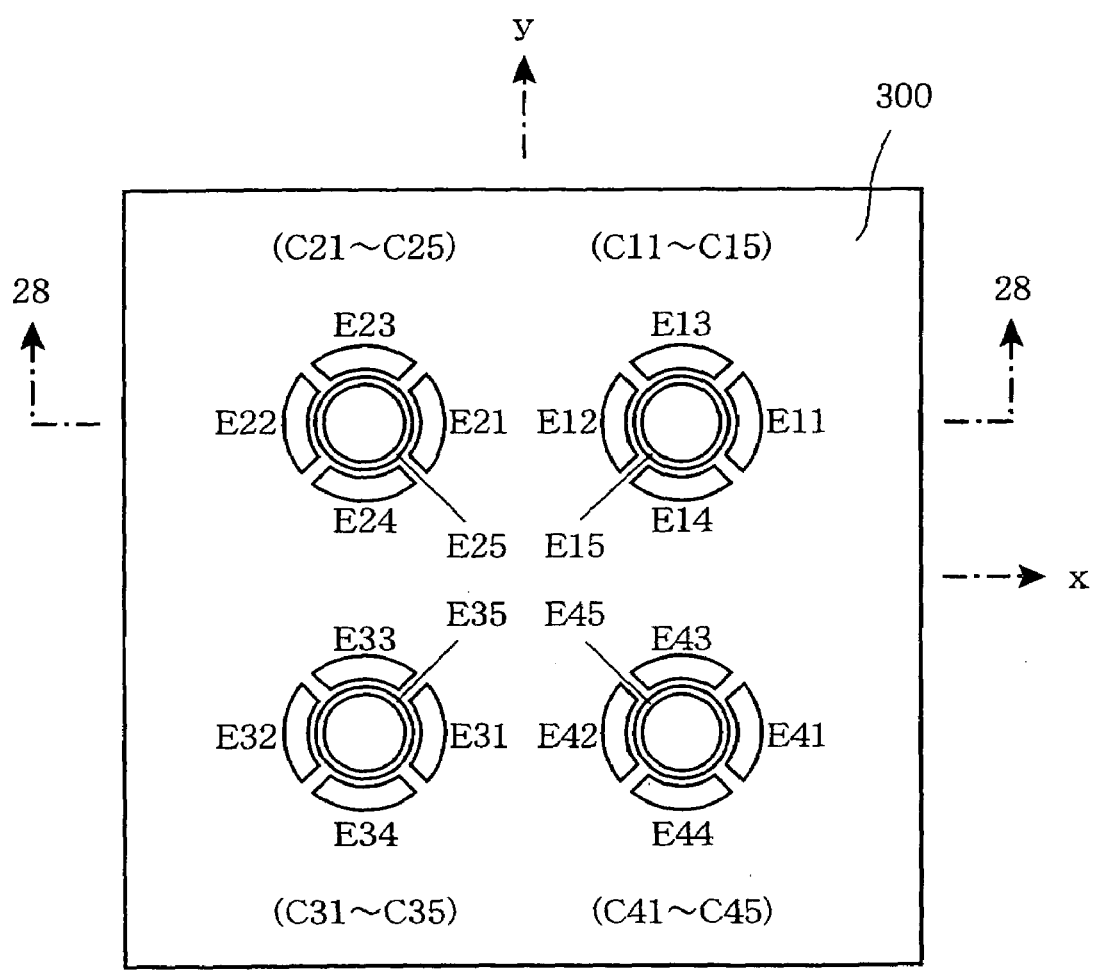
FIG. 30 is a top view of a supporting member 300 used in the modification example shown in FIG. 28.

The second difference is that whereas a total of twenty fixed electrodes are formed as shown in FIG. 18 on supporting member 300 in the above-described second embodiment, a total of twenty fixed electrodes are formed as shown in FIG. 30 in the present modification example. In both cases, fixed electrodes E11 to E15 are formed in the first quadrant of the xy coordinate system, fixed electrodes E21 to E25 are formed in the second quadrant, fixed electrodes E31 to E35 are formed in the third quadrant, and fixed electrodes E41 to E45 are formed in the fourth quadrant and these electrodes form a total of twenty capacitance elements of C11 to C15, C21 to C25, C31 to C35, and C41 to C45. As can be understood from a comparison of FIG. 18 and FIG. 30, the difference between the two lie in the shapes of the individual electrodes.

The shapes of the fixed electrodes formed on supporting member 300 are changed in order to make the shapes and positions of fixed electrodes E15, E25, E35, and E45, used for detection of a force Fz, the same as the shapes and positions of the fixed electrodes E16, E26, E36, and E46 at the auxiliary base plate 400 side, which are shown in FIG. 29. Since openings H1 to H4 for passing through force transmitting members T1 to T4 are formed in auxiliary base plate 400, fixed electrodes E16, E26, E36, and E46 are inevitably restricted in shape and position. In the example shown in FIG. 29, since fixed electrodes E16, E26, E36, and E46 are formed as annular (washer-like) electrodes that surround the immediate vicinities of the outer circumferences of openings H1 to H4, fixed electrodes E15, E25, E35, and E45, shown in FIG. 30 are also formed as annular electrodes of the same shape and size. As a result, slight changes of shape are also made in the other electrodes E11 to E14, E21 to E24, E31 to E34, and E41 to E44.

Since the lateral cross sections of these electrodes are extremely fine regions in terms of the drawing, they are indicated as solidly black regions in FIG. 28. As can be understood from FIG. 28, fixed electrodes E15 and E25, formed on the top surface of supporting member 300, and fixed electrodes E16 and E26, formed on the bottom surface of auxiliary base plate 400, are in a mirror image relationship in relation to the formation plane of diaphragms 215 and 225 (horizontal plane passing through the central position in the thickness direction). Also, though not appearing in the Figure, fixed electrodes E35 and E45, formed on the top surface of supporting member 300, and fixed electrodes E36 and E46, formed on the bottom surface of auxiliary base plate 400, are in a mirror image relationship in relation to the formation plane of diaphragms 235 and 245.

Here, the four fixed electrodes E16, E26, E36, and E46, formed at the auxiliary base plate 400 side, and the opposing parts of diaphragms 215, 225, 235, and 245, which are formed of conductive material, respectively form capacitance elements C16, C26, C36, and C46 (here, these shall be referred to as "auxiliary capacitance elements"). This modification example is thus provided with a total of twenty four fixed electrodes, of which twenty are formed on the top surface of supporting member 300 (see FIG. 30) and the remaining four are formed on the bottom surface of auxiliary base plate 400 (see FIG. 29). As a result, a total of twenty capacitance elements are positioned below diaphragms 215, 225, 235, and 245 and four auxiliary capacitance elements are positioned above diaphragms 215, 225, 235, and 245.

A characteristic of this modification example is that the static capacitance values of the auxiliary capacitance elements, each formed by a fixed electrode, fixed onto the bottom surface of auxiliary base plate 400, and a displaceable electrode, formed of a diaphragm itself, are used to perform detection of a specific force component. More specifically, as with capacitance elements C15, C25, C35, and C45, auxiliary capacitance elements C16, C26, C36, and C46 are used to detect a force Fz. However, the increase/decrease of the static capacitance values of auxiliary capacitance elements C16, C26, C36, and C46 will be exactly opposite that of the increase/decrease of capacitance elements C15, C25, C35, and C45. This can be understood readily from the side view in section of FIG. 28. For example, when a positive Z-axis direction force +Fz is applied to force receiving member 100, since force transmitting members T1 to T4 will be displaced upwards in the Figure and diaphragms 215 to 245 will also be displaced upwards, all of capacitance elements C15, C25, C35, and C45, which are formed below diaphragm 215 to 245, will become wider in electrode interval and decrease in static capacitance value while all of auxiliary capacitance elements C16, C26, C36, and C46, which are formed above diaphragms 215 to 245, will become narrower in electrode interval and increase in static capacitance value. Exactly the opposite phenomena will occur in the case where a negative Z-axis direction force −Fz is applied to force receiving member 100.

Thus with the force detection device of this embodiment, the equation:

$$Fz=(C16+C26+C36+C46)-(C15+C25+C35+C45)$$

may be used as the equation for detecting a force Fz in place of the equation for a force Fz shown in FIG. 20. This detection is based on the difference between the static capacitance value of the entirety of a set of capacitance elements belonging to one group and the static capacitance value of the entirety of a set of capacitance elements belonging to another group, and, as mentioned, above, can provide the merit of canceling out errors due to differences in dimensional precision according to lot and errors due to temperature variations.

Fixed electrodes E15, E25, E35, and E45, formed on the top surface of supporting member 300, and fixed electrodes E16, E26, E36, and E46, formed on the bottom surface of auxiliary base plate 400 are put in a mirror image relationship in relation to the diaphragm formation plane in order to enable detection of a force Fz by a simple calculation equation such as the above. For example, if fixed electrodes E15 and E16 are put in a mirror image relationship, capacitance element C15 and auxiliary capacitance element C16 will, in physical terms, be capacitance elements of the same shape and same size and will be complementary in the increase/decrease of static capacitance value due to displacement of diaphragm 215. A simple calculation equation without any factor terms in the respective static capacitance values can thus be employed. Put in another way, if factor terms are to be placed in the calculation equation, the fixed electrode formed at the supporting member 300 side and the fixed electrode formed at the auxiliary base plate 400 side do not have to be in a mirror image relationship necessarily.

Auxiliary capacitance elements C16, C26, C36, and C46, formed using auxiliary base plate 400, may also be used in the detection of moments Mx and My. As mentioned above, there are several variations to the equations for detecting moments Mx and My, shown in FIG. 20. For example, equations of the following variations may be used if just the capacitance elements that are positioned at the center are to be used for detection:

$$Mx=(C35+C45)-(C15+C25)$$

$$My=(C15+C45)-(C25+C35)$$

Here, the use of auxiliary capacitance elements increase the variations further, and for example, the following equations may be used:

$$Mx=(C35+C45+C16+C26)-(C15+C25+C36+C46)$$

$$My=(C15+C45+C26+C36)-(C25+C35+C16+C46)$$

Though an example of applying the modification example of adding auxiliary base plate 400 to the second embodiment described in §4 was described above, this embodiment of adding auxiliary base plate 400 may also be applied in likewise manner to the first embodiment described in §3 and to the third embodiment described in §5.

For example, though with the force detection device of the third embodiment, the following equation is defined in FIG. 23 as an equation for detection of a force Fz:

$$Fz=-(C15+C25+C35+C45);$$

by providing an auxiliary base plate 400 in the same manner as in the above-described example and forming auxiliary capacitance elements C16, C26, C36, and C46 respectively at positions above capacitance elements C15, C25, C35, and C45, it becomes possible to detect a force Fz by the following equation:

$$Fz=(C16+C26+C36+C46)-(C15+C25+C35+C45)$$

Obviously, when auxiliary base plate 400 is provided in the force detection device of the third embodiment, auxiliary capacitance elements C16, C26, C36, and C46 may also be used in the detection of moments Mx and My. For example, equations of the following variations may be used as equations for detecting moments Mx and My:

$$Mx=(C45+C36)-(C35+C46)$$

$$My=(C15+C26)-(C25+C16)$$

Also, though with the above-described modification example, fixed electrodes E16, E26, E36, and E46 are provided at the auxiliary base plate 400 side in correspondence to fixed electrodes E15, E25, E35, and E45, which are a part of the twenty fixed electrodes formed at the supporting member side, a greater number of fixed electrodes may also be provided. For example, fixed electrodes that are in mirror image relationships with all twenty fixed electrodes E11 to E45 on supporting member 300 shown in FIG. 30 may be provided at the auxiliary base plate 400 side. In this case, twenty capacitance elements are formed below the diaphragms and twenty auxiliary capacitance elements are formed above the diaphragms.

<<<§8. Modification Example Wherein Auxiliary Sensors Are Added>>>

Though with all of the embodiments and their modification examples described up until now, sensors for detecting the inclinations and displacements of force transmitting members are disposed only at the supporting member side, such sensors may also be disposed at the receiving body side to enable detection of the inclinations and displacements of force transmitting members at both ends thereof and thereby enable detection of forces and moments based on detection results at both the supporting member side and receiving body side. Detection operations of higher precision are thus enabled by performing detection in this manner.

The modification example described here takes note of this point and has the characteristic that auxiliary sensors, which detect forces applied from the respective force transmitting members to the force receiving member, are provided additionally and the detection processing unit performs the processes of detecting forces and moments acting on the force receiving member in consideration of the detection results of the auxiliary sensors as well. Though this modification may be applied to any of the first to third embodiments and modification examples thereof that have been described above, here a modification example applied to the first embodiment shall be described as a representative example.

Figure 31:
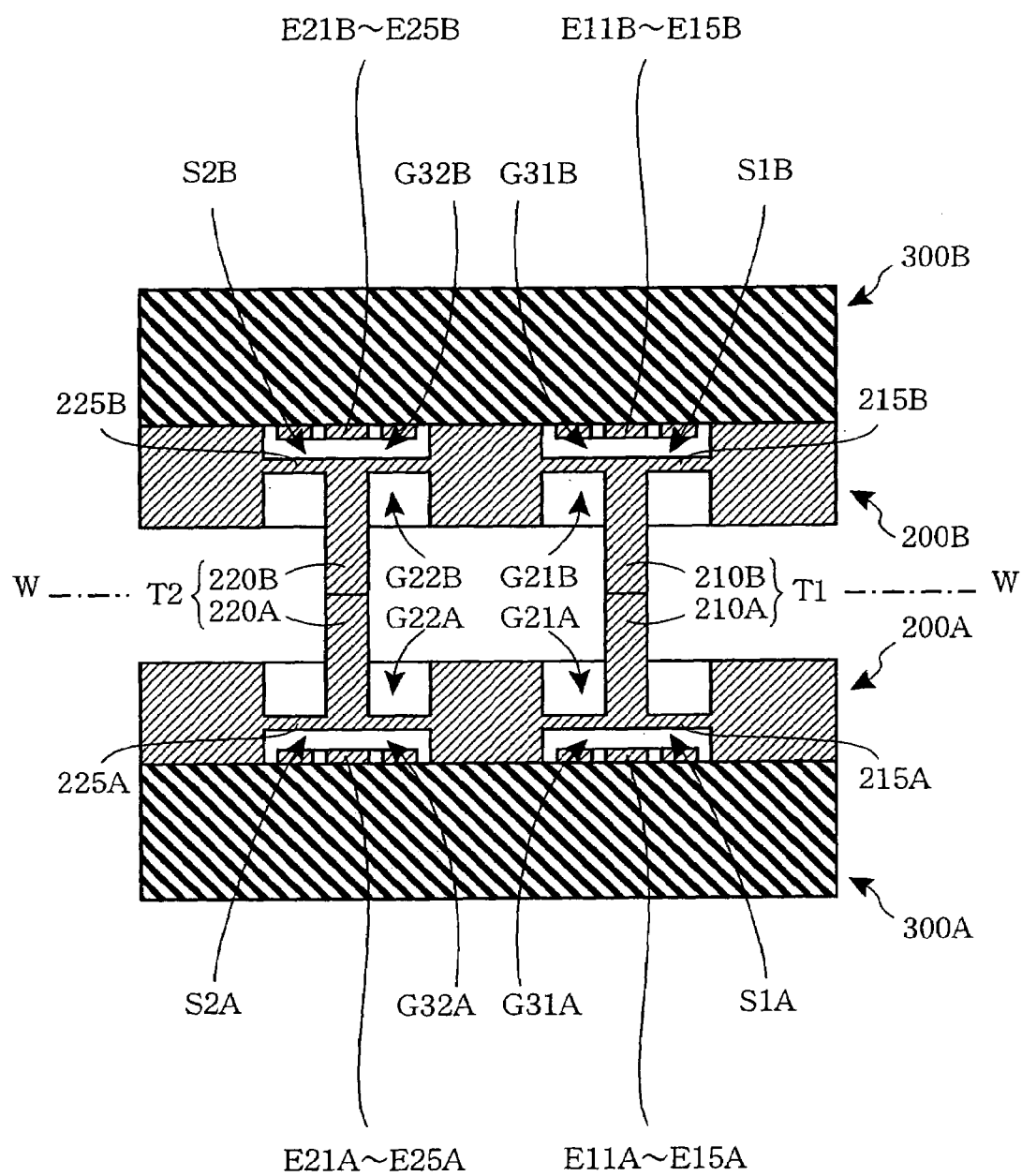
FIG. 31 is a side view in section of a force detection device of a modification example wherein auxiliary sensors are added.

FIG. 31 is a side view in section showing the basic arrangement of the force detection device of this modification example. As canbeunderstoodfroma comparison with the device of the first embodiment that is shown in FIG. 9, the device shown in FIG. 31 is vertically symmetrical with respect to a symmetry plane W (horizontal plane) defined at a central part of the device and has a structure wherein the respective components are in mirror image relationships in relation to this symmetry plane W. Here, for the sake of description, components that are in a mirror image relationship with each other and correspond to each other in the vertical direction shall be provided with the same symbol, with an "A" being attached to the end of the symbol of the component positioned below symmetry plane W and a "B" being attached to the end of the symbol of the component positioned above symmetry plane W.

The respective components positioned below symmetry plane W are exactly the same as the components of the lower half of the device of the first embodiment shown in FIG. 9. That is, an intermediate member 200A, having disk-like diaphragms 215A and 225A, is joined to the top of supporting member 300A. Below diaphragm 215A, a groove part G31A is provided and a sensor S1A is formed by a capacitance element set comprising fixed electrodes E11A to E15A and diaphragm 215A. Likewise, below diaphragm 225A, a groove part G32A is provided and a sensor S2A is formed by a capacitance element set comprising fixed electrodes E21A to E25A and diaphragm 225A. Also at the center of a groove part G21A, provided above diaphragm 215A, is disposed a cylindrical protruding part 210A, the lower end of which is joined to the center of diaphragm 215A, and at the center of a groove part G22A, provided above diaphragm 225A, is disposed a cylindrical protruding part 220A, the lower end of which is joined to the center of diaphragm 225A.

Meanwhile, the components of the upper half that are disposed above symmetry plane W are in mirror image relationships with the components of the lower half. That is, an intermediate member 200B, having disk-like diaphragms 215B and 225B, are joined to the bottom of a force receiving member 300B. Above diaphragm 215B, a groove part G31B is provided and a sensor S1B is formed by a capacitance element set comprising fixed electrodes E11B to E15B and diaphragm 215B. Likewise, above diaphragm 225B, a groove part G32B is provided and a sensor S2B is formed by a capacitance element set comprising fixed electrodes E21B to E25B and diaphragm 225B. Also at the center of a groove part G21B, provided below diaphragm 215B, is disposed a cylindrical protruding part 210B, the upper end of which is joined to the center of diaphragm 215B, and at the center of a groove part G22B, provided below diaphragm 225B, is disposed a cylindrical protruding part 220B, the upper end of which is joined to the center of diaphragm 225B. Here, for the sake of convenience, sensors S1B and S2B shall be referred to as "auxiliary sensors."

The upper ends of cylindrical protruding parts 210A and 220A are joined respectively to the lower ends of cylindrical protruding parts 210B and 220B, thereby forming force transmitting members T1 and T2. The behaviors of the two force transmitting members T1 and T2 when various force components act on force receiving member 300B of this force detection device are the same as those of the device of the first embodiment shown in FIG. 9. The difference is that the sensors for detecting the behaviors of force transmitting members T1 and T2 are provided at both the upper and lower sides. That is, sensors S1A and S2A function as sensors that detect forces that are applied from force transmitting members T1 and T2 to supporting member 300A, and auxiliary sensors S1B and S2B function as sensors that detect forces that are applied from force transmitting members T1 and T2 to force receiving member 300B. Here, the forces that are applied from force transmitting members T1 and T2 to force receiving member 300B are applied as reactions of forces that are applied from receiving member 300B to force transmitting members T1 and T2.

Since sensors S1A and S2A and auxiliary sensors S1B and S2B have structures that are in mirror image relationships with each other, the detection results also take into consideration the mirror image relationships. For example, when a force −Fz (a pressing force in the downward direction of the Figure) is applied to force receiving member 300B, since diaphragm 215A moves closer to fixed electrode E15A and diaphragm 215B moves closer to fixed electrode E15B, the detection result of sensor S1A will be the same as the detection result of sensor S1B. In other words, the increase/decrease of static capacitance value will be the same for the pair of capacitance elements that are in a mirror image relationship. On the other hand, when a force +Fx (a pressing force in the rightward direction of the Figure) is applied to force receiving member 300B, whereas sensor S1A detects that force transmitting member T1 becomes inclined in the positive X-axis direction (rightward direction of the Figure), sensor S1B detects that force transmitting member T1 becomes inclined in the negative X-axis direction (leftward direction of the Figure). Specifically, whereas the static capacitance value of a static capacitance element C11A, comprising electrode E11A, increases, the static capacitance value of a static capacitance element C11B, comprising electrode E11B, decreases. In other words, the pair of capacitance elements that are in a mirror image relationship will be opposite of each other in the increase/decrease of static capacitance value.

The detection processing unit must thus execute the detection processes for the respective force components in consideration of such mirror image relationships, and must perform a calculation of adding the detection results of the sensors and the detection results of the auxiliary sensors for a specific force component and perform a calculation of subtraction on the detection results of both sensors for another force component. However in principle, the precision of the detection result that is obtained in the final stage will be improved by an amount corresponding to the increase of the number of capacitance elements that form the sensors.

Though with the example shown in FIG. 31, the structures of the upper half and the lower half of the device are in completely mirror image relationships in relation to symmetry plane W, these structures do not necessarily have to be in a mirror image relationship. However, the structures of the sensors and auxiliary sensors are preferably in mirror image relationships in terms of practical use since calculations by the detection processing unit will then be facilitated.

Figure 32:
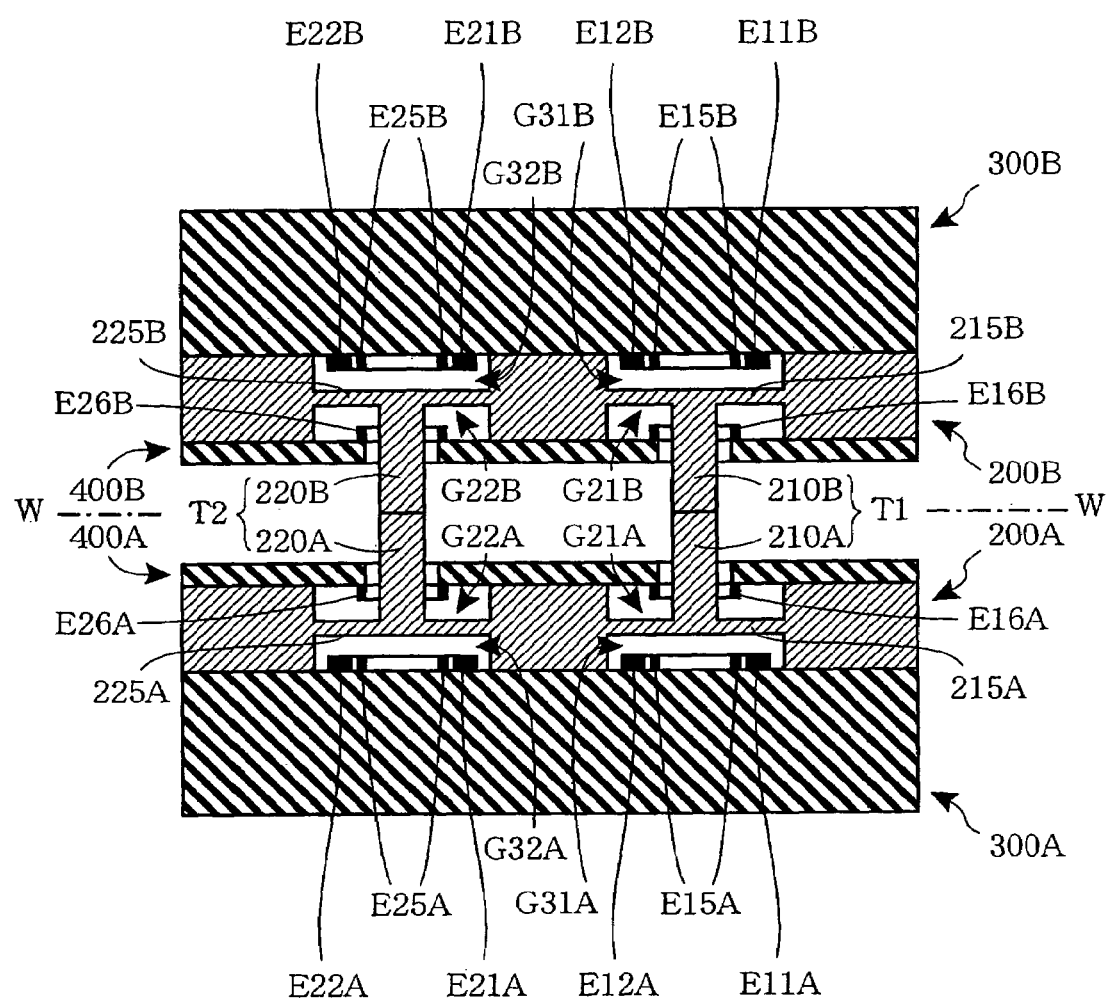
FIG. 32 is a side view in section of a force detection device of a modification example wherein both auxiliary base plates and auxiliary sensors are added.

With the modification example shown in FIG. 32, the modification example having the auxiliary sensors added, which was described in §8, is furthermore applied to the modification example having the auxiliary base plate added, which was described in §7. Here, the components above and below symmetry plane W are in mirror image relationships. The differences with respect to the device shown in FIG. 31 are that auxiliary base plates 400A and 400B and fixed electrodes E16A, E26A, E16B, and E26B are furthermore added and the shapes of the fixed electrodes formed at the supporting member 300A side are slightly changed. This modification example has both the characteristics described in §7 and the characteristics described in §8.

<<<§9. Modification Example Having a Conductive Material as the Main Material>>>

Though with the embodiments and modification examples that have been described up until now, supporting members 300 and 300A and force receiving member 300B are formed of an insulating material, these do not necessarily have to be formed of an insulating material and may be formed of a metal or other conductive material. However, if sensors making use of capacitance elements are to be formed, some measures will be required in regard to the surface of formation of the fixed electrodes. For example, in the case of the device shown in FIG. 31, since an insulating material is used for supporting member 300A and force receiving member 300B, there is no problem in directly forming the respective fixed electrodes on the top surface of supporting member 300A and the bottom surface of force receiving member 300B. However, in a case where supporting member 300A and force receiving member 300B are formed of a conductive material, if the respective fixed electrodes are formed directly on the top surface of supporting member 300A and the bottom surface of force receiving member 300B, a plurality of fixed electrodes will be short-circuited with each other. In such a case, the fixed electrodes are formed on an insulating layer.

Figure 33:
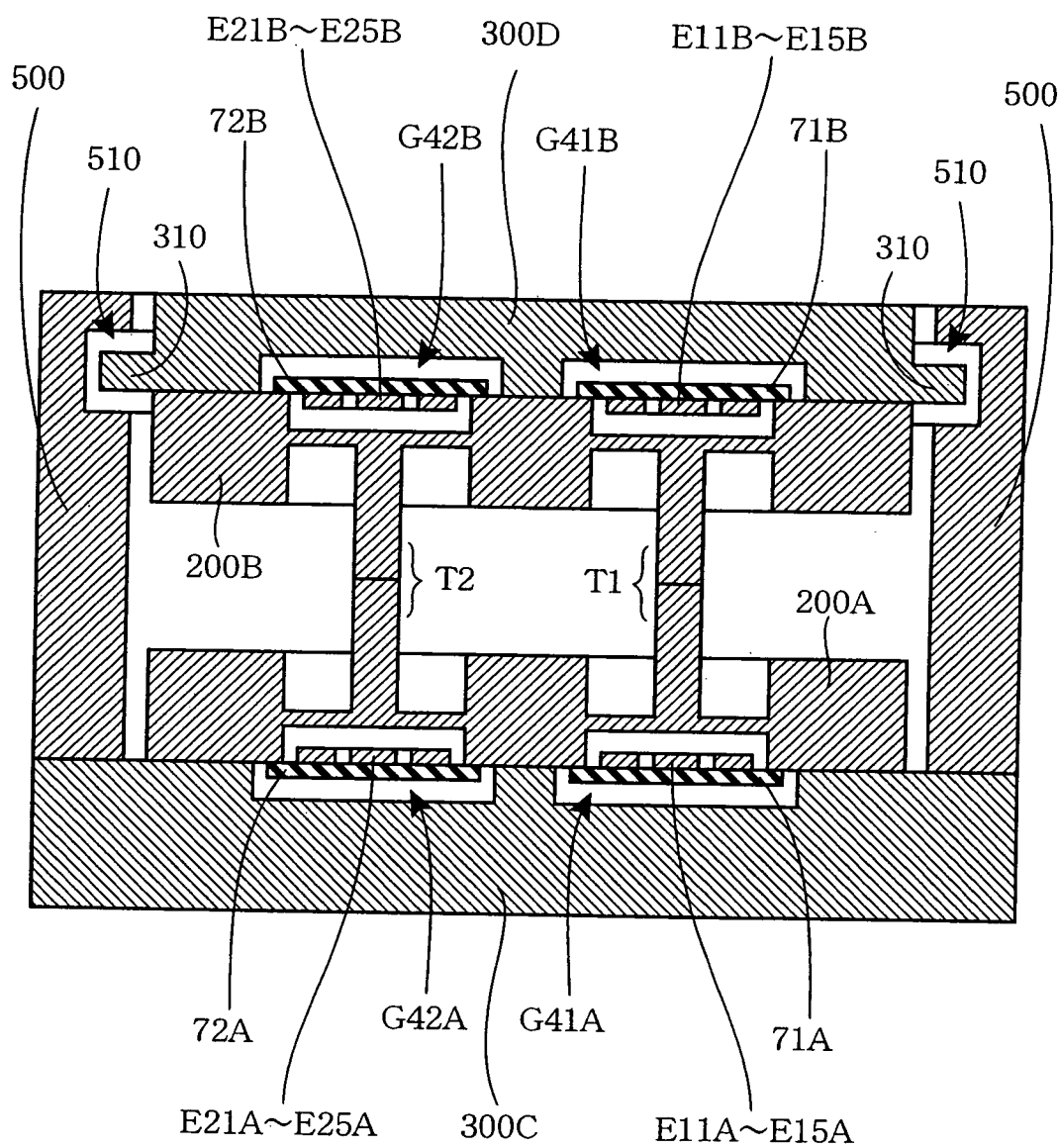
FIG. 33 is a force detection device of a modification example, wherein a force receiving member, supporting member, and force transmitting member are formed of a conductive material.

FIG. 33 is a side view in section of a modification example, wherein all of the main material of the force detection device shown in FIG. 31 is formed of a conductive material. With this modification example, a supporting member 300C and an intermediate member 200A, which form the lower half of the device, are both formed of a metal or other conductive material, and a force receiving member 300D and an intermediate member 200B, which form the upper half of the device, are also formed of a metal or other conductive material. Groove parts G41A and G42A are thus formed in the top surface of supporting member 300C and insulating layers 71A and 72A are fitted and fixed to positions at which these groove parts are closed. Fixed electrodes E11A to E15A and E21A to E25A are formed on the top surfaces of these insulating layers 71A and 72A. Likewise, groove parts G41B and G42B are formed in the bottom surface of force receiving member 300D and insulating layers 71B and 72B are fitted and fixed to positions at which these groove parts are closed. Fixed electrodes E11B to E15B and E21B to E25B are formed on the bottom surfaces of these insulating layers 71B and 72B.

The restricting members described in §6 are also added to the device shown in FIG. 33. That is, four restricting walls 500 are erected from the top surface of the periphery of supporting member 300C to provide a structure surrounding the outer side of the core part of the device from four sides. Restricting grooves 510 are formed near upper parts of the inner side surfaces of restricting walls 500. Meanwhile, restricting eaves parts 310 are protruded from outer peripheral side surface parts of plate-like receiving member 300D, thus providing a structure wherein these eaves parts 310 are housed inside restricting grooves 510 with predetermined gaps in between. These predetermined gaps serve the function of restricting the degrees of freedom of the displacements of force receiving member 300D. That is, when an external force, which causes force receiving member 300D to be displaced beyond a predetermined allowable range in any of the directions of the XYZ three-dimensional coordinate system, is applied, a restricting eaves part 310 contacts the inner side surface of a restricting groove 510 and further displacement is thereby restricted.

With the modification example shown in FIG. 33, since all components besides insulating layers 71A, 72A, 71B, and 72B (which may, for example, be formed of ceramic plates) can be formed of a metal or other conductive material, a structure, which enables the reduction of manufacturing cost and is suited for mass production, can be realized.

<<<§10. Modification Example Using Dummy Force Transmitting Members>>>

Though an example using two force transmitting members T1 and T2 was described as the first embodiment in §3, in terms of practical use, the stability of the mechanical displacement operations will be improved if the force receiving member is supported using a larger number of force transmitting members. That is, in comparison to the first embodiment that uses two force transmitting members T1 and T2, an embodiment using four force transmitting members T1 to T4 as in the second embodiment described in §4 and the third embodiment described in §5 provides the merit that the force receiving member can be supported in a more stable manner. Obviously with the latter, the merit that all six force components can be detected is also provided since detection using four sensors S1 to S4 is performed.

The modification example that shall now be described is an example for providing a force detection device that matches the demand that though there is no need to detect all six force components, a structure that can support the force receiving member in a stable manner is desired. In order to answer this demand, force transmitting members that are not equipped with sensors (for the sake of convenience, these shall be referred to as "dummy force transmitting members") are used. For example, the force detection device of the second embodiment described in §4 is equipped with four force transmitting members as shown in the top view of FIG. 16 and has the function of detecting all six force components. Here, if detection of the specific force components that require the detection results of third sensor S3 and fourth sensor S4 is not needed, since there is no need to detect forces that are applied from the third and fourth force transmitting members, there is no need to provide electrodes E31 to E35 and electrodes E41 to E45.

Figure 34:
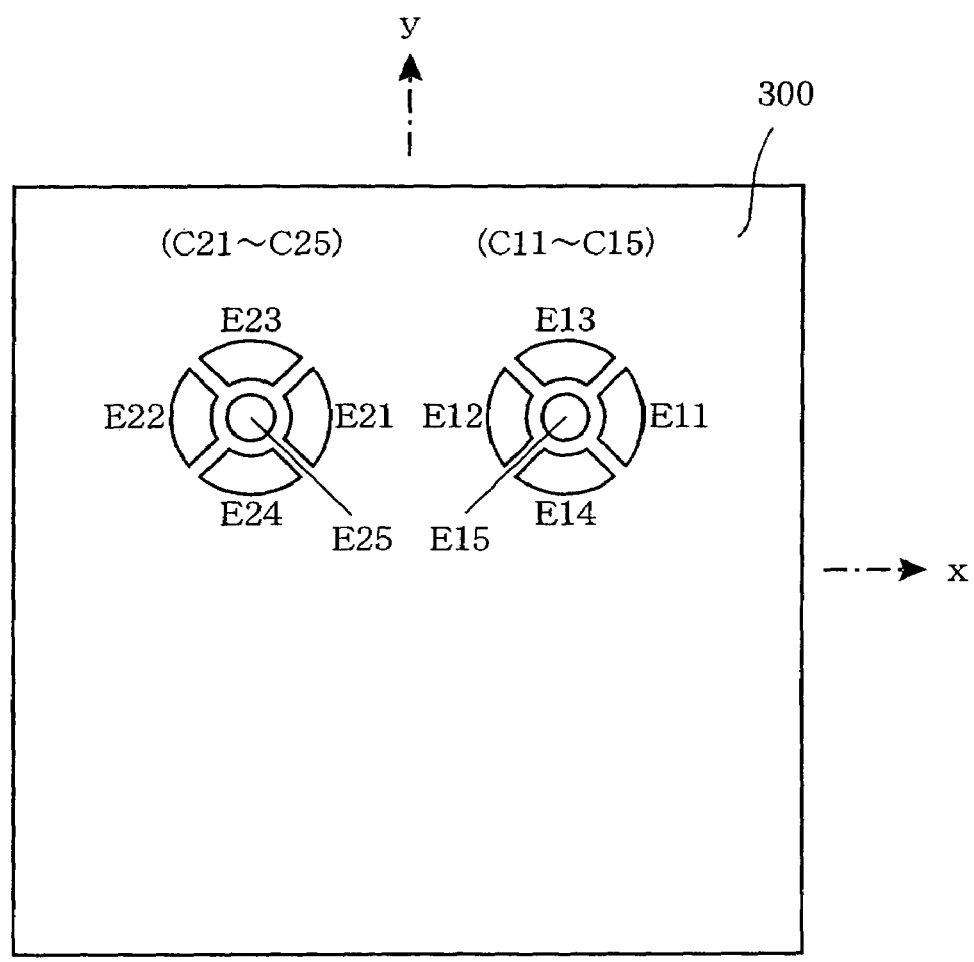
FIG. 34 is a top view of a supporting member 300 in a modification example using a dummy force transmitting member.

FIG. 34 is a top view of a supporting member 300 used in such a modification example. That is, though the structure of this modification example is basically the same as the structure of the second embodiment that was described in §4, it differs in that the supporting member 300 shown in FIG. 34 is used in place of the supporting member 300 shown in FIG. 18. In other words, though the four force transmitting members T1 to T4 are equipped, only first sensor S1 and second sensor S2 are provided as the sensors and third force transmitting member T3 and fourth force transmitting member T4 are dummy force transmitting members that are not involved at all in force detection operations.

Thus with this modification example, the merit that the force receiving member can be supported in a stable manner by the four force transmitting members, including two dummy force transmitting members T3 and T4, is provided, and since the third sensor and the fourth sensor are unnecessary, the merit that the work loads of the electrode forming process, wiring process, etc., are lightened to enable cost reduction is also provided.

The table indicating the modes of variation of the static capacitance values of the ten capacitance elements C11 to C15 and C21 to C25 formed by the ten fixed electrodes E11 and E15 and E21 to E25 shown in FIG. 34, will be as shown in FIG. 19A. In this case, forces Fx, Fy, and Fz and a moment My can be detected by the following principles.

First, a force Fx is determined by the equation, Fx=(C11−C12)+(C21−C22), a force Fy is determined by the equation, Fy=(C13−C14)+(C23−C24), and a force Fz is determined by the equation, Fz=−(C15+C25). These equations correspond to being equations with which part of the terms of the equations for Fx, Fy, and Fz, shown in FIG. 20, are removed. Whereas the equations of FIG. 20 are equations for the case where detection is performed using four sensors, the above equations are equations for the case where detection is performed using two sensors and the number of terms is reduced to half. Though the precision of detection is thus slightly lowered, forces Fx, Fy, and Fz can be detected without any problems in terms of principle. For a force Fz, detection by the variation, Fz=−((C11+C12 +C13+C14+C15)+(C21+C22+C23+C24+C25)) is also possible as has been described above.

Meanwhile, a moment My can be determined by the equation, My=((C11+C12+C13+C14+C15)−(C21+C22+C23+C24+C25)) (equation with which a part of the terms of the equation for My shown in FIG. 20 have been removed), or its variation, (C15−C25).

Thus with the modification example using the supporting member 300 shown in FIG. 34, though forces Fx, Fy, and Fz and a moment My can be detected, moments Mx and Mz cannot be detected. Also, a moment Mx and a force Fz cannot be distinguished from each other (when a moment Mx acts, it is detected as a force Fz by the above equation), and a moment Mz and a force Fx cannot be distinguished from each other (when a moment Mz acts, it is detected as a force Fx by the above equation). This modification example therefore cannot be used under an environment in which moments Mx and Mz act.

Though the modification example using the supporting member 300 shown in FIG. 34 is a modification example, wherein third sensor S3 and fourth sensor S4 are removed from the second embodiment using the supporting member 300 shown in FIG. 18, and third force transmitting member T3 and fourth force transmitting member T4 are thereby used as dummy force transmitting members, a modification example is likewise possible wherein third sensor S3 and fourth sensor S4 are removed from the third embodiment using the supporting member 300 shown in FIG. 21, and third force transmitting member T3 and fourth force transmitting member T4 are thereby used as dummy force transmitting members. The detection operations of such a modification example will be the same as the detection operations of the first embodiment using the supporting member 300 shown in FIG. 12.

<<<§11. Fourth Embodiment of the Invention>>>

Lastly, a force detection device of a fourth embodiment of this invention shall be described. With the first embodiment described in §3, detections using two force transmitting members T1 and T2 and two sensors S1 and S2 are performed, and with the second embodiment described in §4 and the third embodiment described in §5, detections using four force transmitting members T1 to T4 and four sensors S1 to S4 are performed. With the fourth embodiment to be described here, detections using three force transmitting members T1 to T3 and three sensors S1 to S3 are performed. Thus the structures of the force receiving member, the supporting member, the respective columnar force transmitting members, etc., of the force detection device of this fourth embodiment are exactly the same as those of the embodiments that have been described above. The fourth embodiment just differs slightly in the number and positioning of the columnar force transmitting members. A description concerning just this difference shall be provided below.

Figure 35:
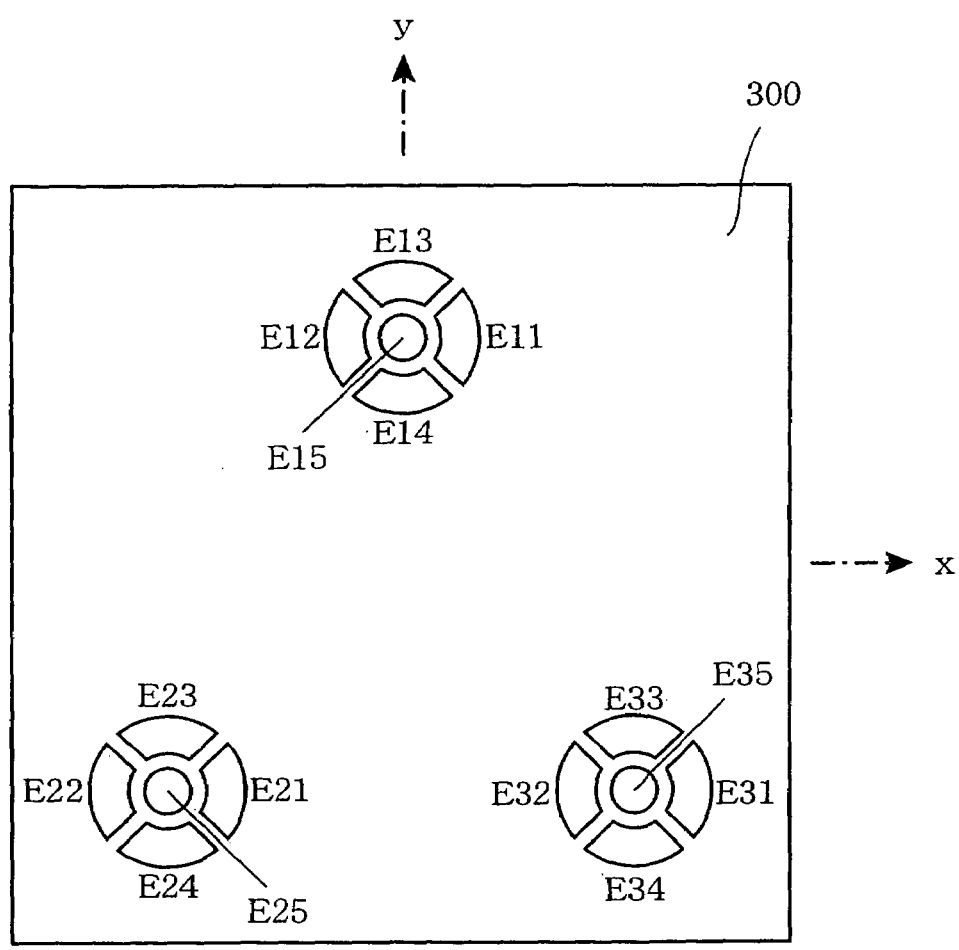
FIG. 35 is a top view of a supporting member 300 of a force detection device of a fourth embodiment of this invention.

FIG. 35 is a top view of a supporting member 300 used in the force detection device of this fourth embodiment. A comparison with FIG. 18, which is a top view of the supporting member 300 that is used in the above-described force detection device of the second embodiment, will make clear the difference between the two embodiments. That is, as shown in FIG. 18, with the second embodiment, fixed electrodes E11 to E15, E21 to E25, E31 to E35, and E41 to E45, which are components of four sensors S1 to S4, are respectively positioned in the first to fourth quadrants of the xy coordinate system, and the first to fourth force transmitting members T1 to T4 are respectively positioned in the first to fourth quadrants of the XY two-dimensional coordinate system.

On the other hand, with the force detection device of the fourth embodiment shown in FIG. 35, fixed electrodes E11 to E15, E21 to E25, and E31 to E35, which are components of three sensors S1 to S3, are respectively positioned at a positive part of the y-axis, the third quadrant, and the fourth quadrant of the xy two-dimensional coordinate system. Each of first to third columnar force transmitting members T1 to T3 are thus arranged from a structure having the Z-axis direction as a longitudinal direction, with first force transmitting member T1 being positioned at a position at which the longitudinal direction thereof intersects a positive part of the Y-axis, the second force transmitting member being positioned in the third quadrant of the XY plane, and third force transmitting member being positioned in the fourth quadrant of the XY plane. That capacitance elements C11 to C15, C21 to C25, and C31 to C35 are formed by the respective fixed electrodes E11 to E15, E21 to E25, and E31 to E35 and conductive diaphragms (common displaceable electrodes) positioned above the fixed electrodes is the same as in the above-described second embodiment. However, the present embodiment differs slightly in the detection processes carried out by detection processing unit 30 due to the differences in the positioning of the force transmitting members and the sensors.

FIGS. 36A and 36B show tables indicating the modes of variation of the static capacitance values of the respective capacitance elements C11 to C35 in the force detection device of the fourth embodiment. Though these tables again show only cases where the values of the six force components Fx, Fy, Fz, Mx, My and Mz are positive, the increase/decrease relationships are simply reversed in the negative cases. A comparison of the tables shown in FIGS. 36A and 36B with the tables shown in FIGS. 19A and 19B for the second embodiment shows that the modes of variation of the static capacitance values of capacitance elements C11 to C15, C21 to C25, and C31 to C35 in cases where force components Fx, Fy, and Fz of the respective axial directions act are exactly the same with the two embodiments. The detection principles concerning force components Fx, Fy, and Fz of the respective axial directions are the same as those of the above-described second embodiment. The only difference is that whereas force components Fx, Fy, and Fz of the respective axial directions are detected as sums of detection results of four sensors S1 to S4 in the above-described second embodiment, detections using sums of the detection results of three sensors S1 to S3 are performed in the fourth embodiment here and the detection precisions are thus slightly lower.

On the other hand, the modes of variation of the static capacitance values in cases where moments Mx, My, and Mz about the respective axes act differ slightly from those of the above-described second embodiment. The detection principles of these moments shall now be described briefly.

First, as can be understood from the plan view of FIG. 35, when a moment Mx about the X-axis acts, a pulling force (+fz) acts on supporting member 300 from first transmitting body T1 (positioned above fixed electrode E15 in the Figure), positioned at the positive part of the Y-axis, and a pressing force (−fz) acts on supporting member 300 from second force transmitting member T2 (positioned above fixed electrode E25 in the Figure), positioned in the third quadrant, and third transmitting member T3 (positioned above fixed electrode E35 in the Figure), positioned in the fourth quadrant. Results such as those shown in the fourth rows (rows of +Mx) of FIGS. 36A and 36B are thus obtained.

Meanwhile, when a moment My about the Y-axis acts, a pulling force (+fz) acts on supporting member 300 from second transmitting member T2, positioned in the third quadrant and a pushing force (−fz) acts on supporting member 300 from third transmitting member T3, positioned in the fourth quadrant. In this case a significant action of force on supporting member 300 does not occur from first force transmitting member T1 positioned at the positive part of the Y-axis. Results such as those shown in the fifth rows (rows of +My) of FIGS. 36A and 36B are thus obtained.

The directions in which the three transmitting members T1 to T3 become inclined when a positive direction moment +Mz about the Z-axis (which will be a counterclockwise moment with the plan view of FIG. 35) is applied to force receiving member 100 shall now be considered with reference to FIG. 35.

Firstly, first transmitting member T1 (positioned above fixed electrode E15 in the Figure), positioned at the positive part of the Y-axis, becomes inclined in the left direction (negative x-axis direction) in FIG. 35 so that capacitance element C12 becomes narrower in electrode interval and increases in static capacitance value while capacitance element C11 becomes wider in electrode interval and decreases in static capacitance value. Also, second transmitting member T2 (positioned above fixed electrode E25 in the Figure), positioned in the third quadrant, becomes inclined in the lower right direction in FIG. 35 so that capacitance elements C21 and C24 become narrower in electrode interval and increase in static capacitance value while capacitance elements C22 and C23 become wider in electrode interval and decrease in static capacitance value. Lastly, third transmitting member T3 (positioned above fixed electrode E35 in the Figure), positioned in the fourth quadrant, becomes inclined in the upper right direction in FIG. 35 so that capacitance elements C31 and C33 become narrower in electrode interval and increase in static capacitance value while capacitance elements C32 and C34 become wider in electrode interval and decrease in static capacitance value. With each of capacitance elements C13, C14, C15, C25, and C35, a change in static capacitance value does occur in total.

Thus when a positive direction moment +Mz about the Z-axis acts on force receiving member 100, the increase/decrease results shown in the sixth rows of FIGS. 36A and 36B are obtained. Obviously when a negative direction moment −Mz about the Z-axis acts on force receiving member 100, results with which the negative/positive relationships are reversed will be obtained.

Figure 37:
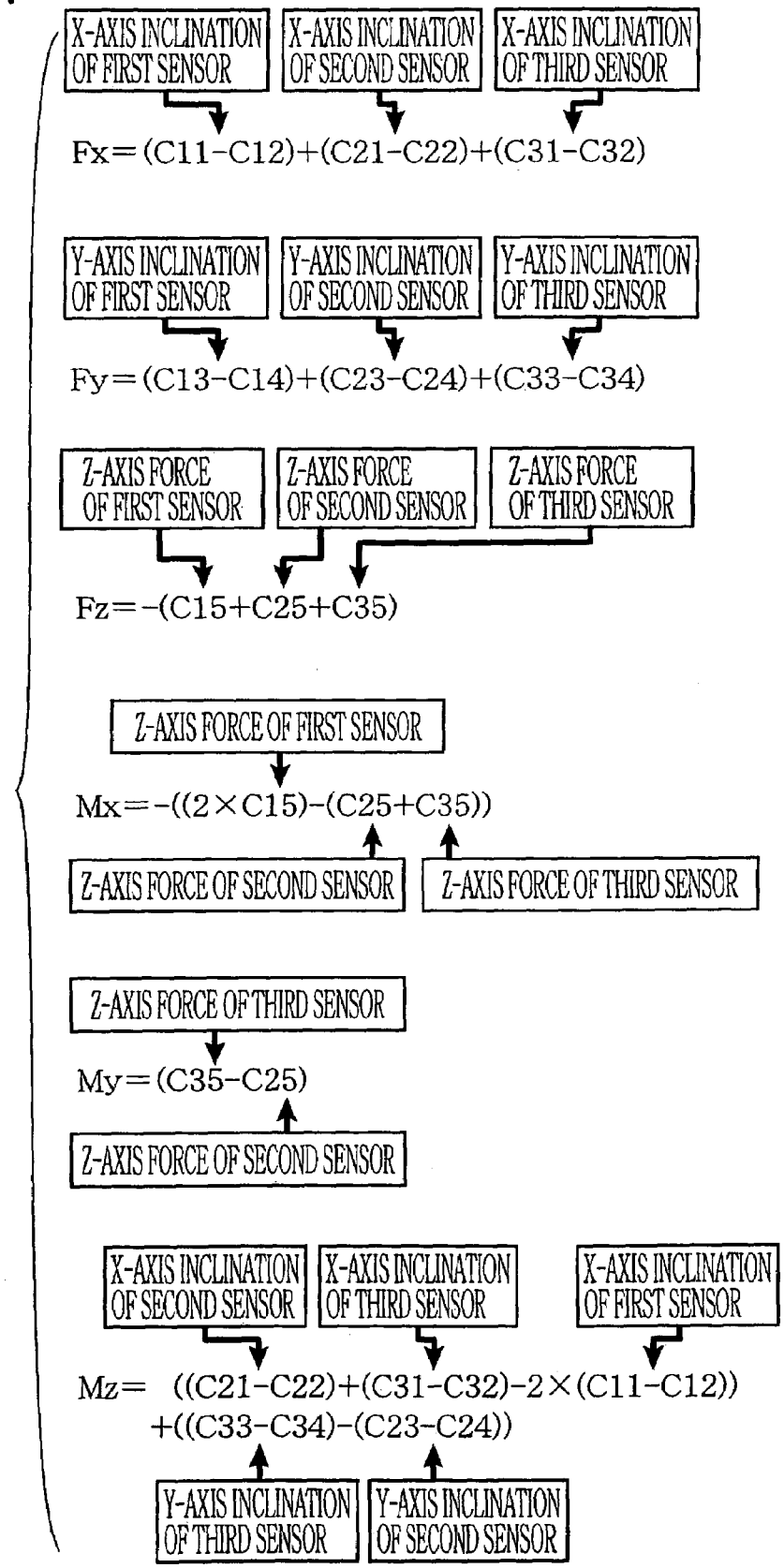
FIG. 37 is a diagram illustrating, by way of numerical equations, the principles of detection of the respective force components by the force detection device shown in FIG. 35.

Based on the results shown in the tables of FIGS. 36A and 36B, it can be understood that by preparing as detection processing unit 30, a circuit, which measures the static capacitance values (here, the static capacitance values themselves shall be indicated by the same symbols, C11 to C15) of the fifteen capacitance elements C11 to C35, and a processing device, which uses the respective measured static capacitance values and performs computations based on the equations shown in FIG. 37, the six components, Fx, Fy, Fz, Mx, My, and Mz, can be obtained. Here, the equations for Fx, Fy, and Fz in FIG. 37 are equations with which terms concerning the fourth sensor have been removed from the corresponding equations shown in FIG. 20.

Meanwhile, the equation, $Mx=-((2 \times C15)-(C25+C35))$, shown in FIG. 37, is based on the results of the fourth rows (rows of +Mx) of the tables of FIGS. 36A and 36B and signifies that the moment Mx about the X-axis of a force that acts on force receiving member can be detected based on the difference between the force in relation to the Z-axis direction which is detected by the first sensor, and the forces in relation to the Z-axis direction which are detected by the second and third sensors. The minus sign at the front of the equation is due to the manner in which the direction of the moment is set. Also, the term of C15 is multiplied by a factor two for adjustment of the detection sensitivities of the respective sensors.

That is, as is clear from the plan view of FIG. 35, when a moment Mx about the X-axis acts, the phenomenon that occurs in relation to the action of force in the region at the upper half of the Figure (first and second quadrants of the xy two-dimensional coordinate system) and the phenomenon that occurs in relation to the action of force in the region at the lower half of the Figure (third and fourth quadrants of the xy two-dimensional coordinate system) are physically opposite phenomena. That a difference of static capacitance values is determined in the final stage in the above equation is due to none other than the occurrence of such opposite physical phenomena. However, as shown in FIG. 35, whereas just the first sensor (capacitance element C15 in this case) is the sensor with the role of detecting the physical phenomenon in the upper half region, the two sensors of the second sensor (capacitance element C25 in this case) and the third sensor (capacitance element C35 in this case) are used as the sensors with the role of detecting the physical phenomenon in the lower half region. The detection sensitivity of the lower half region will thus be twice the detection sensitivity of the upper half region. The term of C15 is multiplied by the factor of 2 in the equation for Mx in order to correct such a detection sensitivity difference.

In place of such a modification of multiplying a factor, modifications concerning the areas of the fixed electrodes may be made. For example, though with the example shown in FIG. 35, fixed electrodes E15, E25, and E35 are circular electrodes of the same size, by suitably modifying the diameter of fixed electrode 15 to be greater than the diameter of each of fixed electrodes E25 and E35 so that the area of fixed electrode E15 will be twice the area of each of fixed electrodes E25 and E35, the detection sensitivity of capacitance element C15 can be made twice the detection sensitivity of capacitance element C25 or C35, thereby making unnecessary the factor of 2 that is multiplied to the term of C15 in the equation for Mx in FIG. 37.

The equation for a moment My shall now be described. The equation, $My=(C35-C25)$, shown in FIG. 37 is based on the results of the fifth rows (rows of +My) of the tables of FIGS. 36A and 36B and signifies that the moment My about the Y-axis of a force that acts on the force receiving member can be detected based on the difference between the force in relation to the Z-axis direction which is detected by the third sensor, and the force in relation to the Z-axis direction which is detected by the second sensor.

Lastly, the equation, Mz=((C21−C22)+(C31−C32)−2× (C11−C12))+((C33−C34)−(C23−C24)), shown in FIG. 37, is based on the results of the sixth rows (rows of +Mz) of the tables of FIGS. 36A and 36B and signifies that the moment Mz about the Z-axis of a force that acts on the force receiving member can be detected by determining, as a first difference, the difference obtained by subtracting the inclination degree in relation to the X-axis direction detected by the first sensor, from the sum of the inclination degrees in relation to the X-axis direction detected by the second and third sensors, determining, as a second difference, the difference obtained by subtracting the inclination degree in relation to the Y-axis direction detected by the second sensor, from the inclination degree in relation to the Y-axis direction detected by the third sensor, and based on the sum of the abovementioned first difference and the second difference.

The meaning of this equation for Mz can be made more readily understood by rewriting the equation as follows:

$$Mz = -2 \times (C11 - C12) + (C21 + C24) - (C22 + C23) + (C31 + C33) - (C32 + C34).$$

That is when a positive direction moment +Mz about the Z-axis acts, first force transmitting member T1, which is positioned above fixed electrode E15 in FIG. 35, becomes tilted in the left direction in the Figure as mentioned above, and −(C11−C12) in the above equation is the term for detecting such an inclination of first force transmitting member T1. Likewise, second force transmitting member T2, which is positioned above fixed electrode E25, becomes tilted in the lower right direction in the Figure, and (C21+ C24)−(C22+C23) in the above equation is the term for detecting such an inclination of second force transmitting member T2. Also, third force transmitting member T3, which is positioned above fixed electrode E35, becomes tilted in the upper right direction in the Figure, and (C31+ C33)−(C32+C34) in the above equation is the term for detecting such an inclination of third force transmitting member T3. The above equation thus indicates the sum of the detection values of the inclination degrees in predetermined directions of the three force transmitting members T1 to T3 in a case where a moment Mz about the Z-axis acts.

In this equation for Mz, the term of (C11−C12) is multiplied by a factor of 2 again in order to adjust for the detection sensitivities of the respective sensors. That is, the term of (C11−C12), which is obtained as a detection result of first sensor S1, is multiplied by the factor of 2 for the modification of making the detection sensitivity of first sensor S1 twice the detection sensitivity of second sensor S2 or third sensor S3. Such a modification is necessary since, as is clear from the plan view of FIG. 35, when the detection operation of the inclination degrees in relation to the X-axis direction are noted, whereas just the first sensor (capacitance elements C11 and C12 in this case) is the sensor accounting for the upper half region, the two sensors of the second sensor (capacitance elements C21 and C22 in this case) and the third sensor (capacitance elements C31 and C32 in this case) are used as sensors accounting for the lower half region. Obviously such a modification of multiplying a factor will be unnecessary if the area of each of fixed electrodes E11 and E12 is set to be twice the area of each of fixed electrodes E21, E22, E31, and E32. In regard to the detection operation for the inclination degrees in the Y-axis direction, such a modification is unnecessary since just a difference between the detection result of the third sensor and the detection result of the second sensor is determined.

As has been mentioned several times above, there are a plurality of variations in the methods for determining forces in relation to the Z-axis direction of the respective force transmitting members T1 to T3, and these variations may be applied to the equations shown in FIG. 37. Thus for example, the equation, Fz=−((C11+C12+C13+C14+C15)+ (C21+C22+C23+C24+C25)+(C31+C32+C33+C34+C35)) may be used as the equation for a force Fz in FIG. 37. Also, −((2×(C11+C12+C13+C14+C15))−((C21+C22+C23+C24+ C25)+(C31+C32+C33+C34+C35))) may be used as the equation for a force Mx. Likewise, (C31+C32+C33+C34+ C35)−(C21+C22+C23+C24+C25) may be used as the equation for a force My.

Though as the fourth embodiment, an example of using three force transmitting members was described, the modification examples described in §6 to §11 may be applied to this fourth embodiment as well.

<<<§12. Other Modification Examples>>>

Though this invention has been described above based on the illustrated embodiments and modification examples, this invention is not limited to these embodiments and modification examples and may be carried out in various other modes.

For example, though in the above-described embodiments, multi-axis force sensors of the type illustrated in FIG. 3 are incorporated, the sensors to be incorporated in this invention do not need to be of a static capacitance type, such as that shown in FIG. 3, and, for example, piezo resistance force sensors, force sensors using piezoelectric elements, etc., may be used instead. Also, even in a case where static capacitance type force sensors are used, the type shown in FIG. 3, in which diaphragm 51 itself is used as a common displaceable electrode, does not have to be used necessarily. In a case where diaphragm 51 is formed of an insulating material, a conductive film may be formed on its bottom surface and used as a common displaceable electrode. Obviously, in place of using just one common displaceable electrode, individual displaceable electrodes opposing the respective fixed electrodes may be used instead.

Though in the above-described embodiments, connecting members (specifically, thin parts of the plate-like force receiving member) with flexibility are provided at the parts at which the respective force transmitting members are connected to the force receiving member, the upper ends of the respective force transmitting members do not necessarily have to be connected to the force receiving member via connecting members with flexibility. If the forces and moments that are to be detected can be made to act on the force receiving member without impediment, a form in which the upper ends of the respective force transmitting members are directly connected to the force receiving member may be taken. However for practical use, it is preferable, for making the forces and moments that are to be detected act without impediment, to connect the upper ends of the respective force transmitting members via connecting members with flexibility to the force receiving member and thereby arrange a structure in which the force transmitting members can be displaced with some degree of freedom with respect to the force receiving member.

Detection processing unit 30, which serves the function of determining the detection values of forces and moments in the final stage, may also be realized in actuality in various arrangements. For example, a method of measuring the static capacitance values of the individual capacitance elements as analog voltage values, converting these measured values into digital signals, and executing calculations indicated by the equations of FIG. 14, FIG. 20, FIG. 23, or FIG. 37 using a CPU or other computing device may be employed, or a method of handling the measured values of the static capacitance values of the individual capacitance elements as they are as analog voltage values and outputting the final detection values as analog signals may be employed instead. In the case where the latter method is employed, the electrodes of the respective capacitance elements are provided with prescribed wirings and connected to an analog computing circuit, comprising analog adders and analog subtracters as necessary. Also, a computing circuit is not necessarily required for determining the sum of static capacitance values. For example, to determine the sum of the static capacitance values of two capacitance elements C1 and C2, it is sufficient to provide wiring that connects these two capacitance elements in parallel and determine the static capacitance value across two points along this wiring. The detection processing unit of this invention thus does not have to be arranged necessarily as a digital or analog computing circuit and may be arranged by wirings that electrically connect a plurality of capacitance elements, and the term "detection processing unit" in this invention is a concept that includes such simple electrical wirings.

Though with the embodiments described up until now, the two or four force transmitting members and the connecting members thereof are positioned at positions that are symmetrical (positions that are line symmetrical with respect to specific coordinate axis) in a coordinate system with which the origin is set at the center of a square-shaped force receiving member 100 and were all made the same in material and size, these do not have to be positioned necessarily at symmetrical positions and sensors of the same type do not have to prepared necessarily as well. For example, though with the second embodiment, four force transmitting members are positioned at the four vertex positions of a square, in principle, for detection of the six components of force, the four force transmitting members may be positioned arbitrarily as long as the four force transmitting members are not positioned along a single straight line. However, if the four force transmitting members are not positioned symmetrically with respect to the coordinate system or are not the same in material or size or the individual sensors differ in structure in size, differences in detection sensitivity arise among the respective capacitance elements and thus the need to multiply each static capacitance value by a unique sensitivity factor in performing the computations indicated by the equations of FIG. 14, FIG. 20, or FIG. 23 arises. It is thus preferable to employ the above-described embodiments.

Though with the present Application, the terms "force receiving member" and "supporting member" are used, this is intended for a general form of use in which the supporting member is put in a fixed state and the forces that are to be detected are made to act on the force receiving member. However, the form of use of the force detection device of the present invention is not limited to such a form, and a form of use, wherein the force receiving member is oppositely put in a fixed state and the forces that are to be detected are made to act on the supporting member, is also possible. In general, a force detection device has the function of detecting a force acting on a second location in a state in which a first location is fixed, and the phenomenon of detecting forces acting on the force receiving member with the supporting member being put in a fixed state is essentially equivalent to the phenomenon of detecting forces acting on the supporting member with the force receiving member being put in a fixed state. Thus though with the above-described first to third embodiments, sensors for detecting inclinations and displacements of force transmitting members are disposed at the supporting member side, the technical idea of disposing such sensors not at the supporting member side but at the force receiving body side is essentially the same in technical idea as this invention and is included within the scope of this invention.

As described above, with the force detection device according to the present invention, forces and moments can be detected in a distinguishing manner by a structure that is as simple as possible.

What is claimed is:

1. A force detection device comprising:
    a force receiving member for receiving force to be detected;
    a supporting member positioned below said force receiving member;
    a force transmitting member having an upper end thereof connected to said force receiving member and a lower end thereof connected via a connecting member, having flexibility, to said supporting member;
    a sensor for detecting force applied from said force transmitting member to said supporting member; and
    a detection processing unit for performing a process of detecting a force or moment component acting on said force receiving member in consideration of a detection result of said sensor, wherein said flexibility of said connecting member is provided by a diaphragm.

2. The force detection device of claim 1 wherein said diaphragm comprises a thin flexible member to which said force transmitting member is connected.

3. The force detection device of claim 2 wherein said force transmitting member is connected to a central region of said diaphragm and extends perpendicularly thereto.

4. The force detection device of claim 3 wherein said diaphragm has a circumference connected to said supporting member.

5. The force detection device of claim 3 wherein said sensor is adjacent to said diaphragm on a side thereof opposite the force transmitting member.

6. The force detection device of claim 2 wherein said sensor comprises a fixed electrode secured to said supporting member and a movable electrode formed with said diaphragm.

* * * * *